(12) United States Patent
Matsuda et al.

(10) Patent No.: US 11,153,059 B2
(45) Date of Patent: Oct. 19, 2021

(54) BASE STATION DEVICE, TERMINAL DEVICE, METHOD, AND STORAGE MEDIUM

(71) Applicant: Sony Corporation, Tokyo (JP)

(72) Inventors: Hiroki Matsuda, Tokyo (JP);
Kazuyuki Shimezawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 11 days.

(21) Appl. No.: 16/097,842

(22) PCT Filed: Mar. 28, 2017

(86) PCT No.: PCT/JP2017/012527
§ 371 (c)(1),
(2) Date: Oct. 31, 2018

(87) PCT Pub. No.: WO2017/195483
PCT Pub. Date: Nov. 16, 2017

(65) Prior Publication Data
US 2019/0140808 A1 May 9, 2019

(30) Foreign Application Priority Data
May 12, 2016 (JP) .............................. JP2016-095905

(51) Int. Cl.
*H04L 5/00* (2006.01)
*H04W 72/04* (2009.01)
(Continued)

(52) U.S. Cl.
CPC .......... *H04L 5/0096* (2013.01); *H04L 1/0026* (2013.01); *H04L 5/001* (2013.01);
(Continued)

(58) Field of Classification Search
CPC ... H04L 5/0048; H04L 5/0053; H04L 5/0091; H04L 5/0096; H04L 27/2602;
(Continued)

(56) References Cited

U.S. PATENT DOCUMENTS 8,929,319 B2 * 1/2015 Anderson ......... H04W 72/1284
370/329
8,976,694 B2    3/2015 Feuersanger et al.
(Continued)

FOREIGN PATENT DOCUMENTS

JP     2013-520053 A    5/2013

OTHER PUBLICATIONS

Extended Search Report issued in European Application 17795844.4-1219 dated Apr. 12, 2019.
(Continued)

*Primary Examiner* — Thomas R Cairns
(74) *Attorney, Agent, or Firm* — Xsensus LLP

(57) ABSTRACT

[Object] To provide a base station device, a terminal device, a communication system, a communication method, and an integrated circuit which are capable of significantly improving the transmission efficiency of the entire system in a communication system in which a base station device and a terminal device communicate with each other.
[Solution] A base station device, including: a control unit configured to variably set a sub carrier interval and a symbol length used for communication and notify of information for switching a parameter set indicating the sub carrier interval and the symbol length in accordance with setting content.

18 Claims, 28 Drawing Sheets

(51) Int. Cl.
*H04W 28/18* (2009.01)
*H04L 27/26* (2006.01)
*H04W 76/11* (2018.01)
*H04W 76/27* (2018.01)
*H04L 1/00* (2006.01)

(52) U.S. Cl.
CPC .......... *H04L 5/0007* (2013.01); *H04L 5/0048* (2013.01); *H04L 5/0091* (2013.01); *H04L 5/0092* (2013.01); *H04L 27/2602* (2013.01); *H04L 27/2607* (2013.01); *H04W 28/18* (2013.01); *H04W 72/04* (2013.01); *H04W 72/042* (2013.01); *H04W 72/0446* (2013.01); *H04W 72/0453* (2013.01); *H04W 76/11* (2018.02); *H04W 76/27* (2018.02); *H04L 5/0053* (2013.01)

(58) Field of Classification Search
CPC . H04L 27/2607; H04L 1/0001; H04L 1/0026; H04L 5/00; H04L 5/0007–0012; H04L 5/001; H04L 5/005–0051; H04L 5/0055–0057; H04L 5/0092–0098; H04L 25/0212; H04L 25/0226; H04L 27/183; H04L 27/26025–26136; H04L 27/2665; H04L 27/3488; H04L 29/12009; H04L 41/0896; H04W 28/16; H04W 28/18; H04W 72/042; H04W 72/0446; H04W 72/0453; H04W 72/12; H04W 72/1215; H04W 76/11; H04W 76/27; H04W 8/20; H04W 8/22; H04W 8/26; H04W 16/00; H04W 16/14; H04W 16/28; H04W 28/20–22; H04W 36/0072; H04W 36/0094; H04W 36/06; H04W 52/34; H04W 72/04–10; H04W 76/10; H04B 7/024; H04B 17/24; H04B 17/364; H04J 11/00; H04J 13/00; H04J 13/0055
See application file for complete search history.

(56) References Cited

U.S. PATENT DOCUMENTS

| | | | | |
|---|---|---|---|---|
| 10,554,321 | B2* | 2/2020 | Cheng | H04L 27/2666 |
| 10,680,864 | B2* | 6/2020 | Zhang | H04L 5/0007 |
| 2010/0150093 | A1 | 6/2010 | Stanwood et al. | |
| 2012/0044904 | A1* | 2/2012 | Takano | H04L 27/2602 370/329 |
| 2015/0188650 | A1 | 7/2015 | Au et al. | |
| 2017/0332359 | A1* | 11/2017 | Tsai | H04B 7/0617 |

OTHER PUBLICATIONS

Nokia Networks, "Basic System Design for UL NB-IoT", 3GPP TSG-RAN WG1 NB-IoT Adhoc, R1-160041, 2 Pages total, (Jan. 18-20, 2016).
NTT Docomo, Inc., "Initial Views on Numerology for NR Access Techonology", 3GPP TSG RAN WG1 Meeting #84bis, R1-163113, 14 Pages total, (Apr. 11-15, 2016).
Nokia Networks, "NB-PUSCH Design for NS-IOT", 3GPP Tsg RAN1 NB-IOT adhoc, R1-160008, 9 Pages total, (Jan. 18-20, 2016).
3GPP TR 38.913 V0.2.0 (Feb. 2016), Technical Report, "3rd Generation Partnership Project; Technical Specification Group Radio Access Network; Study on Scenarios and Requirements for Next Generation Access Technologies; (Release 14)," Feb. 2016, pp. 1-19.
Guangdong Oppo Mobile Telecom, "Frame structure supporting flexible parameter allocations," R1-164472, 3GPP TSG-RAN WGI Meeting #85 R1-164472, Nanjing, China, May 23-27, 2016, pp. 1-3.
Intel Corporation, "Frame structure for new radio interface," R1-162726, 3GPP TSG-RAN WGI Meeting #84bis, Busan, Korea, Apr. 11-15, 2016, pp. 1-6.
Lenovo, "Frame structure design for next radio interface," R1-162743, 3GPP TSG-RAN WGI Meeting #84bis, Busan, Korea, Apr. 11-15, 2016, pp. 1-4.
ZTE, "Numerology design of new RAT," R1-162227, 3GPP TSG-RAN WGI Meeting #84bis, Busan, Korea, Apr. 11-15, 2016, pp. 1-6.
English-language Translation of International Search Report and Written Opinion for International Application No. PCT/JP2017/012527, dated Jun. 20, 2017.
Office Action dated Nov. 13, 2020, in Taiwanese Patent Application No. 106114521, 8 pages.
Guangdong OPPO Mobile Telecom, "Frame structure supporting flexible parameter allocations", 3GPP TSG-RAN WG1 Meeting #85 R1-164472, pp. 1-2, May 2016.
Intel Corporation, "Frame structure for new radio interface", 3GPP TSG-RAN WG1 Meeting #84bis R1-162726, pp. 1-5, Apr. 2016.
Lenovo, "Frame structure design for next radio interface", 3GPP TSG-RAN WG1 Meeting #84bis R1-162742, pp. 1-3, Apr. 2016.
ZTE, "Numerology design of new RAT", 3GPP TSG-RAN WG1 Meeting #84bis R1-162 227, pp. 1-5, Apr. 2016.

* cited by examiner

FIG. 5

| | SUB CARRIER INTERVAL | MAXIMUM BANDWIDTH OF COMPONENT CARRIER | CP LENGTH TYPE | NUMBER OF SYMBOLS PER SUB FRAME | SUB FRAME LENGTH | WIRELESS FRAME LENGTH | NUMBER OF SUB CARRIERS PER RESOURCE BLOCK IN NR CELL |
|---|---|---|---|---|---|---|---|
| PARAMETER SET 0 | 15 kHz | 20MHz | TYPE 1 | 14 | 1ms | 10ms | 12 |
| PARAMETER SET 1 | 7.5 kHz | 1.4MHz | TYPE 1 | 70 | 10ms | 10ms | 24 |
| PARAMETER SET 2 | 30 kHz | 80MHz | TYPE 1 | 7 | 0.25ms | 10ms | 6 |
| PARAMETER SET 3 | 15 kHz | 20MHz | TYPE 2 | 12 | 1ms | 10ms | 12 |
| ... | ... | ... | ... | ... | ... | ... | ... |

BASE STATION DEVICE, TERMINAL DEVICE, METHOD, AND STORAGE MEDIUM

TECHNICAL FIELD

The present disclosure relates to a base station device, a terminal device, a method, and a storage medium.

BACKGROUND ART

Wireless access schemes and wireless networks of cellular mobile communication (hereinafter also referred to as Long Term Evolution (LTE), LTE-Advanced (LTE-A), LTE-Advanced Pro (LTE-A Pro), New Radio (NR), New Radio Access Technology (NRAT), Evolved Universal Terrestrial Radio Access (EUTRA), or Further EUTRA (FEUTRA)) are under review in 3rd Generation Partnership Project (3GPP). Further, in the following description, LTE includes LTE-A, LTE-A Pro, and EUTRA, and NR includes NRAT and FEUTRA. In LTE and NR, a base station device (base station) is also referred to as an evolved Node B (eNodeB), and a terminal device (a mobile station, a mobile station device, or a terminal) is also referred to as a user equipment (UE). LTE and NR are cellular communication systems in which a plurality of areas covered by a base station device are arranged in a cell form. A single base station device may manage a plurality of cells.

NR is a different Radio Access Technology (RAT) from LTE as a wireless access scheme of the next generation of LTE. NR is an access technology capable of handling various use cases including Enhanced Mobile broadband (eMBB), Massive Machine Type Communications (mMTC), and ultra reliable and Low Latency Communications (URLLC). NR is reviewed for the purpose of a technology framework corresponding to use scenarios, request conditions, placement scenarios, and the like in such use cases. The details of the scenarios or request conditions of NR are disclosed in Non-Patent Literature 1.

CITATION LIST

Non-Patent Literature

Non-Patent Literature 1: 3rd Generation Partnership Project; Technical Specification Group Radio Access Network; Study on Scenarios and Requirements for Next Generation Access Technologies; (Release 14), 3GPP TR 38.913 V0. 2.0 (2016-02). Internet <URL: http://www.3gpp.org/ftp/Specs/archive/38_series/38.913/38913-020.zip>

DISCLOSURE OF INVENTION

Technical Problem

In wireless access technology, it is preferable that parameters (physical parameters) of transmission signals or the like such as a sub carrier interval and a symbol length be optimally designed in accordance with the use case. However, in review of an extension technology of LTE, it is important to a terminal device using the extension technology to perform multiplexing with an LTE terminal device according to a related art from the viewpoint of frequency utilization efficiency. For this reason, backward compatibility is required for the extension technology in LTE, and restrictions may be imposed on the extension technology accordingly. As a result, such restrictions can influence the transmission efficiency of the entire system.

The present disclosure was made in light of the above problem, and it is an object to provide a base station device, a terminal device, a communication system, a communication method, and an integrated circuit which are capable of significantly improving the transmission efficiency of the entire system by being flexibly designed in accordance with various use cases in a communication system in which a base station device and a terminal device communicate with each other.

Solution to Problem

According to the present disclosure, there is provided a base station device, including; a control unit configured to variably set a sub carrier interval and a symbol length used for communication, and notify of information for switching a parameter set indicating the sub carrier interval and the symbol length in accordance with setting content.

In addition, according to the present disclosure, there is provided a terminal device, including: a control unit configured to receive a resource in which a sub carrier interval and a symbol length are variably set on a basis of information notified of to switch a parameter set indicating the sub carrier interval and the symbol length in accordance with setting content.

In addition, according to the present disclosure, there is provided a method, including: variably setting, by a processor, a sub carrier interval and a symbol length used for communication and notifying of information for switching a parameter set indicating the sub carrier interval and the symbol length in accordance with setting content.

In addition, according to the present disclosure, there is provided a method, including: receiving, by a processor, a resource in which a sub carrier interval and a symbol length are variably set on a basis of information notified of to switch a parameter set indicating the sub carrier interval and the symbol length in accordance with setting content.

In addition, according to the present disclosure, there is provided a storage medium having a program stored therein, the program causing a computer to function as: a control unit configured to variably set a sub carrier interval and a symbol length used for communication and notify of information for switching a parameter set indicating the sub carrier interval and the symbol length in accordance with setting content.

In addition, according to the present disclosure, there is provided a storage medium having a program stored therein, the program causing a computer to function as: a control unit configured to receive a resource in which a sub carrier interval and a symbol length are variably set on a basis of information notified of to switch a parameter set indicating the sub carrier interval and the symbol length in accordance with setting content.

Advantageous Effects of Invention

As described above, according to the present disclosure, it is possible to improve the transmission efficiency in the wireless communication system in which the base station device and the terminal device communicate with each other. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram illustrating examples of parameter sets related to a transmission signal in mi NR cell.

MODE(S) FOR CARRYING OUT THE INVENTION

Figure 1:
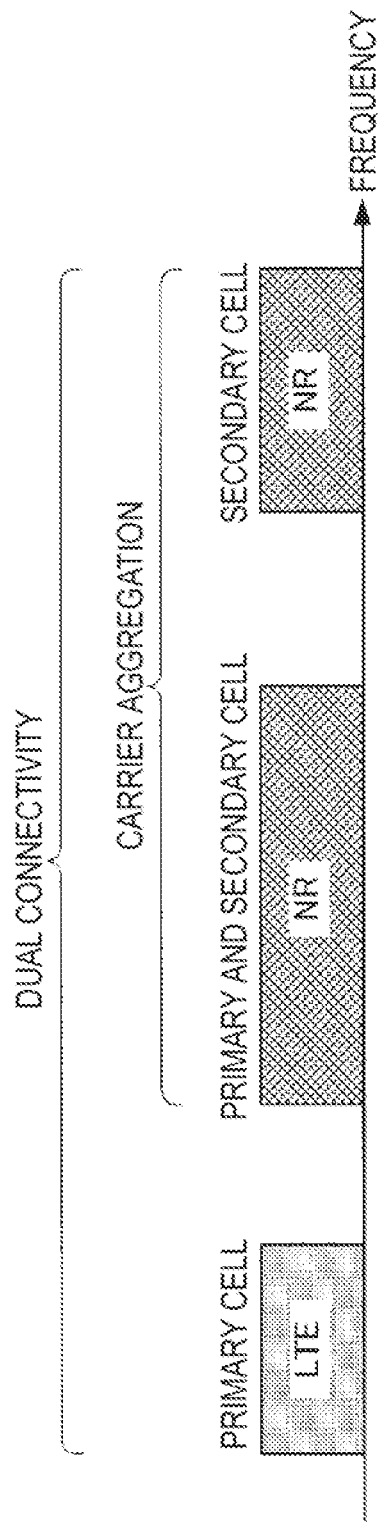
FIG. 1 is a diagram illustrating an example of setting of a component carrier according to the present embodiment.

Hereinafter, (a) preferred embodiments) of the present disclosure will be described in detail with reference to the appended drawings. Note that, in tins specification and the appended drawings, structural elements that have substantially the same function and structure are denoted with the same reference numerals, and repeated explanation of these structural elements is omitted. Further, technologies, functions, methods, configurations, and procedures to be described below and all other descriptions can be applied to LTE and NR unless particularly stated otherwise.

<Wireless Communication System in the Present Embodiment>

In the present embodiment, a wireless communication system includes at least a base station device 1 and a terminal device 2. The base station device 1 can accommodate multiple terminal devices. The base station device 1 can be connected with another base station device by means of an X2 interface. Further, the base station device 1 can be connected to an evolved packet core (EPC) by means of an S1 interface. Further, the base station device 1 can be connected to a mobility management entity (MME) by means of an S1-MME interface and can be connected to a serving gateway (S-GW) by means of an S1-U interface. The S1 interface supports many-to-many connection between the MME and/or the S-GW and the base station device 1. Further, in the present embodiment, the base station device 1 and the terminal device 2 each support LTE and/or NR.

<Wireless Access Technology According to Present Embodiment>

In the present embodiment, the base station device 1 and the terminal device 2 each support one or more wireless access technologies (RATs). For example, an RAT includes LTE and NR. A single RAT corresponds to a single cell (component carrier). That is, in a case in which a plurality of RATs are supported, the RATs each correspond to different cells. In the present embodiment, a cell is a combination of a downlink resource, an uplink resource, and/or a sidelink. Further, in the following description, a cell corresponding to LTE is referred to as an LTE cell and a cell corresponding to NR is referred to as an NR cell.

Downlink communication is communication from the base station device 1 to the terminal device 2. Downlink transmission is transmission from the base station device 1 to the terminal device 2 and is transmission of a downlink physical channel and/or a downlink physical signal. Uplink communication is communication from the terminal device 2 to the base station device 1. Uplink transmission is transmission from the terminal device 2 to the base station device 1 and is transmission of an uplink physical channel and/or an uplink physical signal. Sidelink communication is communication from the terminal device 2 to another terminal device 2. Sidelink transmission is transmission from the terminal device 2 to another terminal device 2 and is transmission of a sidelink physical channel and/or a sidelink physical signal.

The sidelink communication is defined for contiguous direct detection and contiguous direct communication between terminal devices. The sidelink communication, a frame configuration similar to that of the uplink and downlink can be used. Further, the sidelink communication can be restricted to some (sub sets) of uplink resources and/or downlink resources.

The base station device 1 and the terminal device 2 can support communication in which a set of one or more cells is used in a downlink, an uplink, and/or a sidelink. A set of a plurality of cells is also referred to as carrier aggregation or dual connectivity. The details of the carrier aggregation and the dual connectivity will be described below. Further, each cell uses a predetermined frequency bandwidth. A maximum value, a minimum value, and a settable value in the predetermined frequency bandwidth can be specified in advance.

FIG. 1 is a diagram illustrating an example of setting of a component carrier according to the present embodiment, in the example of FIG. 1, one LTE cell and two NR cells are set. One LTE cell is set as a primary cell. Two NR cells are set as a primary and secondary cell and a secondary cell. Two NR cells are integrated by the carrier aggregation. Further, the LTE cell and the NR cell are integrated by the dual connectivity. Note that the LTE, cell and the NR cell may be integrated by carrier aggregation. In the example of FIG. 1, NR may not support some functions such as a function of performing standalone communication since connection can be assisted by an LTE cell which is a primary cell. The function of performing standalone communication includes a function necessary for initial connection.

Figure 2:
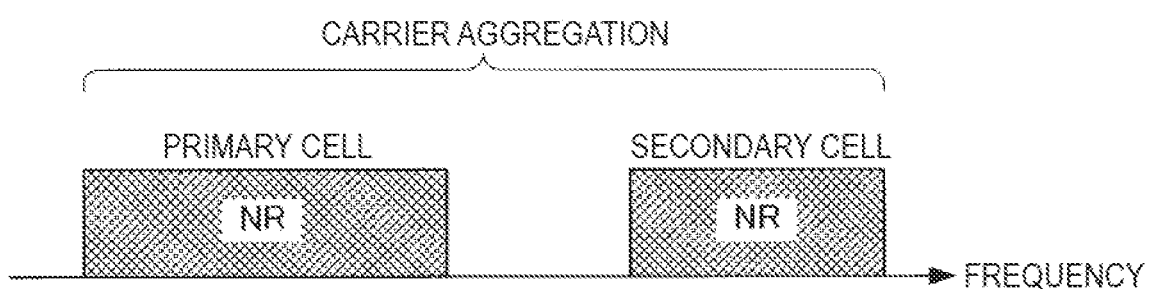
FIG. 2 is a diagram illustrating an example of setting of a component carrier according to the present embodiment.

FIG. 2 is a diagram illustrating an example of setting of a component carrier according to the present embodiment, in the example of FIG. 2, two NR cells are set. The two NR cells are set as a primary cell and a secondary cell, respectively, and are integrated by carrier aggregation. In this case, when the NR cell supports the function of performing standalone communication, assist of the LTE cell is not necessary. Note that the two NR cells may be integrated by dual connectivity.

In the present embodiment, a radio frame configured with 10 ms (milliseconds) is specified. Each radio frame includes two half frames. A time interval of the half frame is 5 ms. Each half frame includes 5 sub frames. The time interval of the sub frame is 1 ms and is defined by two successive slots. The time interval of the slot is 0.5 ms. An i-th sub frame in the radio frame includes a (2×i)-th slot and a (2×i+1)-th slot. In other words, 10 sub frames are specified in each of the radio frames.

Sub frames include a downlink sub frame, an uplink sub frame, a special sub frame, a sidelink sub frame, and the like.

The downlink sub frame is a sub frame reserved for downlink transmission. The uplink sub frame is a sub frame reserved for uplink transmission. The special sub frame includes three fields. The three fields are a Downlink Pilot Time Slot (DwPTS), a Guard Period (GP), and an Uplink Pilot Time Slot (UpPTS). A total length of DwPTS, GP, and UpPTS is 1 ms. The DwPTS is a field reserved for downlink transmission. The UpPTS is a field reserved for uplink transmission. The GP is a field in which downlink transmission and uplink transmission are not performed. Further, the special sub frame may include only the DwPTS and the GP or may include only the GP and the UpPTS. The special sub frame is placed between the downlink sub frame and the uplink sub frame in TDD and used to perform switching from the downlink sub frame to the uplink sub frame. The sidelink sub frame is a sub frame reserved or set for sidelink communication. The sidelink is used for contiguous direct communication and contiguous direct detection between terminal devices.

A single radio frame includes a downlink sub frame, an uplink sub frame, a special sub frame, and/or a sidelink sub frame. Further, a single radio frame includes only a downlink sub frame, an uplink sub frame, a special sub frame, or a sidelink sub frame.

A plurality of radio frame configurations are supported. The radio frame configuration is specified by the frame configuration type. The frame configuration type 1 can be applied only to FDD. The frame configuration type 2 can be applied only to TDD. The frame configuration type 3 can be applied only to an operation of a licensed assisted access (LAA) secondary cell.

In the frame configuration type 2, a plurality of uplink-downlink configurations are specified. In the uplink-downlink configuration, each of 10 sub frames in one radio frame corresponds to one of the downlink sub frame, the uplink sub frame, and the special sub frame. The sub frame 0, the sub frame 5 and the DwPTS are constantly reserved for downlink transmission. The UpPTS and the sub frame just after the special sub frame are constantly reserved for uplink transmission.

In the frame configuration type 3, 10 sub frames in one radio frame are reserved for downlink transmission. The terminal device 2 treats a sub frame by which PDSCH or a detection signal is not transmitted, as an empty sub frame. Unless a predetermined signal, channel and/or downlink transmission is detected in a certain sub frame, the terminal device 2 assumes that there is no signal and/or channel in the sub frame. The downlink transmission is exclusively occupied by one or more consecutive sub frames. The first sub frame of the downlink transmission may be started from any one in that sub frame. The last sub frame of the downlink transmission may be either completely exclusively occupied or exclusively occupied by a time interval specified in the DwPTS.

Further, in the frame configuration type 3, 10 sub frames in one radio frame may be reserved for uplink transmission. Further, each of 10 sub frames in one radio frame may correspond to any one of the downlink sub frame, the uplink sub frame, the special sub frame, and the sidelink sub frame.

The base station device 1 may transmit a downlink physical channel and a downlink physical signal in the DwPTS of the special sub frame. The base station device 1 can restrict transmission of the PBCH in the DwPTS of the special sub frame. The terminal device 2 may transmit uplink physical channels and uplink physical signals in the UpPTS of the special sub frame. The terminal device 2 can restrict transmission of some of the uplink physical channels and the uplink physical signals in the UpPTS of the special sub frame.

Note that a time interval in single transmission is referred to as a transmission time interval (TTI) and 1 ms (1 sub frame) is defined as 1 TTI in LTE.

<Frame Configuration of LTE in Present Embodiment>

Figure 3:
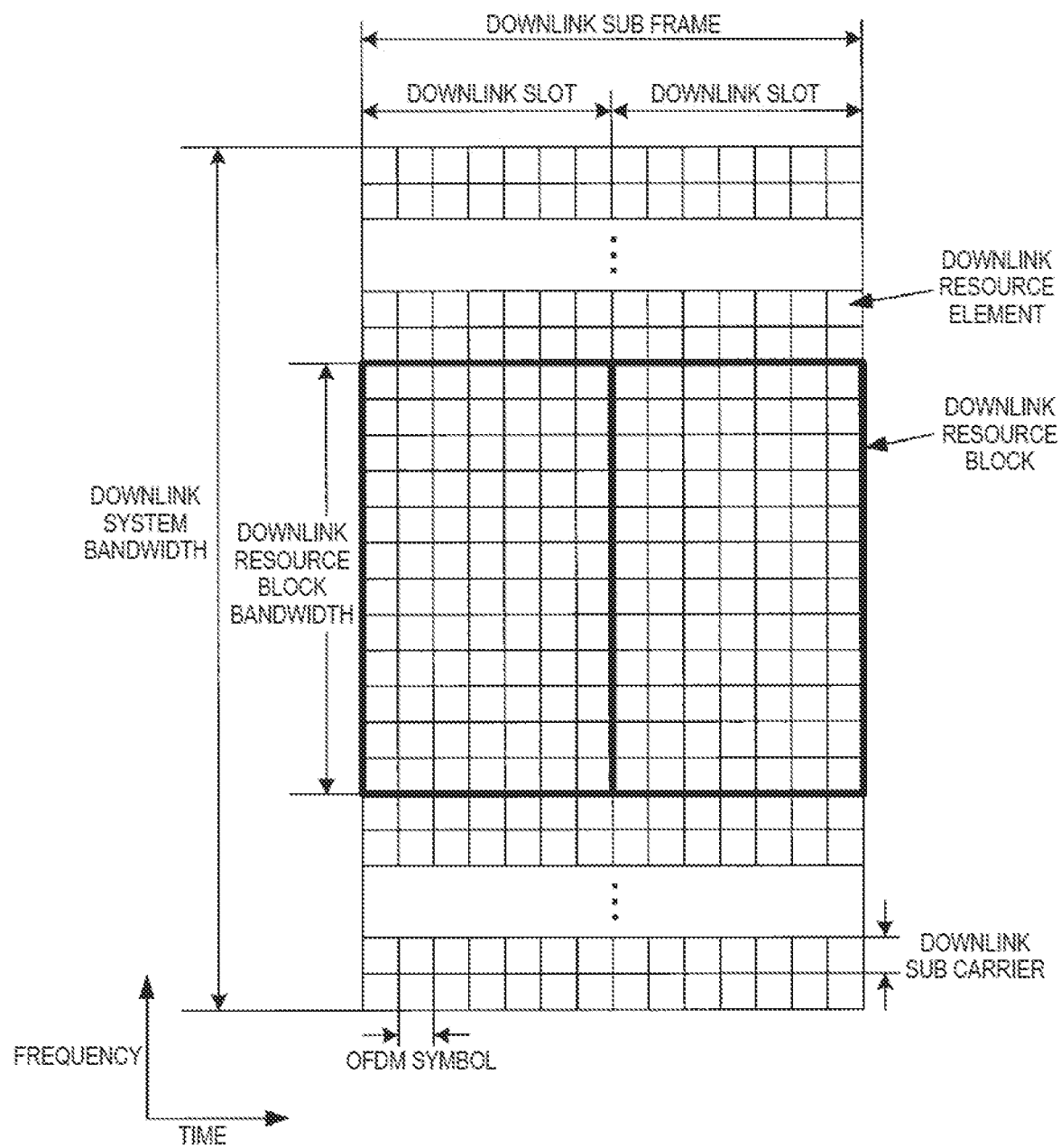
FIG. 3 is a diagram illustrating an example of a downlink sub frame of LTE according to the present embodiment.

FIG. 3 is a diagram illustrating an example of a downlink sub frame of LTE according to the present embodiment. The diagram illustrated in FIG. 3 is referred to as a downlink resource grid of LTE. The base station device 1 can transmit a downlink physical channel of LTE and/or a downlink physical signal of LTE in a downlink sub frame to the terminal device 2. The terminal device 2 can receive a downlink physical channel of LTE and/or a downlink physical signal of LTE in a downlink sub frame from the base station device 1.

Figure 4:
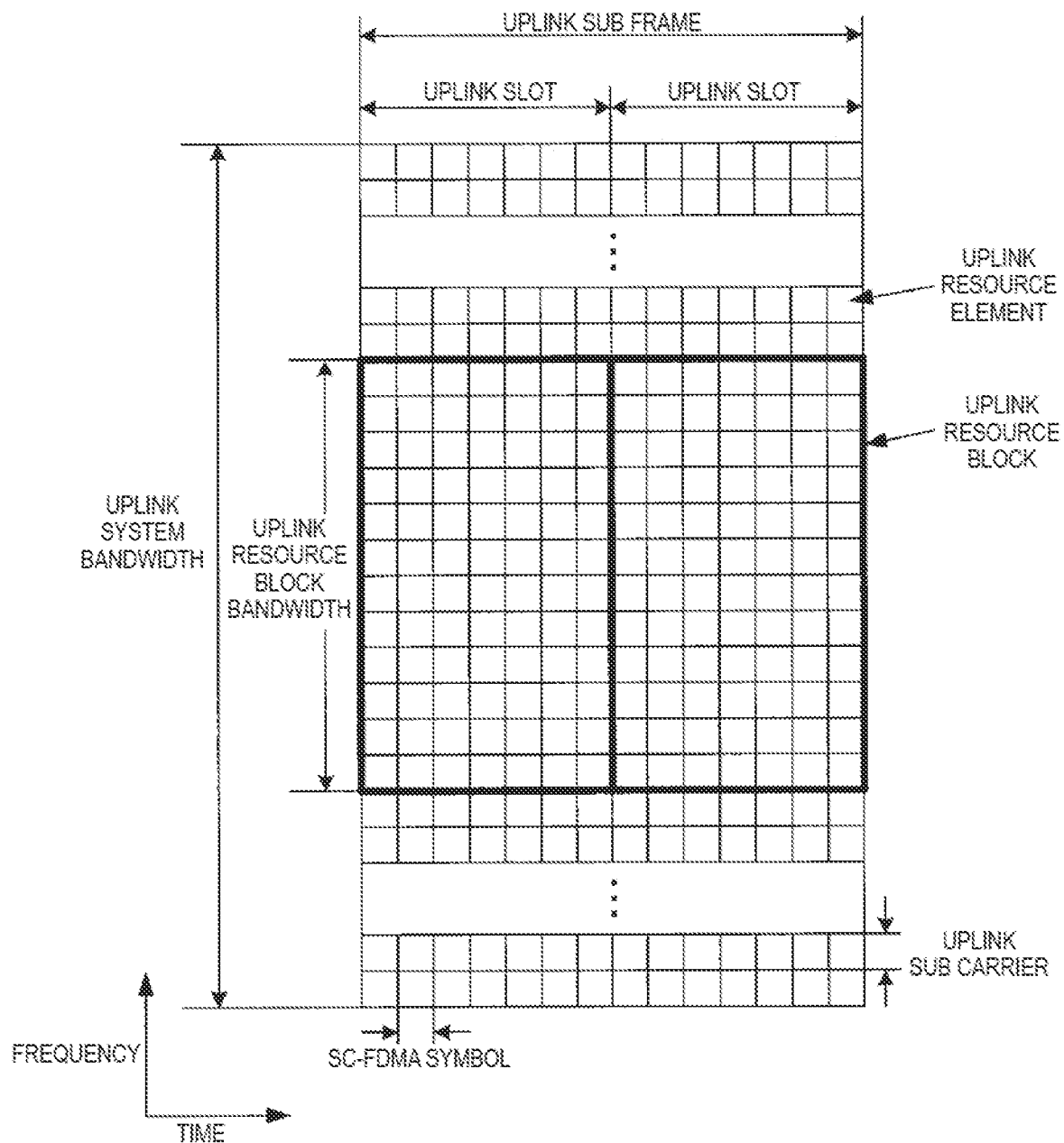
FIG. 4 is a diagram illustrating an example of an uplink sub frame of LTE according to the present embodiment.

FIG. 4 is a diagram illustrating an example of an uplink sub frame of LTE according to the present embodiment. The diagram illustrated in FIG. 4 is referred to as an uplink resource grid of LTE. The terminal device 2 can transmit an uplink physical channel of LTE and/or an uplink physical signal of LTE in an uplink sub frame to the base station device 1. The base station device 1 can receive an uplink physical channel of LTE and/or an uplink physical signal of LTE in an uplink sub frame from the terminal device 2.

In the present embodiment, the LTE physical resources can be defined as follows. One slot is defined by a plurality of symbols. The physical signal or the physical channel transmitted in each of the slots is represented by a resource grid. In the downlink, the resource grid is defined by a plurality of sub carriers in a frequency direction and a plurality of OFDM symbols in a time direction. In the uplink, the resource grid is defined by a plurality of sub carriers in the frequency direction and a plurality of SC-FDMA symbols in the time direction. The number of sub carriers or the number of resource blocks may be decided depending on a bandwidth of a cell. The number of symbols in one slot is decided by a type of cyclic prefix (CP). The type of CP is a normal CP or an extended CP. In the normal CP, the number of OFDM symbols or SC-FDMA symbols constituting one slot is 7. In the extended CP, the number of OFDM symbols or SC-FDMA symbols constituting one slot is 6. Each element in the resource grid is referred to as a resource element. The resource element is identified using an index (number) of a sub carrier and an index (number) of a symbol. Further, in the description of the present embodiment, the OFDM symbol or SC-FDMA symbol is also referred to simply as a symbol.

The resource blocks are used for mapping a certain physical channel (the PDSCH, the PUSCH, or the like) to resource elements. The resource blocks include virtual resource blocks and physical resource blocks. A certain physical channel is mapped to a virtual resource block. The virtual resource blocks are mapped to physical resource blocks. One physical resource block is defined by a predetermined number of consecutive symbols in the time domain. One physical resource block is defined from a predetermined number of consecutive sub carriers in the frequency domain. The number of symbols and the number of sub carriers in one physical resource block are decided on the basis of a parameter set in accordance with a type of CP, a sub carrier interval, and/or a higher layer in the cell. For example, in a case in which the type of CP is the normal CP, and the sub carrier interval is 15 kHz, the number of symbols in one physical resource block is 7, and the number of sub carriers is 12. In this case, one physical resource block includes (7×12) resource elements. The physical resource blocks are numbered from 0 in the frequency domain. Further, two resource blocks in one sub frame corresponding to the same physical resource block number are defined as a physical resource block pair (a PRB pair or an RB pair).

In each LTE cell, one predetermined parameter is used in a certain sub frame. For example, the predetermined parameter is a parameter (physical parameter) related to a transmission signal. Parameters related to the transmission signal include a CP length, a sub carrier interval the number of symbols in one sub frame (predetermined time length), the number of sub carriers in one resource block (predetermined frequency band), a multiple access scheme, a signal waveform, and the like.

That is, in the LTE cell, a downlink signal and an uplink signal are each generated using one predetermined parameter in a predetermined time length (for example, a sub frame). In other words, in the terminal device 2, it is assumed that a downlink signal to be transmitted from the base station device 1 and an uplink signal to be transmitted to the base station device 1 are each generated with a predetermined time length with one predetermined parameter. Further, the base station device 1 is set such that a downlink signal to be transmitted to the terminal device 2 and an uplink signal to be transmitted from the terminal device 2 are each generated with a predetermined time length with one predetermined parameter.

<Frame Configuration of NR in Present Embodiment>

In each NR cell, one or more predetermined parameters are used in a certain predetermined time length (for example, a sub frame). That is, in the NR cell, a downlink signal and an uplink signal are each generated using or more predetermined parameters in a predetermined time length. In other words, in the terminal device 2, it is assumed that a downlink signal to be transmitted from the base station device 1 and an uplink signal to be transmitted to the base station device 1 are each generated with one or more predetermined parameters in a predetermined time length. Further, the base station device 1 is set such that a downlink signal to be transmitted to the terminal device 2 and an uplink signal to be transmitted from the terminal device 2 are each generated with a predetermined time length using one or more predetermined parameters. In a case in which the plurality of predetermined parameters are used, a signal generated using the predetermined parameters is multiplexed in accordance with a predetermined method. For example, the predetermined method includes Frequency Division Multiplexing (FDM), Time Division Multiplexing (TDM), Code Division Multiplexing (CDM), and/or Spatial Division Multiplexing (SDM).

In a combination of the predetermined parameters set in the NR cell, a plurality of kinds of parameter sets can be specified in advance.

FIG. 5 is a diagram illustrating examples of the parameter sets related to a transmission signal in the NR cell. In the example of FIG. 5, parameters of the transmission signal included in the parameter sets include a sub carrier interval, the number of sub carriers per resource block in the NR cell, the number of symbols par sub frame, and a CP length type. The CP length type is a type of CP length used in the NR cell. For example, CP length type 1 is equivalent to a normal CP in LTE and CP length type 2 is equivalent to an extended CP in LTE.

The parameter sets related to a transmission signal in the NR cell can be specified individually with a downlink and an uplink. Further, the parameter sets related to a transmission signal in the NR cell can be set independently with a downlink and an uplink.

Figure 6:
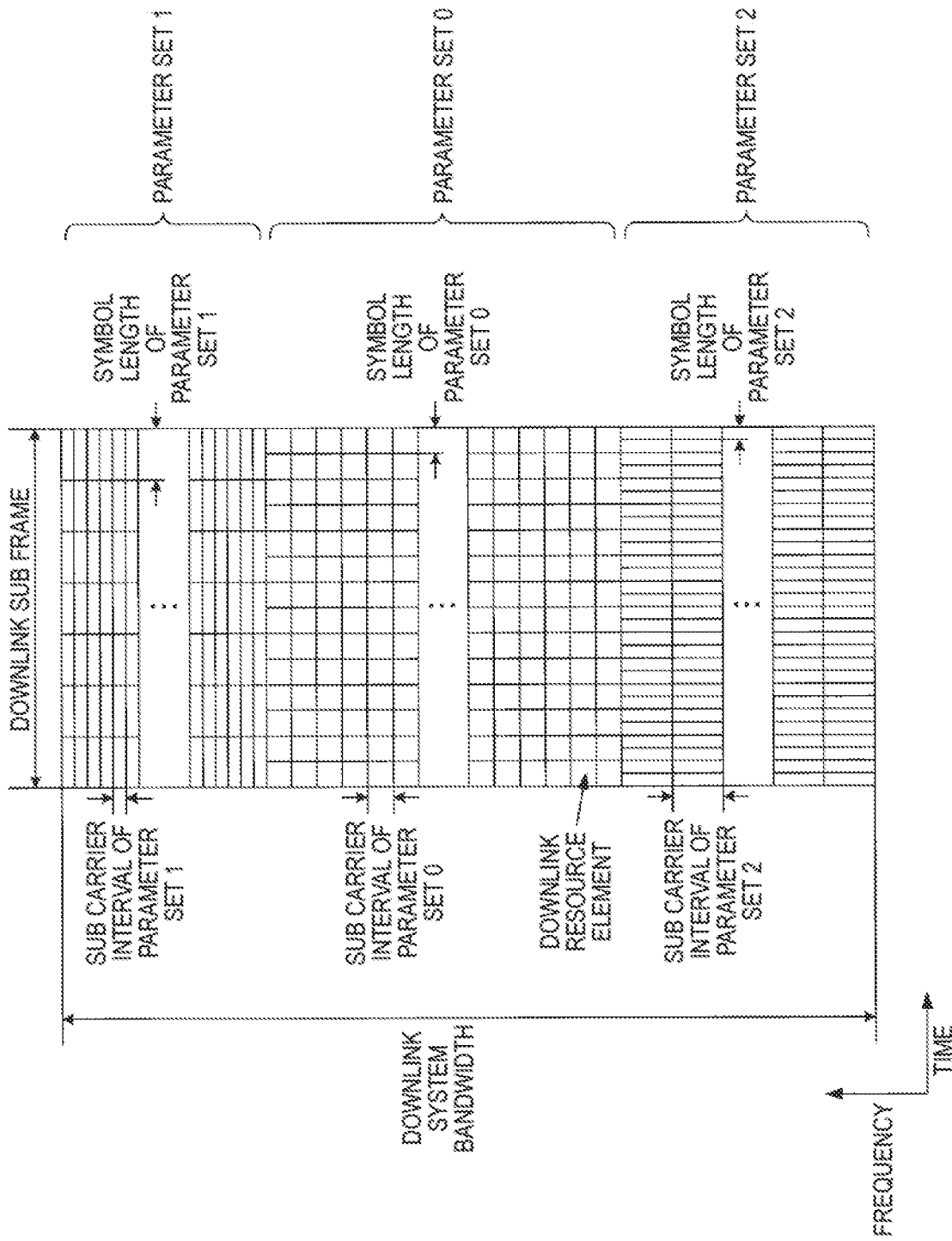
FIG. 6 is a diagram illustrating an example of an NR downlink sub frame of the present embodiment.

FIG. 6 is a diagram illustrating an example of an NR downlink sub frame of the present embodiment, in the example of FIG. 6, signals generated using parameter set 1, parameter set 0, and parameter set 2 are subjected to FDM in a cell (system bandwidth). The diagram illustrated in FIG. 6 is also referred to as a downlink resource grid of NR. The base station device 1 can transmit the downlink physical channel of NR and/or the downlink physical signal of NR in a downlink sub frame to the terminal device 2. The terminal device 2 can receive a downlink physical channel of NR and/or the downlink physical signal of NR in a downlink sob frame from the base station device 1.

Figure 7:
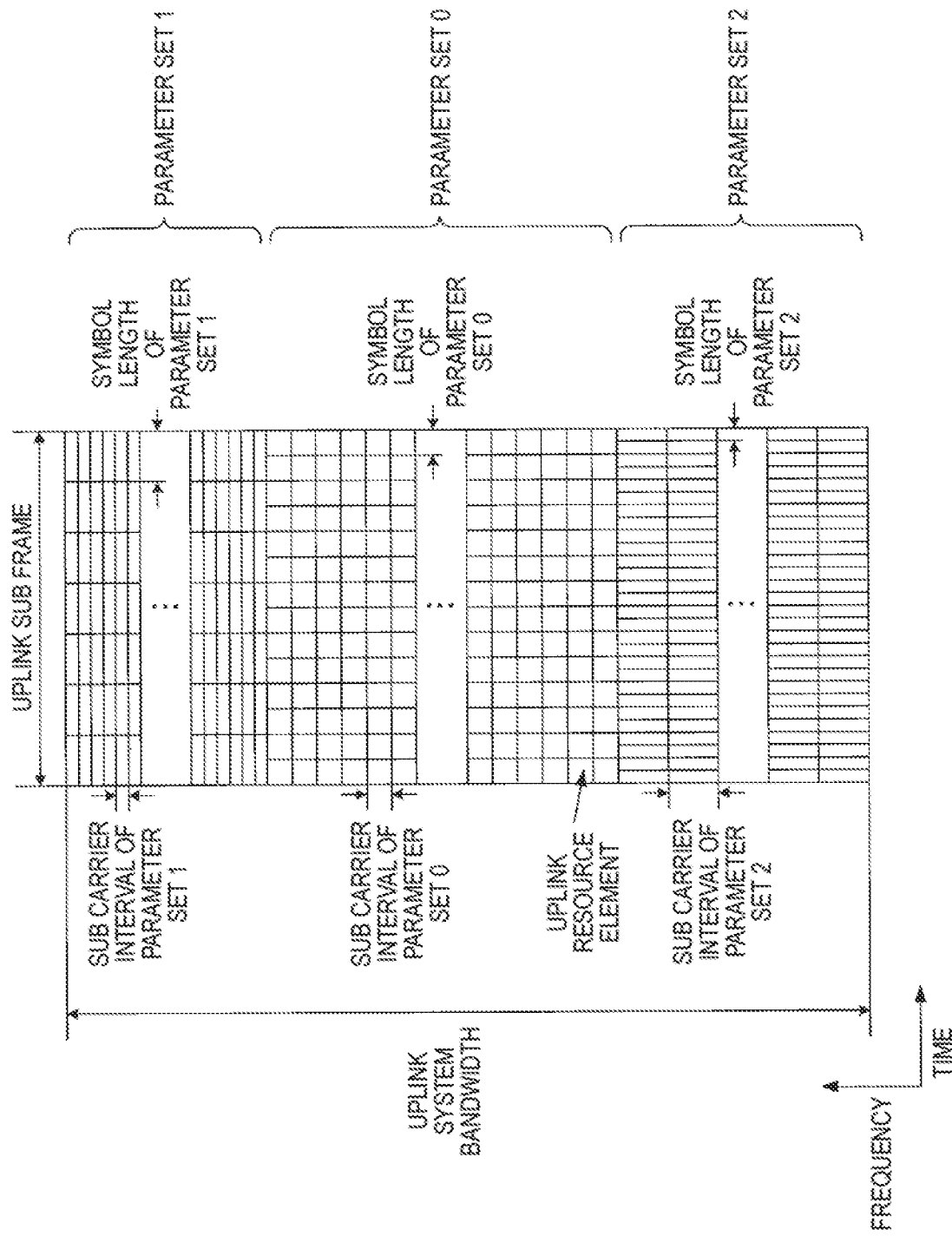
FIG. 7 is a diagram illustrating an example of an NR uplink sub frame of the present embodiment.

FIG. 7 is a diagram illustrating an example of an NR uplink sub frame of the present embodiment. In the example of FIG. 7, signals generated using parameter set 1, parameter set 0, and parameter set 2 are subjected to FDM in a cell (system bandwidth). The diagram illustrated in FIG. 7 is also referred to as an uplink resource grid of NR. The base station device 1 can transmit the uplink physical channel of NR and/or the uplink physical signal of NR in an uplink sub frame to the terminal device 2. The terminal device 2 can receive an uplink physical channel of NR and/or the uplink physical signal of NR in an uplink sub frame from the base station device 1.

<Antenna Port in Present Embodiment>

An antenna port is defined so that a propagation channel carrying a certain symbol can be inferred from a propagation channel carrying another symbol in the same antenna port. For example, different physical resources in the same antenna port can be assumed to be transmitted through the same propagation channel. In other words, for a symbol in a certain antenna port, it is possible to estimate and demodulate a propagation channel in accordance with the reference signal in the antenna port. Further, there is one resource grid for each antenna port. The antenna port is defined by the reference signal. Further, each reference signal can define a plurality of antenna ports.

The antenna port is specified or identified with an antenna port number. For example, antenna ports 0 to 3 are antenna ports with which CRS is transmitted. That is, the PDSCH transmitted with antenna ports 0 to 3 can be demodulated to CRS corresponding to antenna ports 0 to 3.

In a case in which two antenna ports satisfy a predetermined condition, the two antenna ports can be regarded as being a quasi co-location (QCL). The predetermined condition is that a wide area characteristic of a propagation channel carrying a symbol in one antenna port can be inferred from a propagation channel carrying a symbol in another antenna port. The wide area characteristic includes a delay dispersion, a Doppler spread, a Doppler shift, an average gain, and/or an average delay.

In the present embodiment, the antenna port numbers may be defined differently for each RAT or may be defined commonly between RATs. For example, antenna ports 0 to 3 in LTE are antenna ports with which CRS is transmitted. In the NR, antenna ports 0 to 3 can be set as antenna ports with which CRS similar to that of LTE is transmitted. Further, in NR, the antenna ports with which CRS is transmitted like LTE can be set as different antenna port numbers from antenna ports 0 to 3. In the description of the present embodiment, predetermined antenna port numbers can be applied to LTE and/or NR.

<Physical Channel and Physical Signal in Present Embodiment>

In the present embodiment, physical channels and physical signals are used.

The physical channels include a downlink physical channel, an uplink physical channel, and a sidelink physical channel. The physical signals include a downlink physical signal, an uplink physical signal, and a sidelink physical signal.

In LTE, a physical channel and a physical signal are referred to as an LTE physical channel and an LTE physical signal. In NR, a physical channel and a physical signal are referred to as an NR physical channel and an NR physical signal. The LTE physical channel and the NR physical channel can be defined as different physical channels, respectively. The LTE physical signal and the NR physical signal can be defined as different physical signals, respectively. In the description of the present embodiment, the LTE physical channel and the NR physical channel are also simply referred to as physical channels, and the LTE physical signal and the NR physical signal are also simply referred to as physical signals. That is, the description of the physical channels can be applied to any of the LTE physical channel and the NR physical channel. The description of the physical signals can be applied to any of the LTE physical signal and the NR physical signal.

<NR Physical Channel and NR Physical Signal in Present Embodiment>

As described above, the description of the physical channel and the physical signal can also be applied to the NR physical channel and the NR physical signal, respectively. The NR physical channel and the NR physical signal are referred to as the following.

The NR downlink physical channel includes an NR-PBCH, an NR-PCFICH, an NR-PHICH, an NR-PDCCH, an NR-EPDCCH, an NR-MPDCCH, an NR-R-PDCCH, an NR-PDSCH, an NR-PMCH, and the like.

The NR downlink physical signal includes an NR-SS, an NR-DL-RS, an NR-DS, and the like. The NR-SS includes an NR-PSS, an NR-SSS, and the like. The NR-RS includes an NR-CRS, an NR-PDSCH-DMRS, an NR-EPDCCH-DMRS, an NR-PRS, an NR-CSI-RS, an NR-TRS, and the like.

The NR uplink physical channel includes an NR-PUSCH, an NR-PUCCH, an NR-PRACH, and the like.

The NR uplink physical signal includes an NR-UL-RS. The NR-UL-RS includes an NR-UL-DMRS, an NR-SRS, and the like.

The NR sidelink physical channel includes an NR-PSBCH, an NR-PSCCH, an NR-PSDCH, an NR-PSSCH, and the like.

<Downlink Physical Channel in Present Embodiment>

The PBCH is used to broadcast a master information block (MIB) which is broadcast information specific to a serving cell of the base station device 1. The PBCH is transmitted only through the sub frame 0 in the radio frame. The MIB can be updated at intervals of 40 ms. The PBCH is repeatedly transmitted with a cycle of 10 ms. Specifically initial transmission of the MIB is performed in the sub frame 0 in the radio frame satisfying a condition that a remainder obtained by dividing a system frame number (SFN) by 4 is 0, and retransmission (repetition) of the MIB is performed in the sub frame 0 in all the other radio frames. The SFN is a radio frame number (system frame number). The MIB is system information. For example, the MIB includes information indicating the SFN.

The PCFICH is used to transmit information related to the number of OFDM symbols used for transmission of the PDCCH. A region indicated by PCFICH is also referred to as a PDCCH region. The information transmitted through the PCFICH is also referred to as a control format indicator (CFI).

The PHICH is used to transmit an HARQ-ACK (an HARQ indicator, HARQ feedback, and response information) indicating ACKnowledgment (ACK) or negative ACKnowledgment (NACK) of uplink data (an uplink shared channel (UL-SCH)) received by the base station device 1. For example, in a case in which the HARQ-ACK indicating ACK is received by the terminal device 2, corresponding uplink data is not retransmitted. For example, in a case in which the terminal device 2 receives the HARQ-ACK indicating NACK, the terminal device 2 retransmits corresponding uplink data through a predetermined uplink sub frame. A certain PHICH transmits the HARQ-ACK for certain uplink data. The base station device 1 transmits each HARQ-ACK to a plurality of pieces of uplink data included in the same PUSCH using a plurality of PHICHs.

The PDCCH and the EPDCCH are used to transmit downlink control information (DCI). Mapping of an information bit of the downlink control information is defined as a DCI format. The downlink control information includes a downlink grant and an uplink grant. The downlink grant is also referred to as a downlink assignment or a downlink allocation.

The PDCCH is transmitted by a set of one or more consecutive control channel elements (CCEs). The CCE includes 9 resource element groups (REGs). An REG includes 4 resource elements, in a case in which the PDCCH is constituted by n consecutive CCEs, the PDCCH starts with a CCE satisfying a condition that a remainder after dividing an index (number) i of the CCE by n is 0.

The EPDCCH is transmitted by a set of one or more consecutive enhanced control channel elements (ECCEs). The ECCE is constituted by a plurality of enhanced resource element groups (EREGs).

The downlink grant is used for scheduling of the PDSCH in a certain cell. The downlink grant is used for scheduling of the PDSCH in the same sob frame as a sub frame in which the downlink grant is transmitted. The uplink grant is used for scheduling of the PUSCH in a certain cell. The uplink grant is used for scheduling of a single PUSCH in a fourth sub frame from a sub frame in which the uplink grant is transmitted or later.

A cyclic redundancy check (CRC) parity bit is added to the DCI. The CRC parity bit is scrambled using a radio network temporary identifier (RNTI). The RNTI is an identifier that can be specified or set in accordance with a purpose of the DCI or the like. The RNTI is an identifier specified in a specification in advance, an identifier set as information specific to a cell, an identifier set as information specific to the terminal device 2, or an identifier set as information specific to a group to which the terminal device 2 belongs. For example, in monitoring of the PDCCH or the EPDCCH, the terminal device 2 descrambles the CRC parity bit added to the DCI with a predetermined RNTI and identifies whether or not the CRC is correct. In a case in which the CRC is correct, the DCI is understood to be a DCI for the terminal device 2.

The PDSCH is used to transmit downlink data (a downlink shared channel (DL-SCH)). Further, the PDSCH is also used to transmit control information of a higher layer.

The PMCH is used to transmit multicast data (a multicast channel (MCH)).

In the PDCCH region, a plurality of PDCCHs may be multiplexed according to frequency, time, and/or space. In the EPDCCH region, a plurality of EPDCCHs may be multiplexed according to frequency, time, and/or space. In the PDSCH region, a plurality of PDSCHs may be multiplexed according to frequency, time, and/or space. The PDCCH, the PDSCH, and/or the EPDCCH may be multiplexed according to frequency, time, and/or space.

<Downlink Physical Signal in Present Embodiment>

A synchronization signal is used for the terminal device 2 to obtain downlink synchronization in the frequency domain and/or the time domain. The synchronization signal includes a primary synchronization signal (PSS) and a secondary synchronization signal (SSS). The synchronization signal is placed in a predetermined sub frame in the radio frame. For example, in the TDD scheme, the synchronization signal is placed in the sub frames 0, 1, 5, and 6 in the radio frame. In the FDD scheme, the synchronization signal is placed in the sub frames 0 and 5 in the radio frame.

The PSS may be used for coarse frame/symbol timing synchronization (synchronization in the time domain) or identification of a cell identification group. The SSS may be used for more accurate frame timing synchronization, cell identification, or CP length detection. In other words, frame timing synchronization and cell identification can be performed using the PSS and the SSS.

The downlink reference signal is used for the terminal device 2 to perform propagation path estimation of the downlink physical channel, propagation path correction, calculation of downlink channel state information (CSI), and/or measurement of positioning of the terminal device 2.

The CRS is transmitted in the entire band of the sub frame. The CRS is used for receiving (demodulating) the PBCH, the PDCCH, the PHICH, the PCFICH, and the PDSCH. The CRS may be used for the terminal device 2 to calculate the downlink channel state information. The PBCH, the PDCCH, the PHICH, and the PCFICH are transmitted through the antenna port used for transmission of the CRS. The CRS supports the antenna port configurations of 1, 2, or 4. The CRS is transmitted through one or more of the antenna ports 0 to 3.

The URS associated with the PDSCH is transmitted through a sub frame and a band used for transmission of the PDSCH with which the URS is associated. The URS is used for demodulation of the PDSCH to which the URS is associated. The URS associated with the PDSCH is transmitted through one or more of the antenna ports 5 and 7 to 14.

The PDSCH is transmitted through an antenna port used for transmission of the CRS or the URS on the basis of the transmission mode and the DCI format. A DCI format 1A is used for scheduling of the PDSCH transmitted through an antenna port used for transmission of the CRS. A DCI format 2D is used for scheduling of the PDSCH transmitted through an antenna port used for transmission of the URS.

The DMRS associated with the EPDCCH is transmitted through a sub frame and a band used for transmission of the EPDCCH to which the DMRS is associated. The DMRS is used for demodulation of the EPDCCH with which the DMRS is associated. The EPDCCH is transmitted through an antenna port used for transmission of the DMRS. The DMRS associated with the EPDCCH is transmitted through one or more of the antenna ports 107 to 114.

The CSI-RS is transmitted through a set sub frame. The resources in which the CSI-RS is transmitted are set by the base station device 1. The CSI-RS is used for the terminal device 2 to calculate the downlink channel state information. The terminal device 2 performs signal measurement (channel measurement) using the CSI-RS. The CSI-RS supports setting of some or all of the antenna ports 1, 2, 4, 8, 12, 16, 24, and 32. The CSI-RS is transmitted through one or more of the antenna ports 15 to 46. Further, an antenna port to be supported may be decided on the basis of a terminal device capability of the terminal device 2, setting of an RRC parameter, and/or a transmission mode to be set.

Resources of the ZP CSI-RS are set by a higher layer. Resources of the ZP CSI-RS may be transmitted with zero output power. In other words, the resources of the ZP CSI-RS may transmit nothing. The ZP PDSCH and the EPDCCH are not transmitted in the resources in which the ZP CSI-RS is set. For example, the resources of the ZP CSI-RS are used for a neighbor cell to transmit the NZP CSI-RS. Further, for example, the resources of the ZP CSI-RS are used to measure the CSI-IM. Further, for example, the resources of the ZP CSI-RS are resources with which a predetermined channel such as the PDSCH is not transmitted. In other words, the predetermined channel is mapped (to be rate-matched or punctured) except for the resources of the ZP CSI-RS.

<Uplink Physical Signal in Present Embodiment>

The PUCCH is a physical channel used for transmitting uplink control information (UCI). The uplink control information includes downlink channel state information (CSI), a scheduling request (SR) indicating a request for PUSCH resources, and a HARQ-ACK to downlink data (a transport block (TB) or a downlink-shared channel (DL-SCH)). The HARQ-ACK is also referred to as ACK/NACK, HARQ feedback, or response information. Further, the HARQ-ACK to downlink data indicates ACK, NACK, or DTX.

The PUSCH is a physical channel used for transmitting uplink data (uplink-shared channel (UL-SCH)). Further, the PUSCH may be used to transmit the HARQ-ACK and/or the channel state information together with uplink data. Further, the PUSCH may be used to transmit only the channel state information or only the HARQ-ACK and the channel state information.

The PRACH is a physical channel used for transmitting a random access preamble. The PRACH can be used for the terminal device 2 to obtain synchronization in the time domain with the base station device 1. Further, the PRACH is also used to indicate an initial connection establishment procedure (process), a handover procedure, a connection re-establishment procedure, synchronization (timing adjustment) for uplink transmission, and/or a request for PUSCH resources.

In the PUCCH region, a plurality of PUCCHs are frequency, time, space, and/or code multiplexed. In the PUSCH region, a plurality of PUSCHs may be frequency, time, space, and/or code multiplexed. The PUCCH and the PUSCH may be frequency, tune, space, and/or code multiplexed. The PRACH may be placed over a single sub frame or two sub frames. A plurality of PRACHs may be code-multiplexed.

<Physical Resources for Control Channel in Present Embodiment>

A resource element group (REG) is used to define mapping of the resource element and the control channel. For example, the REG is used for mapping of the PDCCH, the PHICH, or the PCFICH. The REG is constituted by four consecutive resource elements which are in the same OFDM symbol and not used for the CRS in the same resource block. Further, the REG is constituted by first to fourth OFDM symbols in a first slot in a certain sub frame.

An enhanced resource element group (EREG) is used to define mapping of the resource elements and the enhanced control channel. For example, the EREG is used for mapping of the EPDCCH. One resource block pair is constituted by 16 EREGs. Each EREG is assigned a number of 0 to 15 for each resource block pair. Each EREG is constituted by 9 resource elements excluding resource elements used for the DM-RS associated with the EPDCCH in one resource block pair.

Figure 8:
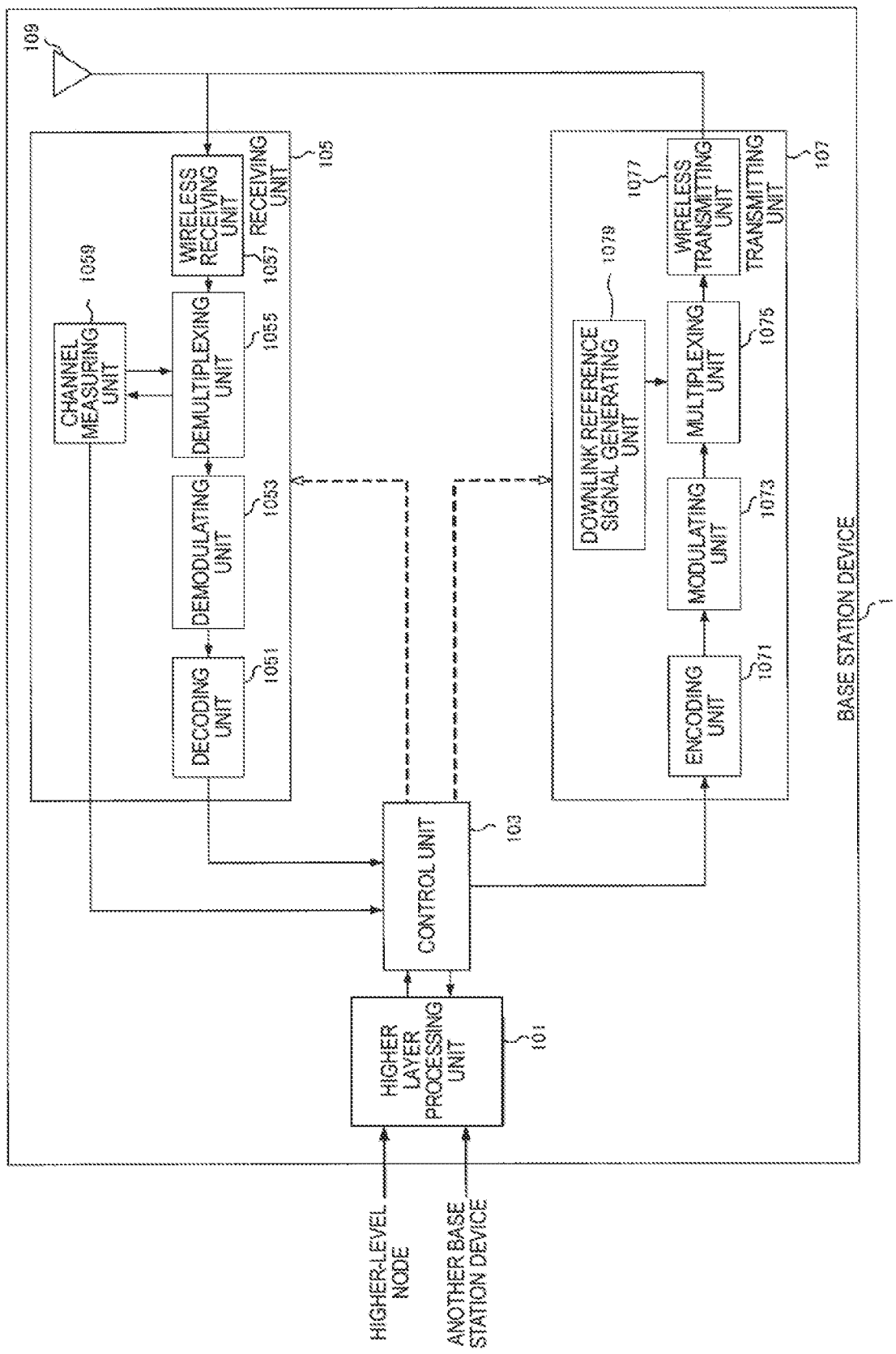
FIG. 8 is a schematic block diagram illustrating a configuration of a base station device of the present embodiment.

FIG. 8 is a schematic block diagram illustrating a configuration of the base station device 1 of the present embodiment. As illustrated in FIG. 3, the base station device 1 includes a higher layer processing unit 101, a control unit 103, a receiving unit 105, a transmitting unit 107, and a transceiving antenna 109. Further, the receiving unit 105 includes a decoding unit 1051, a demodulating unit 1053, a demultiplexing unit 1055, a wireless receiving unit 1057, and a channel measuring unit 1059. Further, the transmitting unit 107 includes an encoding unit 1071, a modulating unit 1073, a multiplexing unit 1075, a wireless transmitting unit 1077, and a downlink reference signal generating unit 1079.

As described above, the base station device 1 can support one or more RATs. Some or all of the units included in the base station device 1 illustrated in FIG. 8 can be configured individually in accordance with the RAT. For example, the receiving unit 105 and the transmitting unit 107 are configured individually in LTE and NR. Further, in the NR cell, some or all of the units included in the base station device 1 illustrated in FIG. 8 can be configured individually in accordance with a parameter set related to the transmission signal. For example, in a certain NR cell, the wireless receiving unit 1057 and the wireless transmitting unit 1077 can be configured individually in accordance with a parameter set related to the transmission signal.

The higher layer processing unit 101 performs processes of a medium access control (MAC) layer, a packet data convergence protocol (PDCP) layer, a radio link control (RLC) layer, and a radio resource control (RRC) layer. Further, the higher layer processing unit 101 generates control information to control the receiving unit 105 and the transmitting unit 107 and outputs the control information to the control unit 103.

The control unit 103 controls the receiving unit 105 and the transmitting unit 107 on the basis of the control information from the higher layer processing unit 101. The control unit 103 generates control information to be transmitted to the higher layer processing unit 101 and outputs the control information to the higher layer processing unit 101. The control unit 103 receives a decoded signal from the decoding unit 1051 and a channel estimation result from the channel measuring unit 1059. The control unit 103 outputs a signal to be encoded to the encoding unit 1071. Further, the control unit 103 is used to control the whole or a part of the base station device 1.

The higher layer processing unit 101 performs a process and management related to RAT control, radio resource control, sub frame setting, scheduling control, and or CSI report control.

The process and the management in the higher layer processing unit 101 are performed for each terminal device or in common to terminal devices connected to the base station device. The process and the management in the higher layer processing unit 101 may be performed only by the higher layer processing unit 101 or may be acquired from a higher node or another base station device. Further, the process and the management in the higher layer processing unit 101 may be individually performed in accordance with the RAT For example, the higher layer processing unit 101 individually performs the process and the management in LTE and the process and the management in NR.

Under the RAT control of the higher layer processing unit 101, management related to the RAT is performed. For example, under the RAT control, the management related to LTE and/or the management related to NR is performed. The management related to NR includes setting and a process of a parameter set related to the transmission signal in the NR cell.

In the radio resource control in the higher layer processing unit 101, generation and/or management of downlink data (transport block), system information, an RRC message (RRC parameter), and/or a MAC control element (CE) are performed.

In a sub frame setting in the higher layer processing unit 101, management of a sub frame setting, a sub frame pattern setting, an uplink-downlink setting, an uplink reference UL-DL setting, and/or a downlink reference UL-DL setting is performed. Further, the sub frame setting in the higher layer processing unit 101 is also referred to as a base station sub frame setting. Further, the sub frame setting in the higher layer processing unit 101 can be decided on the basis of an uplink traffic volume and a downlink traffic volume. Further, the sub frame setting in the higher layer processing unit 101 can be decided on the basis of a scheduling result of scheduling control in the higher layer processing unit 101.

In the scheduling control in the higher layer processing unit 101, a frequency and a sub frame to which the physical channel is allocated, a coding rate, a modulation scheme, and transmission power of the physical channels, and the like are decided on the basis of the received channel state information, an estimation value, a channel quality, or the like of a propagation path input from the channel measuring unit 1059, and the like. For example, the control unit 103 generates the control information (DCI format) on the basis of the scheduling result of the scheduling control in the higher layer processing unit 101.

In the CSI report control in the higher layer processing unit 101, the CSI report of the terminal device 2 is controlled. For example, a settings related to the CSI reference resources assumed to calculate the CSI in the terminal device 2 is controlled.

Under the control from the control unit 103, the receiving unit 105 receives a signal transmitted from the terminal device 2 via the transceiving antenna 109, performs a reception process such as demultiplexing, demodulation, and decoding, and outputs information which has undergone the reception process to the control unit 103. Further, the reception process in the receiving unit 105 is performed on the basis of a setting which is specified in advance or a setting notified from the base station device 1 to the terminal device 2.

The wireless receiving unit 1057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 109.

The demultiplexing unit 1055 separates the uplink channel such as the PUCCH or the PUSCH and/or uplink reference signal from the signal input from the wireless receiving unit 1057. The demultiplexing unit 1055 outputs the uplink reference signal to the channel measuring unit 1059. The demultiplexing unit 1055 compensates the propagation path for the uplink channel from the estimation value of the propagation path input from the channel measuring unit 1059.

The demodulating unit 1053 demodulates the reception signal for the modulation symbol of the uplink channel using a modulation scheme such as binary phase shift keying (BPSK), quadrature phase shift keying (QPSK), 16 quadrature amplitude modulation (QAM), 64 QAM, or 256 QAM. The demodulating unit 1053 performs separation and demodulation of a MIMO multiplexed uplink channel.

The decoding unit 1051 performs a decoding process on encoded bits of the demodulated uplink channel. The decoded uplink data and/or uplink control information are output to the control unit 103. The decoding unit 1051 performs a decoding process on the PUSCH for each transport block.

The channel measuring unit 1059 measures the estimation value, a channel quality, and/or the like of the propagation path from the uplink reference signal input from the demultiplexing unit 1055, and outputs the estimation value, a channel qualify, and/or the like of the propagation path to the demultiplexing unit 1055 and/or the control unit 103. For example, the estimation value of the propagation path for propagation path compensation for the PUCCH or the PUSCH is measured by the channel measuring unit 1059 using the UL-DMRS, and an uplink channel quality is measured using the SRS.

The transmitting unit 107 carries out a transmission process such as encoding, modulation, and multiplexing on downlink control information and downlink data input from the higher layer processing unit 101 under the control of the control unit 103. For example, the transmitting unit 107 generates and multiplexes the PHICH, the PDCCH, the EPDCCH, the PDSCH, and the downlink reference signal and generates a transmission signal. Further, the transmission process in the transmitting unit 107 is performed on the basis of a setting which is specified in advance, a setting notified from the base station device 1 to the terminal device 2, or a setting notified through the PDCCH or the EPDCCH transmitted through the same sub frame.

The encoding unit 1071 encodes the HARQ indicator (HARQ-ACK), the downlink control information, and the downlink data input from the control unit 103 using a predetermined coding scheme such as block coding, convolutional coding, turbo coding, or the like. The modulating unit 1073 modulates the encoded bits input from the encoding unit 1071 using a predetermined modulation scheme such as BPSK, QPSK, 16 QAM, 64 QAM, or 256 QAM. The downlink reference signal generating unit 1079 generates the downlink reference signal on the basis of a physical cell identification (PCI), an RRC parameter set in the terminal device 2, and the like. The multiplexing unit 1075 multiplexes a modulated symbol and the downlink reference signal of each channel and arranges resulting data in a predetermined resource element.

The wireless transmitting unit 1077 performs processes such as conversion into a signal in the time domain by inverse fast Fourier transform (IFFT), addition of the guard interval, generation of a baseband digital signal, conversion in an analog signal, quadrature modulation, conversion from a signal of an intermediate frequency into a signal of a high frequency (up conversion), removal of an extra frequency component and amplification of power on the signal from the multiplexing unit 1075, and generates a transmission signal. The transmission signal output from the wireless transmitting unit 1077 is transmitted through the transceiving antenna 109.

<Configuration Example of Terminal Device 2 in Present Embodiment>

Figure 9:
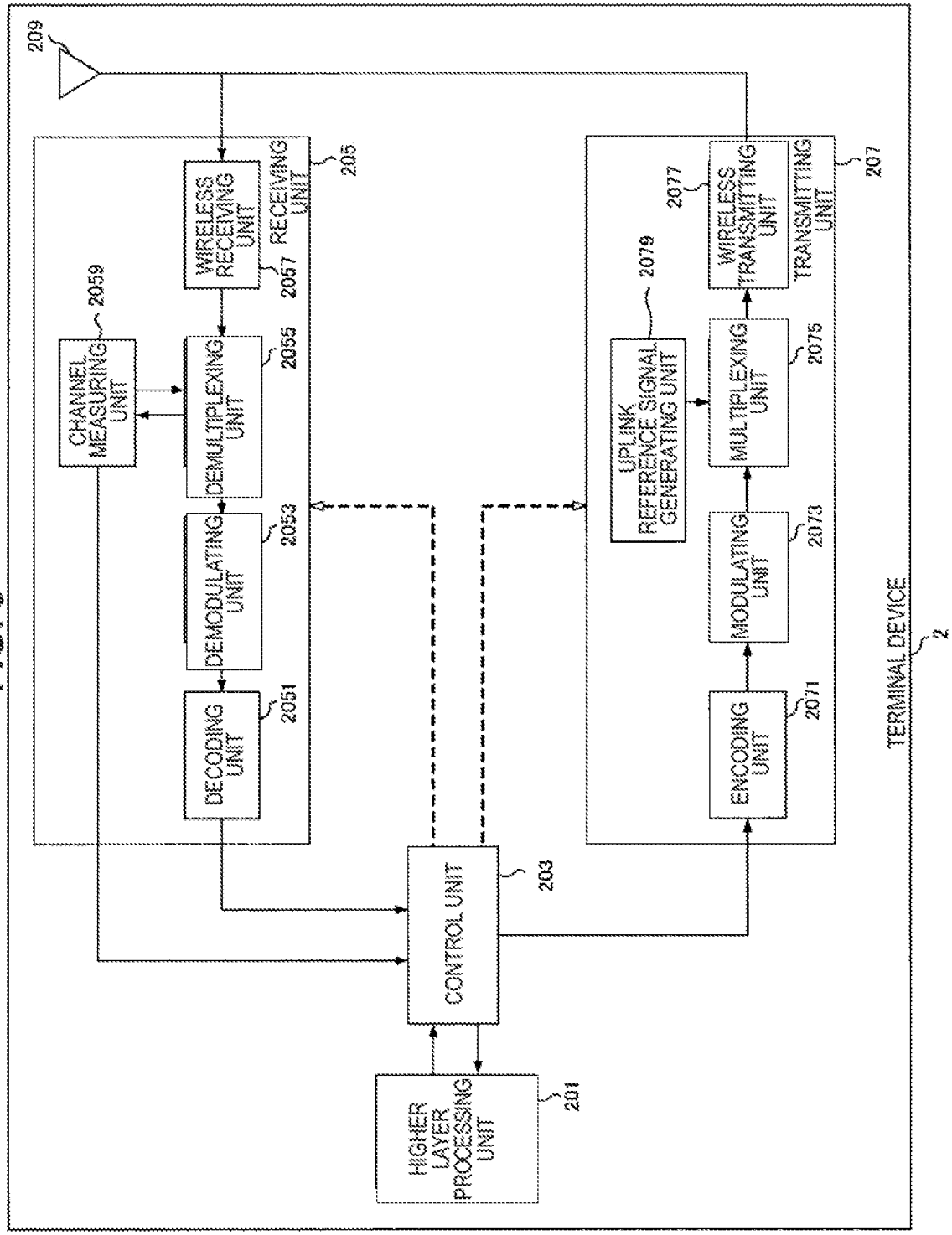
FIG. 9 is a schematic block diagram illustrating a configuration of a terminal device of the present embodiment.

FIG. 9 is a schematic block diagram illustrating a configuration of the terminal device 2 of the present embodiment. As illustrated in FIG. 4, the terminal device 2 includes a higher layer processing unit 201, a control unit 203, a receiving unit 205, a transmitting unit 207, and a transceiving antenna 209. Further, the receiving unit 205 includes a decoding unit 2051, a demodulating unit 2053, a demultiplexing unit 2055, a wireless receiving unit 2057, and a channel measuring unit 2059. Further, the transmitting unit 207 includes an encoding unit 2071, a modulating unit 2073, a multiplexing unit 2075, a wireless transmitting unit 2077, and an uplink reference signal generating unit 2079.

As described above, the terminal device 2 can support one or more RATs. Some or all of the units included in the terminal device 2 illustrated in FIG. 9 can be configured individually in accordance with the RAT. For example, the receiving unit 205 and the transmitting unit 207 are configured individually in LTE and NR. Further, in the NR cell, some or all of the units included in the terminal device 2 illustrated in FIG. 9 can be configured individually in accordance with a parameter set related to the transmission signal. For example, in a certain NR cell, the wireless receiving unit 2057 and the wireless transmitting unit 2077 can be configured individually in accordance with a parameter set related to the transmission signal.

The higher layer processing unit 201 outputs uplink data (transport block) to the control unit 203. The higher layer processing unit 201 performs processes of a medium access control (MAC) layer; a packet data convergence protocol (PDCP) layer, a radio link control (RLC) layer, and a radio resource control (RRC) layer. Further, the higher layer processing unit 201 generates control information to control the receiving unit 205 and the transmitting unit 207 and outputs the control information to the control unit 203.

The control unit 203 controls the receiving unit 205 and the transmitting unit 207 on the basis of the control information from the higher layer processing unit 201. The control unit 203 generates control information to be transmitted to the higher layer processing unit 201 and outputs the control information to the higher layer processing unit 201. The control unit 203 receives a decoded signal from the decoding unit 2051 and a channel estimation result from the channel measuring unit 2059. The control unit 203 outputs a signal to be encoded to the encoding unit 2071. Further, the control unit 203 may be used to control the whole or a part of the terminal device 2.

The higher layer processing unit 201 performs a process and management related to RAT control, radio resource control, sub frame setting, scheduling control, and/or CSI report control. The process and the management in the higher layer processing unit 201 are performed on the basis of a setting which is specified in advance and/or a setting based on control information set or notified from the base station device 1. For example, the control information from the base station device 1 includes the RRC parameter, the MAC control element, or the DCI. Further, the process and the management in the higher layer processing unit 201 may be individually performed in accordance with the RAT For example, the higher layer processing unit 201 individually performs the process and the management in LTE and the process and the management in NR.

Under the RAT control of the higher layer processing unit 201, management related to the RAT is performed. For example, under the RAT control, the management related to LTE and/or the management related to NR is performed. The management related to NR includes setting and a process of a parameter set related to the transmission signal in the NR cell.

In the radio resource control in the higher layer processing unit 201, the setting information in the terminal device 2 is managed. In the radio resource control in the higher layer processing unit 201, generation and/or management of uplink data (transport block), system information, an RRC message (RRC parameter), and/or a MAC control element (CE) are performed.

In the sub frame setting in the higher layer processing unit 201, the sub frame setting in the base station device 1 and/or a base station device Afferent from the base station device 1 is managed. The sub frame setting includes an uplink or downlink setting for the sub frame, a sub frame pattern setting, an uplink-downlink setting, an uplink reference UL-DL setting, and/or a downlink reference UL-DL setting. Further, the sub frame setting in the higher layer processing unit 201 is also referred to as a terminal sub frame setting.

In the scheduling control in the higher layer processing unit 201, control information for controlling scheduling on the receiving unit 205 and the transmitting unit 207 is generated on the basis of the DCI (scheduling information) from the base station device 1.

In the CSI report control in the higher layer processing unit 201, control related to the report of the CSI to the base station device 1 is performed. For example, in the CSI report control, a setting related to the CSI reference resources assumed for calculating the CSI by the channel measuring unit 2059 is controlled. In the CSI report control, resource (timing) used for reporting the CSI is controlled on the basis of the DCI and/or the RRC parameter.

Under the control from the control unit 203, the receiving unit 205 receives a signal transmitted from the base station device 1 via the transceiving antenna 209, performs a reception process such as demultiplexing, demodulation, and decoding, and outputs information which has undergone the reception process to the control unit 203. Further, the reception process in the receiving unit 205 is performed on the basis of a setting which is specified in advance or a notification from the base station device 1 or a setting.

The wireless receiving unit 2057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 209.

The demultiplexing unit 2055 separates the downlink channel such as the PHICH, PDCCH, EPDCCH, or PDSCH, downlink synchronization signal and/or downlink reference signal from the signal input from the wireless receiving unit 2057. The demultiplexing unit 2055 outputs the uplink reference signal to the channel measuring unit 2059. The demultiplexing unit 2055 compensates the propagation path for the uplink channel from the estimation value of the propagation path input from the channel measuring unit 2059.

The demodulating unit 2053 demodulates the reception signal for the modulation symbol of the downlink channel using a modulation scheme such as BPSK, QPSK, 16 QAM, 64 QAM, or 256 QAM. The demodulating unit 2053 performs separation and demodulation of a MIMO multiplexed downlink channel.

The decoding unit 2051 performs a decoding process on encoded bits of the demodulated downlink channel. The decoded downlink data and/or downlink control information are output to the control unit 203. The decoding unit 2051 performs a decoding process on the PDSCH for each transport block.

The channel measuring unit 2059 measures the estimation value, a channel quality, and/or the like of the propagation path from the downlink reference signal input from the demultiplexing unit 2055, and outputs the estimation value, a channel quality, and/or the like of the propagation path to the demultiplexing unit 2055 and/or the control unit 203. The downlink reference signal used for measurement by the channel measuring unit 2059 may be decided on the basis of at least a transmission mode set by the RRC parameter and/or other RRC parameters. For example, the estimation value of the propagation path for performing the propagation path compensation on the PDSCH or the EPDCCH is measured through the DL-DMRS. The estimation value of the propagation path for performing the propagation path compensation on the PDCCH or the PDSCH and/or the downlink channel for reporting the CSI are measured through the CRS. The downlink channel for reporting the CSI is measured through the CSI-RS. The channel measuring unit 2059 calculates a reference signal received power (RSRP) and/or a reference signal received quality (RSRQ) on the basis of the CRS, the CSI-RS, or the discovery signal, and outputs the RSRP and/or the RSRQ to the higher layer processing unit 201.

The transmitting unit 207 performs a transmission process such as encoding, modulation, and multiplexing on the uplink control information and the uplink data input from the higher layer processing unit 201 under the control of the control unit 203. For example, the transmitting unit 207 generates and multiplexes the uplink channel such as the PUSCH or the PUCCH and/or the uplink reference signal, and generates a transmission signal. Further, the transmission process in the transmitting unit 207 is performed on the basis of a setting which is specified in advance or a setting set or notified from the base station device 1.

The encoding unit 2071 encodes the HARQ indicator (HARQ-ACK), the uplink control information, and the uplink data input from the control unit 203 using a predetermined coding scheme such as block coding, convolutional coding, turbo coding, or the like. The modulating unit 2073 modulates the encoded bits input from the encoding unit 2071 using a predetermined modulation scheme such as BPSK, QPSBL 16 QAM, 64 QAM, or 256 QAM. The uplink reference signal generating unit 2079 generates the uplink reference signal on the basis of an RRC parameter set in the terminal device 2, and the like. The multiplexing unit 2075 multiplexes a modulated symbol and the uplink reference signal of each channel and arranges resulting data in a predetermined resource element.

The wireless transmitting unit 2077 performs processes such as conversion into a signal in the time domain by inverse fast Fourier transform (IFFT), addition of the guard interval, generation of a baseband digital signal, conversion in an analog signal, quadrature modulation, conversion from a signal of an intermediate frequency into a signal of a high frequency (up conversion), removal of an extra frequency component, and amplification of power on the signal from the multiplexing unit 2075, and generates a transmission signal. The transmission signal output from the wireless transmitting unit 2077 is transmitted through the transceiving antenna 209.

<Signaling of Control Information in Present Embodiment>

The base station device 1 and the terminal device 2 can use various methods for signaling (notification, broadcasting, or setting) of the control information. The signaling of the control information can be performed in various layers (layers). The signaling of the control information includes signaling of the physical layer which is signaling performed through the physical layer, RRC signaling which is signaling performed through the RRC layer, and MAC signaling which is signaling performed through the MAC layer. The RRC signaling is dedicated RRC signaling for notifying the terminal device 2 of the control information specific or a common RRC signaling for notifying of the control information specific to the base station device 1. The signaling used by a layer higher than the physical layer such as RRC signaling and MAC signaling is referred to as signaling of the higher layer.

The RRC signaling is implemented by signaling the RRC parameter. The MAC signaling is implemented by signaling the MAC control element. The signaling of the physical layer is implemented by signaling the downlink control information (DCI) or the uplink control information (UCI). The RRC parameter and the MAC control element are transmitted using the PDSCH or the PUSCH. The DCI is transmitted using the PDCCH or the EPDCCH. The UCI is transmitted using the PUCCH or the PUSCH. The RRC signaling and the MAC signaling are used for signaling semi-static control information and are also referred to as semi-static signaling. The signaling of the physical layer is used for signaling dynamic control information and also referred to as dynamic signaling. The DCI is used for scheduling of the PDSCH or scheduling of the PUSCH. The UCI is used for the CSI report, the HARQ-ACK report, and/or the scheduling request (SR).

<Details of Downlink Control Information in Present Embodiment>

The DCI is notified using the DCI format having a field which is specified in advance. Predetermined information bits are mapped to the field specified in the DCI format. The DCI notifies of downlink scheduling information, uplink scheduling information, sidelink scheduling information, a request for a non-periodic CSI report, or an uplink transmission power command.

The DCI format monitored by the terminal device 2 is decided in accordance with the transmission mode set for each serving cell. In other words, a part of the DCI format monitored by the terminal device 2 can differ depending on the transmission mode. For example, the terminal device 2 in which a downlink transmission mode 1 is set monitors the DCI format 1A and the DCI format 1. For example, the terminal device 2 in which a downlink transmission mode 4 is set monitors the DCI format 1A and the DCI format 2. For example, the terminal device 2 in which an uplink transmission mode 1 is set monitors the DCI format 0. For example, the terminal device 2 in which an uplink transmission mode 2 is set monitors the DCI format 0 and the DCI format 4.

A control region in which the PDCCH for notifying the terminal device 2 of the DCI is placed is not notified of, and the terminal device 2 detects the DCI for the terminal device 2 through blind decoding (blind detection). Specifically, the terminal device 2 monitors a set of PDCCH candidates in the serving cell. The monitoring indicates that decoding is attempted in accordance with all the DCI formats to be monitored for each of the PDCCHs in the set. For example, the terminal device 2 attempts to decode all aggregation levels, PDCCH candidates, and DCI formats which are likely to be transmitted to the terminal device 2. The terminal device 2 recognizes the DCI (PDCCH) which is successfully decoded (detected) as the DCI (PDCCH) for the terminal device 2.

A cyclic redundancy check (CRC) is added to the DCI. The CRC is used for the DCI error detection and the DCI blind detection. A CRC parity bit (CRC) is scrambled using the RNTI. The terminal device 2 detects whether or not it is a DCI for the terminal device 2 on the basis of the RNTI. Specifically, the terminal device 2 performs de-scrambling on the bit corresponding to the CRC using a predetermined RNTI, extracts the CRC, and detects whether or not the corresponding DCI is correct.

The RNTI is specified or set in accordance with a purpose or a use of the DCI. The RNTI includes a cell-RNTI (C-RNTI), a semi persistent scheduling C-RNTI (SPS C-RNTI), a system information-RNTI (SI-RNTI), a paging-RNTI (P-RNTI), a random access-RNTI (RA-RNTI), a transmit power control-PUCCH-RNTI (TPC-PUCCH- RNTI), a transmit power control-PUSCH-RNTI (TPC-PUSCH-RNTI), a temporary C-RNTI, a multimedia broadcast multicast services (MBMS)-RNTI (M-RNTI)), an eIMTA-RNTI and a CC-RNTI.

The C-RNTI and the SPS C-RNTI are RNTIs which are specific to the terminal device 2 in the base station device 1 (cell), and serve as identifiers identifying the terminal device 2. The C-RNTI is used for scheduling the PDSCH or the PUSCH in a certain sub frame. The SPS C-RNTI is used to activate or release periodic scheduling of resources for the PDSCH or the PUSCH. A control channel having a CRC scrambled using the SI-RNTI is used for scheduling a system information block (SIB). A control channel with a CRC scrambled using the P-RNTI is used for controlling paging. A control channel with a CRC scrambled using the RA-RNTI is used for scheduling a response to the RACH. A control channel having a CRC scrambled using the TPC-PUCCH-RNTI is used for power control of the PUCCH. A control channel having a CRC scrambled using the TPC-PUSCH-RNTI is used for power control of the PUSCH. A control channel with a CRC scrambled using the temporary C-RNTI is used by a mobile station device in which no C-RNTI is set or recognized. A control channel with CRC scrambled using the M-RNTI is used for scheduling the MBMS. A control channel with a CRC scrambled using the eIMTA-RNTI is used for notifying of information related to a TDD UL/DL setting of a TDD serving cell in dynamic TDD (eIMTA). The control channel (DCI) with a CRC scrambled using the CC-RNTI is used to notify of setting of an exclusive OFDM symbol in the LAA secondary cell. Further, the DCI format may be scrambled using a new RNTI instead of the above RNTI.

Scheduling information (the downlink scheduling information, the uplink scheduling information, and the sidelink scheduling information) includes information for scheduling in units of resource blocks or resource block groups as the scheduling of the frequency region. The resource block group is successive resource block sets and indicates resources allocated to the scheduled terminal device. A size of the resource block group is decided in accordance with a system bandwidth.

<Details of Downlink Control Channel in Present Embodiment>

The DCI is transmitted using a control channel such as the PDCCH or the EPDCCH. The terminal device 2 monitors a set of PDCCH candidates and/or a set of EPDCCH candidates of one or more activated serving cells set by RRC signaling. Here, the monitoring means that the PDCCH and/or the EPDCCH in the set corresponding to all the DCI formats to be monitored is attempted to be decoded.

A set of PDCCH candidates or a set of EPDCCH candidates is also referred to as a search space. In the search space, a shared search space (CSS) and a terminal specific search space (USS) are defined. The CSS may be defined only for the search space for the PDCCH.

A common search space (CSS) is a search space set on the basis of a parameter specific to the base station device 1 and/or a parameter which is specified in advance. For example, the CSS is a search space used in common to a plurality of terminal devices. Therefore, the base station device 1 maps a control channel common to a plurality of terminal devices to the CSS, and thus resources for transmitting the control channel are reduced.

A UE-specific search space (USS) is a search space set using at least a parameter specific to the terminal device 2. Therefore, the USS is a search space specific to the terminal device 2, and it is possible for the base station device 1 to individually transmit the control channel specific to the terminal device 2 by using the USS. For this reason, the base station device 1 can efficiently map the control channels specific to a plurality of terminal devices.

The USS may be set to be used in common to a plurality of terminal devices. Since a common USS is set in a plurality of terminal devices, a parameter specific to the terminal device 2 is set to be the same value among a plurality of terminal devices. For example, a unit set to the same parameter among a plurality of terminal devices is a cell, a transmission point, a group of predetermined terminal devices, or the like.

The search space of each aggregation level is defined by a set of PDCCH candidates. Each PDCCH is transmitted using one or more CCE sets. The number of CCEs used in one PDCCH is also referred to as an aggregation level. For example, the number of CCEs used in one PDCCH is 1, 2, 4, or 8.

The search space of each aggregation level is defined by a set of EPDCCH candidates. Each EPDCCH is transmitted using one or more enhanced control channel element (ECCE) sets. The number of ECCEs used in one EPDCCH is also referred to as an aggregation level. For example, the number of ECCEs used in one EPDCCH is 1, 2, 4, 8, 16, or 32.

The number of PDCCH candidates or the number of EPDCCH candidates is decided on the basis of at least the search space and the aggregation level. For example, in the CSS, the number of PDCCH candidates in the aggregation levels 4 and 8 are 4 and 2, respectively. For example, in the USS, the number of PDCCH candidates in the aggregations 1, 2, 4, and 8 are 6, 6, 2, and 2, respectively.

Each ECCE includes a plurality of EREGs. The EREG is used to define mapping to the resource element of the EPDCCH. 16 EREGs which are assigned numbers of 0 to 15 are defined in each RB pair. In other words, an EREG 0 to an EREG 15 are defined in each RB pan. For each RB pair the EREG 0 to the EREG 15 are preferentially defined at regular intervals in the frequency direction for resource elements other than resource elements to which a predetermined signal and/or channel is mapped. For example, a resource element to which a demodulation reference signal associated with an EPDCCH transmitted through antenna ports 107 to 110 is mapped is not defined as the EREG.

The number of ECCEs used in one EPDCCH depends on an EPDCCH format and is decided on the basis of other parameters. The number of ECCEs used in one EPDCCH is also referred to as an aggregation level. For example, the number of ECCEs used in one EPDCCH is decided on the basis of the number of resource elements which can be used for transmission of the EPDCCH in one RB pair; a transmission method of the EPDCCH, and the like. For example, the number of ECCEs used in one EPDCCH is 1, 2, 4, 8, 16, or 32. Further, the number of EREGs used in one ECCE is decided on the basis of a type of sub frame and a type of cyclic prefix and is 4 or 8. Distributed transmission and localized transmission are supported as the transmission method of the EPDCCH.

The distributed transmission or the localized transmission can be used for the EPDCCH. The distributed transmission and the localized transmission differ in mapping of the ECCE to the EREG and the RB pair. For example, in the distributed transmission, one ECCE is configured using EREGs of a plurality of RB pairs. In the localized transmission, one ECCE is configured using an EREG of one RB pair.

The base station device 1 performs a setting related to the EPDCCH in the terminal device 2. The terminal device 2 monitors a plurality of EPDCCHs on the basis of the setting from the base station device 1. A set of RB pairs that the terminal device 2 monitors the EPDCCH can be set. The set of RB pairs is also referred to as an EPDCCH set or an EPDCCH-PRB set. One or more EPDCCH sets can be set in one terminal device 2. Each EPDCCH set includes one or more RB pairs. Further, the setting related to the EPDCCH can be individually performed for each EPDCCH set.

The base station device 1 can set a predetermined number of EPDCCH sets in the terminal device 2. For example, up to two EPDCCH sets can be set as an EPDCCH set 0 and/or an EPDCCH set 1. Each of the EPDCCH sets can be constituted by a predetermined number of RB pairs. Each EPDCCH set constitutes one set of ECCEs. The number of ECCEs configured in one EPDCCH set is decided on the basis of the number of RB pairs set as the EPDCCH set and the number of EREGs used in one ECCE. In a case in which the number of ECCEs configured in one EPDCCH set is N, each EPDCCH set constitutes ECCEs 0 to N−1. For example, in a case in which the number of EREGs used in one ECCE is 4, the EPDCCH set constituted by 4 RB pairs constitutes 16 ECCEs.

<Details of CA and DC in Present Embodiment>

A plurality of cells are set for the terminal device 2, and the terminal device 2 can perform multicarrier transmission. Communication in which the terminal device 2 uses a plurality of cells is referred to as carrier aggregation (CA) or dual connectivity (DC). Contents described in the present embodiment can be applied to each or some of a plurality of cells set in the terminal device 2. The cell set in the terminal device 2 is also referred to as a serving cell.

In the CA, a plurality of serving cells to be set includes one primary cell (PCell) and one or more secondary cells (SCell). One primary cell and one or more secondary cells can be set in the terminal device 2 that supports the CA.

The primary cell is a serving cell in which the initial connection establishment procedure is performed, a sewing cell that the initial connection re-establishment procedure is started, or a cell indicated as the primary cell in a handover procedure. The primary cell operates with a primary frequency. The secondary cell can be set after a connection is constructed or reconstructed. The secondary cell operates with a secondary frequency. Further, the connection is also referred to as an RRC connection.

The DC is an operation in which a predetermined terminal device 2 consumes radio resources provided from at least two different network points. The network point is a master base station device (a master eNB (MeNB)) and a secondary base station device (a secondary eNB (SeNB)). In the dual connectivity, the terminal device 2 establishes an RRC connection through at least two network points, in the dual connectivity, the two network points may be connected through a non-ideal backhaul.

In the DC, the base station device 1 which is connected to at least an S1-MME and plays a role of a mobility anchor of a core network is referred to as a master base station device. Further, the base station device 1 which is not the master base station device providing additional radio resources to the terminal device 2 is referred to as a secondary base station device. A group of serving cells associated with the master base station device is also referred to as a master cell group (MCG). A group of serving cells associated with the secondary base station device is also referred to as a secondary cell group (SCG). Note that the group of the serving cells is also referred to as a cell group (CG).

In the DC, the primary cell belongs to the MCG. Further, in the SCG, the secondary cell corresponding to the primary cell is referred to as a primary secondary cell (PSCell). A function (capability and performance) equivalent to the PCell (the base station device constituting the PCell) may be supported by the PSCell (the base station device constituting the PSCell). Further, the PSCell may only support some functions of the PCell. For example, the PSCell may support a function of performing the PDCCH transmission using the search space different from the CSS or the USS. Further, the PSCell may constantly be in an activation state. Further, the PSCell is a cell that can receive the PUCCH.

In the DC, a radio bearer (a date radio bearer (DRB)) and/or a signaling radio bearer (SRB) may be individually allocated through the MeNB and the SeNB. A duplex mode may be set individually in each of the MCG (PCell) and the SCG (PSCell). The MCG (PCell) and the SCG (PSCell) may not be synchronized with each other. That is, a frame boundary of the MCG and a frame boundary of the SCG may not be matched. A parameter (a timing advance group (TAG)) for adjusting a plurality of timings may be independently set in the MCG (PCell) and the SCG (PSCell). In the dual connectivity, the terminal device 2 transmits the UCI corresponding to the cell in the MCG only through MeNB (PCell) and transmits the UCI corresponding to the cell in the SCG only through SeNB (pSCell). In the transmission of each UCI, the transmission method using the PUCCH and/or the PUSCH is applied in each cell group.

The PUCCH and the PBCH (MIB) are transmitted only through the PCell or the PSCell. Further, the PRACH is transmitted only through the PCell or the PSCell as long as a plurality of TAGs are not set between cells in the CG.

In the PCell or the PSCell, semi-persistent scheduling (SPS) or discontinuous transmission (DRX) may be performed. In the secondary cell, the same DRX as the PCell or the PSCell in the same cell group may be performed.

In the secondary cell, information/parameter related to a setting of MAC is basically shared with the PCell or the PSCell in the same cell group. Some parameters may be set for each secondary cell. Some timers or counters may be applied only to the PCell or the PSCell.

In the CA, a cell to which the TDD scheme is applied and a cell to which the FDD scheme is applied may be aggregated. In a case in which the cell to which the TDD is applied and the cell to which the FDD is applied are aggregated, the present disclosure can be applied to either the cell to which the TDD is applied or the cell to which the FDD is applied.

The terminal device 2 transmits information (supportedBandCombination) indicating a combination of bands in which the CA and/or DC is supported by the terminal device 2 to the base station device 1. The terminal device 2 transmits information indicating whether or not simultaneous transmission and reception are supported in a plurality of serving cells in a plurality of different bands for each of band combinations to the base station device 1.

<Details of Resource Allocation in Present Embodiment>

The base station device 1 can use a plurality of methods as a method of allocating resources of the PDSCH and/or the PUSCH to the terminal device 2. The resource allocation method includes dynamic scheduling, semi persistent scheduling, multi sub frame scheduling, and cross sub frame scheduling.

In the dynamic scheduling, one DCI performs resource allocation in one sub frame. Specifically, the PDCCH or the EPDCCH in a certain sub frame performs scheduling for the PDSCH in the sub frame. The PDCCH or the EPDCCH in a certain sub frame performs scheduling for the PUSCH in a predetermined sub frame after the certain sub frame.

In the multi sub frame scheduling, one DCI allocates resources in one or more sub frames. Specifically, the PDCCH or the EPDCCH in a certain sub frame performs scheduling for the PDSCH in one or more sub frames which are a predetermined number after the certain sub frame. The PDCCH or the EPDCCH in a certain sub frame performs scheduling for the PUSCH in one or more sub frames which are a predetermined number after the sub frame. The predetermined number can be set to an integer of zero or more. The predetermined number may be specified in advance and may be decided on the basis of the signaling of the physical layer and/or the RRC signaling. In the multi sub frame scheduling, consecutive sub frames may be scheduled, or sub frames with a predetermined period may be scheduled. The number of sub frames to be scheduled may be specified in advance or may be decided on the basis of the signaling of the physical layer and/or the RRC signaling.

In the cross sub frame scheduling, one DCI allocates resources in one sub frame. Specifically, the PDCCH or the EPDCCH in a certain sub frame performs scheduling for the PDSCH in one sub frame which is a predetermined number after the certain sub frame. The PDCCH or the EPDCCH in a certain sub frame performs scheduling for the PUSCH in one sub frame which is a predetermined number after the sub frame. The predetermined number can be set to an integer of zero or more. The predetermined number may be specified in advance and may be decided on the basis of the signaling of the physical layer and/or the RRC signaling. In the cross sub frame scheduling, consecutive sub frames may be scheduled, or sub frames with a predetermined period may be scheduled.

In the semi-persistent scheduling (SPS), one DCI allocates resources in one or more sub frames. In a ease in which information related to the SPS is set through the RRC signaling, and the PDCCH or the EPDCCH for activating the SPS is detected, the terminal device 2 activates a process related to the SPS and receives a predetermined PDSCH and/or PUSCH on the basis of a setting related to the SPS. In a case in which the PDCCH or the EPDCCH for releasing the SPS is detected when the SPS is activated, the terminal device 2 releases (inactivates) the SPS and stops reception of a predetermined PDSCH and/or PUSCH. The release of the SPS may be performed on the basis of a case in which a predetermined condition is satisfied. For example, in a case in which a predetermined number of empty transmission data is received, the SPS is released. The data empty transmission for releasing the SPS corresponds to a MAC protocol data unit (PDU) including a zero MAC service data unit (SDU).

Information related to the SPS by the RRC signaling includes an SPS C-RNTI which is an SPN RNTI, information related to a period (interval) in which the PDSCH is scheduled, information related to a period (interval) in which the PUSCH is scheduled, information related to a setting for releasing the SPS, and/or a number of the HARQ process in the SPS. The SPS is supported only in the primary cell and/or the primary secondary cell.

<Details of LTE Downlink Resource Element Mapping in Present Embodiment>

Figure 10:
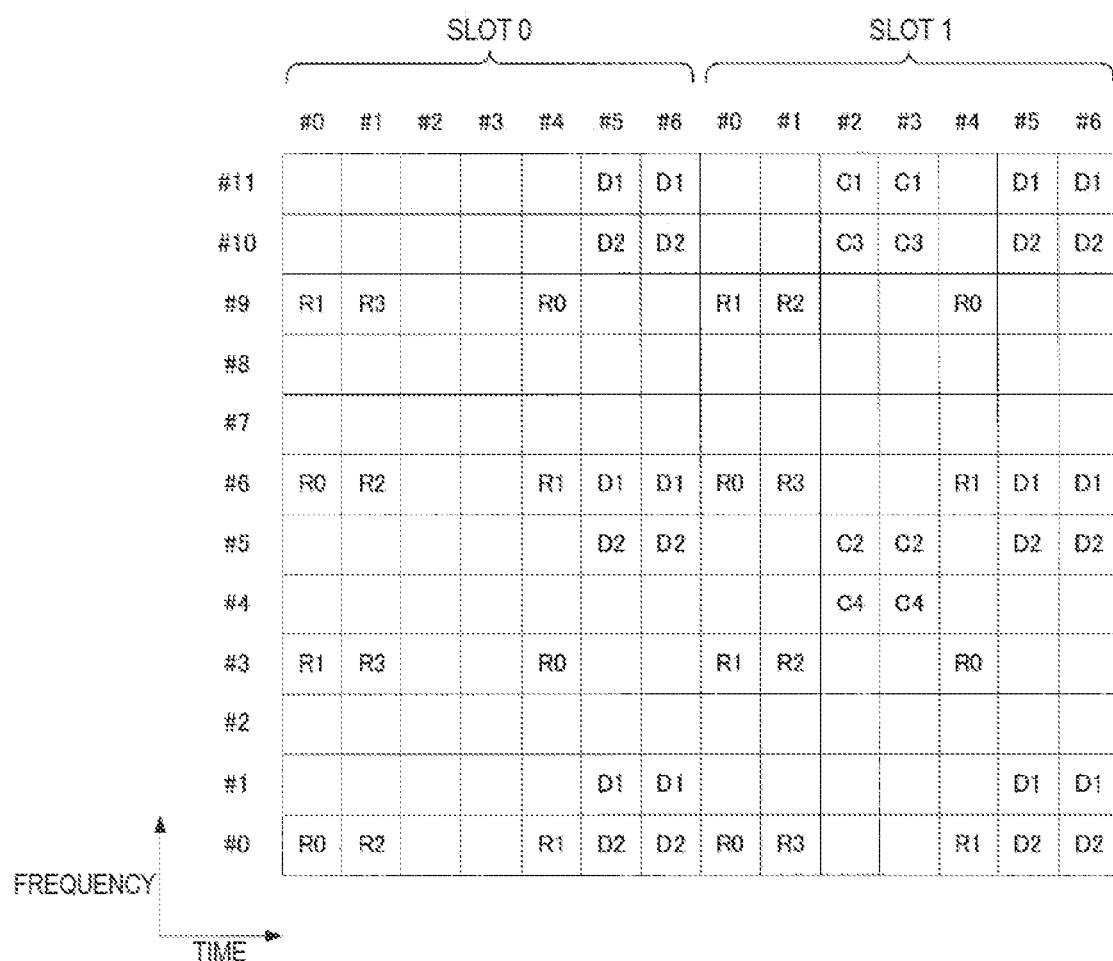
FIG. 10 is a diagram illustrating an example of downlink resource element mapping of LTE according to the present embodiment.

FIG. 10 is a diagram illustrating an example of LTE downlink resource element mapping in the present embodiment. In this example, a set of resource elements in one resource block pair in a case in which one resource block and the number of OFDM symbols in one slot are 7 will be described. Further, seven OFDM symbols in a first half in the time direction in the resource block pair are also referred to as a slot 0 (a first slot). Seven OFDM symbols in a second half in the time direction in the resource block pair are also referred to as a slot 1 (a second slot). Further, the OFDM symbols in each slot (resource block) are indicated by OFDM symbol number 0 to 6. Further, the sub carriers in the frequency direction in the resource block pair are indicated by sub carrier numbers 0 to 11. Further, in a case in which a system bandwidth is constituted by a plurality of resource blocks, a different sub carrier number is allocated over the system bandwidth. For example, in a case in which the system bandwidth is constituted by six resource blocks, the sub carriers to which the sub carrier numbers 0 to 71 are allocated are used. Further, in the description of the present embodiment, a resource element (k, l) is a resource element indicated by a sub carrier number k and an OFDM symbol number l.

Resource elements indicated by R 0 to R 3 indicate cell-specific reference signals of the antenna ports 0 to 3, respectively. Hereinafter, the cell-specific reference signals of the antenna ports 0 to 3 are also referred to as cell-specific RSs (CRSs). In this example, the case of the antenna ports in which the number of CRSs is 4 is described, but the number thereof can be changed. For example, the CRS can use one antenna port or two antenna ports. Further, the CRS can shift in the frequency direction on the basis of the cell ID. For example, the CRS can shift in the frequency direction on the basis of a remainder obtained by dividing the cell ID by 6.

Resource element indicated by C1 to C4 indicates reference signals (CSI-RS) for measuring transmission path states of the antenna ports 15 to 22. The resource elements denoted by C1 to C4 indicate CSI-RSs of a CDM group 1 to a CDM group 4, respectively. The CSI-RS is constituted by an orthogonal sequence (orthogonal code) using a Walsh code and a scramble code using a pseudo random sequence. Further, the CSI-RS is code division multiplexed using an orthogonal code such as a Walsh code in the CDM group. Further, the CSI-RS is frequency-division multiplexed (FDM) mutually between the CDM groups.

The CSI-RSs of the antenna ports 15 and 16 are mapped to C1. The CSI-RSs of the antenna ports 17 and 18 is mapped to C2. The CSI-RSs of the antenna port 19 and 20 are mapped to C3. The CSI-RSs of the antenna port 21 and 22 are mapped to C4.

A plurality of antenna ports of the CSI-RSs are specified. The CSI-RS can be set as a reference signal corresponding to eight antenna ports of the antenna ports 15 to 22. Further, the CSI-RS can be set as a reference signal corresponding to four antenna ports of the antenna ports 15 to 18. Further, the CSI-RS can be set as a reference signal corresponding to two antenna ports of the antenna ports 15 to 16. Further, the CSI-RS can be set as a reference signal corresponding to one antenna port of the antenna port 15. The CSI-RS can be mapped to some sub frames, and, for example, the CSI-RS can be mapped for every two or more sub frames. A plurality of mapping patterns are specified for the resource element of the CSI-RS. Further, the base station device 1 can set a plurality of CSI-RSs in the terminal device 2.

The CSI-RS can set transmission power to zero. The CSI-RS with zero transmission power is also referred to as a zero power CSI-RS. The zero power CSI-RS is set independently of the CSI-RS of the antenna ports 15 to 22. Further, the CSI-RS of the antenna ports 15 to 22 is also referred to as a non-zero power CSI-RS.

The base station device 1 sets CSI-RS as control information specific to the terminal device 2 through the RRC signaling. In the terminal device 2, the CSI-RS is set through the RRC signaling by the base station device 1. Further, in the terminal device 2, the CSI-IM resources which are resources for measuring interference power can be set. The terminal device 2 generates feedback information using the CRS, the CSI-RS, and/or the CSI-IM resources on the basis of a setting from the base station device 1.

Resource elements indicated by D1 to D2 indicate the DL-DMRSs of the CDM group 1 and the CDM group 2, respectively. The DL-DMRS is constituted using an orthogonal sequence (orthogonal code) using a Walsh code and a scramble sequence according to a pseudo random sequence. Further, the DL-DMRS is independent for each antenna port and can be multiplexed within each resource block pair. The DL-DMRSs are in an orthogonal relation with each other between the antenna ports in accordance with the CDM and/or the FDM. Each of DL-DMRSs undergoes the CDM in the CDM group in accordance with the orthogonal codes. The DL-DMRSs undergo the FDM with each other between the CDM groups. The DL-DMRSs in the same CDM group are mapped to the same resource element. For the DL-DMRSs in the same CDM group, different orthogonal sequences are used between the antenna ports, and the orthogonal sequences are in the orthogonal relation with each other. The DL-DMRS for the PDSCH can use some or all of the eight antenna ports (the antenna ports 7 to 14). In other words, the PDSCH associated with the DL-DMRS can perform MIMO transmission of up to 8 ranks. The DL-DMRS for the EPDCCH can use some or all of the four antenna ports (the antenna ports 107 to 110). Further, the DL-DMRS can change a spreading code length of the CDM or the number of resource elements to be mapped in accordance with the number of ranks of an associated channel.

The DL-DMRS for the PDSCH to be transmitted through the antenna ports 7, 8, 11, and 13 are mapped to the resource element indicated by D1. The DL-DMRS for the PDSCH to be transmitted through the antenna ports 9, 10, 12, and 14 are mapped to the resource element indicated by D2. Further, the DL-DMRS for the EPDCCH to be transmitted through the antenna ports 107 and 108 are mapped to the resource element indicated by D1. The DL-DMRS for the EPDCCH to be transmitted through the antenna ports 109 and 110 are mapped to the resource element denoted by D2.

<Details of Downlink Resource Elements Mapping of NR in Present Embodiment>

Figure 11:
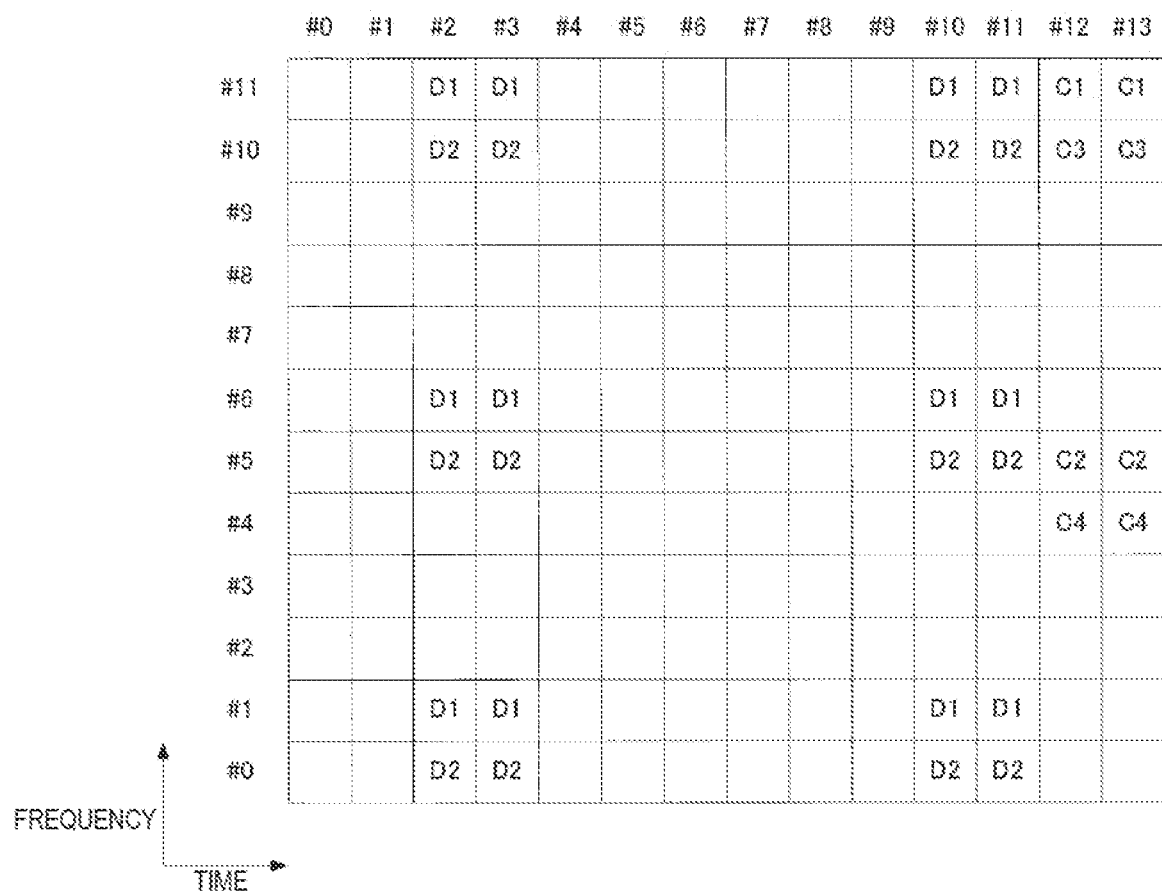
FIG. 11 is a diagram illustrating an example of downlink resource element mapping of NR according to the present embodiment.

FIG. 11 is a diagram illustrating an example of the downlink resource element mapping of NR according to the present embodiment. FIG. 11 illustrates a set of resource elements in the predetermined resources in a case in which parameter set 0 is used. The predetermined resources illustrated in FIG. 11 are resources formed by a time length and a frequency bandwidth such as one resource block pair in LTE.

In NR, the predetermined resource is referred to as an NR resource block (NR-RB). The predetermined resource can be used for a unit of allocation of the NR-PDSCH or the NR-PDCCH, a unit in which mapping of the predetermined channel or the predetermined signal to a resource element is defined, or a unit in which the parameter set is set.

In the example of FIG. 11, the predetermined resources include 14 OFDM symbols indicated by OFDM symbol numbers 0 to 13 in the time direction and 12 sub carriers indicated by sub carrier numbers 0 to 11 in the frequency direction. In a case in which the system bandwidth includes the plurality of predetermined resources, sub carrier numbers are allocated throughout the system bandwidth.

Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

Figure 12:
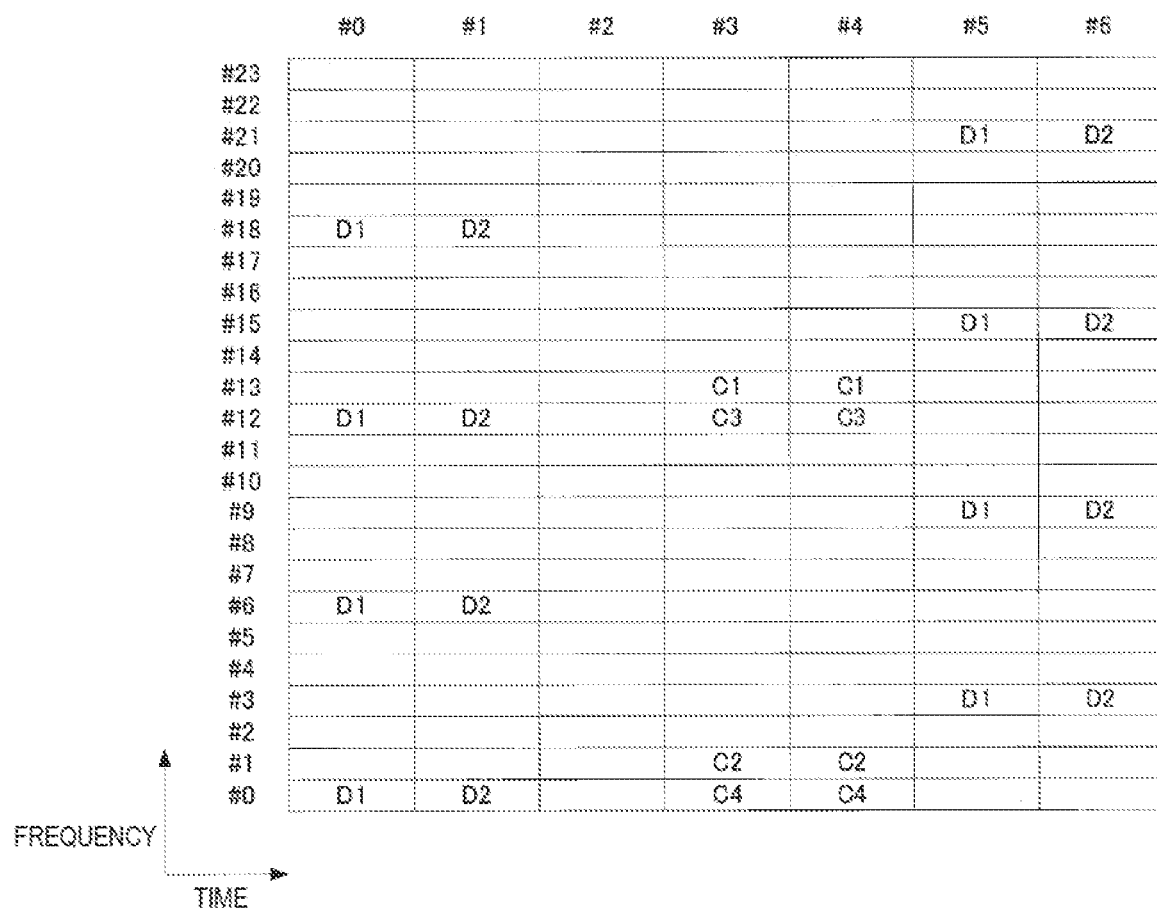
FIG. 12 is a diagram illustrating an example of downlink resource element mapping of NR according to the present embodiment.

FIG. 12 is a diagram illustrating an example of the downlink resource element mapping of NR according to the present embodiment. FIG. 12 illustrates a set of resource elements in the predetermined resources in a case in which parameter set 1 is used. The predetermined resources illustrated in FIG. 12 are resources formed by the same time length and frequency bandwidth as one resource block pair in LTE.

In the example of FIG. 12, the predetermined resources include 7 OFDM symbols indicated by OFDM symbol numbers 0 to 6 in the time direction and 24 sub carriers indicated by sub carrier numbers 0 to 23 in the frequency direction. In a case in which the system bandwidth includes the plurality of predetermined resources, sub carrier numbers are allocated throughout the system bandwidth.

Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

Figure 13:
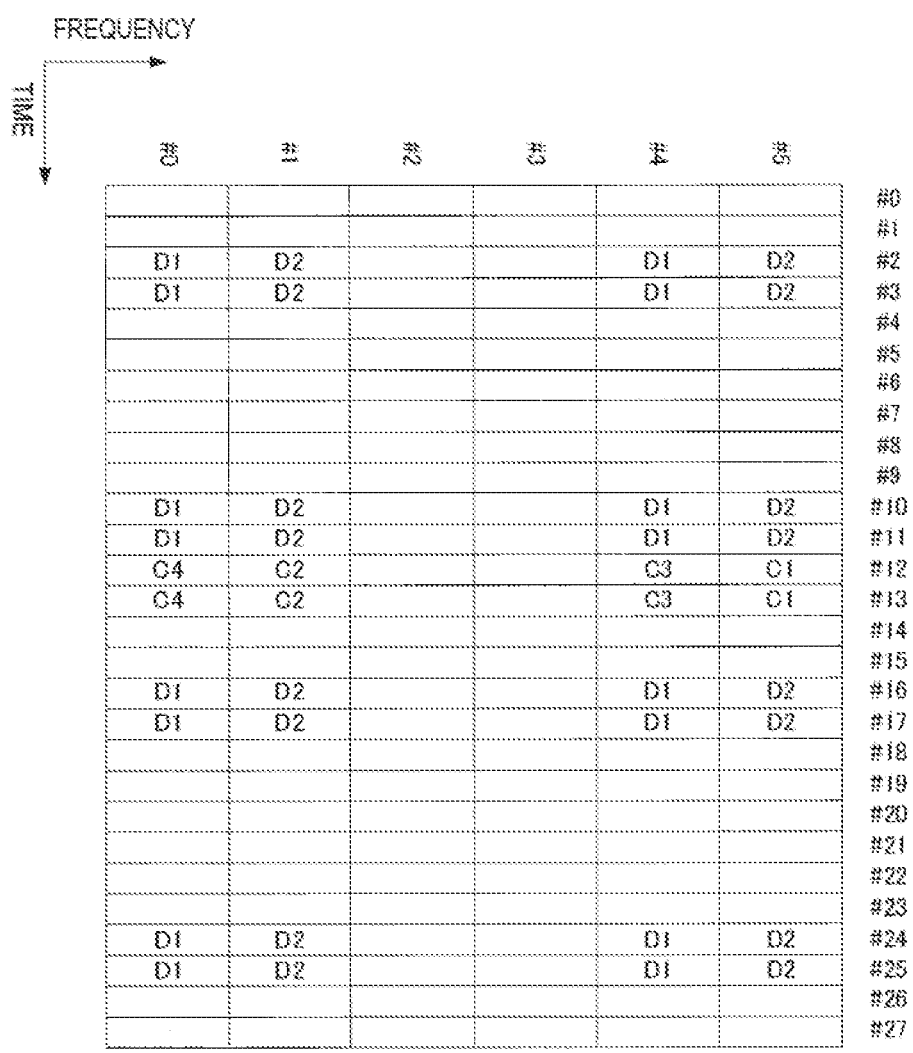
FIG. 13 is a diagram illustrating an example of downlink resource element mapping of NR according to the present embodiment.

FIG. 13 is a diagram illustrating an example of the downlink resource element mapping of NR according to the present embodiment FIG. 13 illustrates a set of resource elements in the predetermined resources in a case in which parameter set 1 is used. The predetermined resources illustrated in FIG. 13 are resources formed by the same time length and frequency bandwidth as one resource block pair in LTE.

Figure 15:
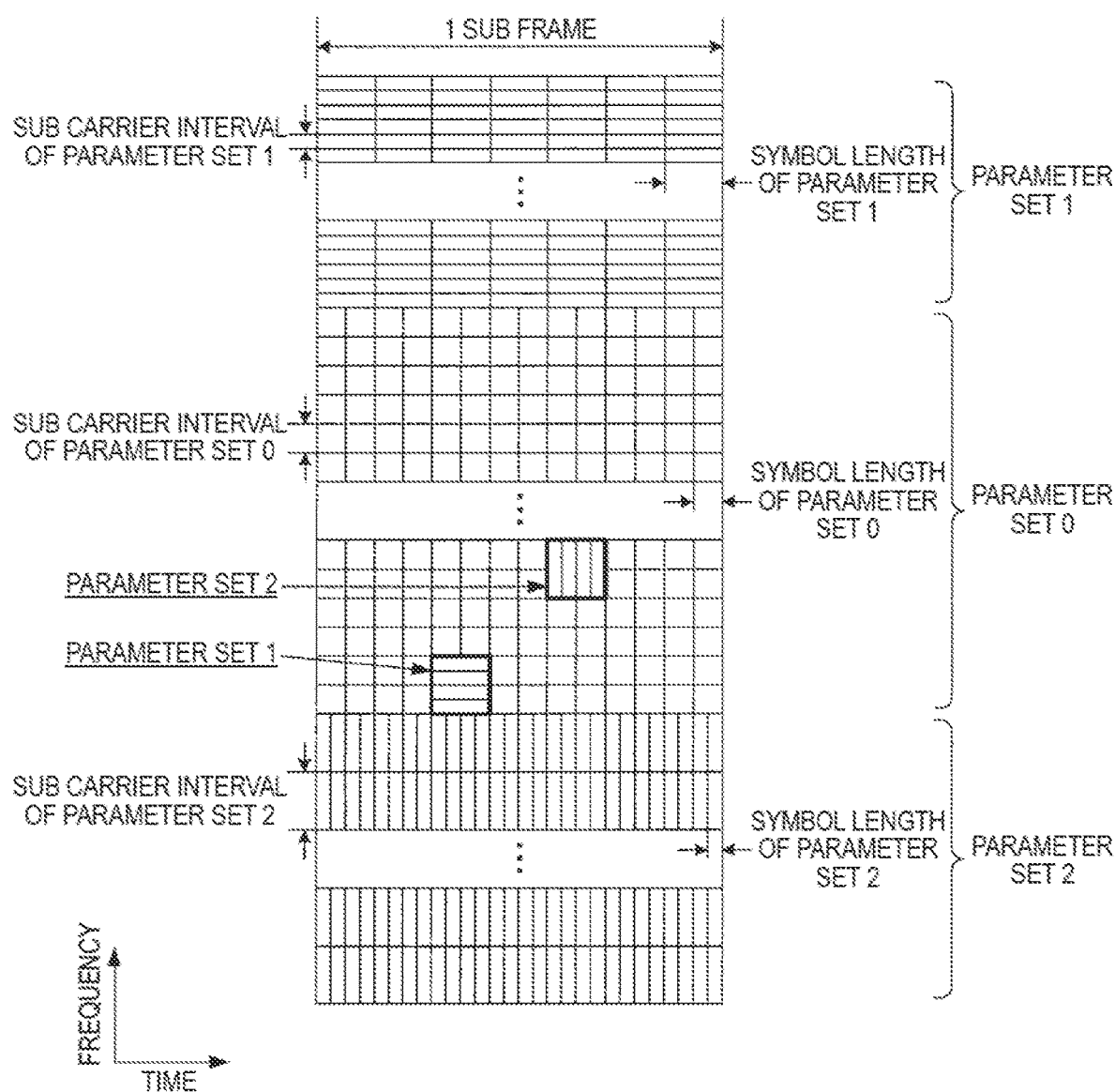
FIG. 15 is a diagram illustrating an example of switching of a parameter set in the present embodiment.

In the example of FIG. 15, the predetermined resources include 28 OFDM symbols indicated by OFDM symbol numbers 0 to 27 in the time direction and 6 sub carriers indicated by sub carrier numbers 0 to 6 in the frequency direction. In a case in which the system bandwidth includes the plurality of predetermined resources, sub carrier numbers are allocated throughout the system bandwidth.

Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

<Uplink Transmission Power Control of Dual Connectivity>

In a case in which a plurality of cell groups are set in the terminal device 2, the terminal device 2 performs the transmission power control of the uplink physical channel and/or the uplink physical signal using DC power control mode 1 or DC power control mode 2. In a case in which a sum of transmission power requested by an uplink physical channel and/or uplink physical signal scheduled to be transmitted does not exceed maximum uplink transmission power, the terminal device 2 can send the uplink physical channel and/or the uplink physical signal scheduled to be transmitted, with the transmission power. Conversely, in a case in which the sum of the transmission power exceeds the maximum uplink transmission power, the transmission power is scaled on the basis of specification decided in DC power control mode 1 or DC power control mode 2 or the transmission of the predetermined uplink physical channel and/or uplink physical signal is stopped.

DC power control mode 1 is set in the terminal device 2 in a case in which the terminal device 2 supports the synchronous DC and DC power control mode 1 is set from a higher layer. In DC power control mode 1, a state in which network is synchronized between a master base station device and a secondary base station device is assumed. In a case in which a difference in a maximum uplink timing between serving cells belonging to different cell groups is equal to or less than a predetermined value, DC power control mode 1 is operated. That is, DC power control mode 1 is operated on the assumption of a state in which a sub frame boundary of the MCG and a sub frame boundary of the SCG are matched.

In DC power control mode 1, the terminal device 2 performs prioritization on the basis of the type of uplink physical channel or content of information transmitted with the uplink physical channel and distributes transmission power. Further, the terminal device 2 distributes power with preference for the MCG when the priority is the same between the CGs.

The priority of the power distribution and an example of the power distribution in DC power control mode 1 will be described. The terminal device 2 adjusts and allocates the transmission power in the order of the PRACH, the PUCCH or the PUSCH associated with the UCI including the HARQ-ACK and/or the SR, the PUCCH or the PUSCH associated with the UCI including neither the HARQ-ACK nor the SR, the PUSCH not associated with the UCI, and the SRS. Moreover, in a case in which two CGs have the same uplink physical channel, the transmission power is adjusted and allocated with preference for the MCG over the SCG. In the adjustment of the transmission power, the following Expression (1) is used.

[Math. 1]

$$S(i1) = P_{CMAX}(i1, i2) - P_u(i1) - P_q(i2) - \min\left\{\max\left\{\begin{array}{c} 0, \\ P_{CMAX}(i1, i2) \cdot \frac{\gamma_{CG2}}{100} - P_q(i2) \end{array}\right\} \right\} \quad (1)$$
$$P'_q(i2)$$

Specifically, the transmission power of each uplink physical channel and the SRS is adjusted so that a situation in which the transmission power does not exceed $S(i1)$ of the foregoing Expression (1) is satisfied. Here, $i1$ of the Expression (1) is a sub frame number of the first CG, $i2$ is a sub frame number of the second CG, $P_{CMAX}(i1, i2)$ is maximum uplink transmission power during a period in which sub frame $i1$ and the sub frame $i2$ overlap, $P_u(i1)$ is a sum of the transmission power of the uplink physical channel of CG1 which has already been allocated, $P_q(i2)$ is a sum of the transmission power of the uplink physical channel and/or the SRS of CG2 which has already been allocated, $P'_q(i2)$ is a sum of the transmission power requested by the uplink physical channel and/or the SRS of CG2 to which the transmission power has not yet been allocated, and $\gamma_{CG2}$ is a ratio of minimum guaranteed power for uplink transmission of CG2 instructed from a higher layer.

DC power control mode 2 is set in the terminal device 2 in a case in which the terminal device 2 supports the asynchronous DC and DC power control mode 1 is not set from a higher layer. DC power control mode 2 can be operated even in a state in which a network is not synchronized between a master base station device and a secondary base station device. That is, DC power control mode 2 is operated on the assumption of a state in which a sub frame boundary of the MCG and a sub frame boundary of the SCG are not matched.

In DC power control mode 2, the terminal device 2 distributes surplus power to the uplink physical channel and/or uplink physical signal that is generated earlier while minimally guaranteeing the guaranteed power for a different cell group.

An example of the power distribution in DC power control mode 2 will be described. In a case in which the sub frame i1 of CG1 overlaps the sub frame i2-1 and the sub frame i2 of CG2, the terminal device 2 decides transmission power allocated to CG1 using $P_{CG1}(i1)$ decided in the following Expression (2) as an upper limit.

[Math. 2]

$$P_{CG1}(i1) = \min\left\{\begin{array}{c} P_q(i1), \\ P_{CMAX}(i1, i2-1) - P_{PRACH\_CG1}(i1) - \\ \max\left\{\begin{array}{c} P_{CMAX}(i1, i2-1) \cdot \frac{\gamma_{CG2}}{100}, \\ P_{CG2}(i2-1) + P_{PRACH\_CG2}(i2-1), \\ P_{PRACH\_CG2}(i2) \end{array}\right\} \end{array}\right\} \quad (2)$$

Specifically, in a case in which a sum of power requested by the PUCCH, the PUSCH, and/or the SRS generated in the sub frame i1 exceeds $P_{CG1}(i1)$, the transmission power of each uplink physical channel and/or uplink physical signal is scaled so that a situation in which the sum of the power does not exceed $P_{CG1}(i1)$ is satisfied. Here, $P_q(i1)$ of Expression (2) is a sum of the transmission power requested by the uplink physical channel and/or the SRS of CG1, $P_{CMAX}(i1, i2-1)$ is maximum uplink transmission power of a period in which the sub frame i1 and the sub frame i2-1 overlap, $P_{PRACH\_CG1}(i1)$ is transmission power of the PRACH of the sub frame i1 of CG1, $P_{PRACH\_CG2}(i2-1)$ is transmission power of the PRACH of the sub frame i2-1 of CG2, $P_{PRACH\_CG2}(i2)$ is transmission power of the PRACH of the sub frame i2 of CG2, $P_{CG2}(i2-1)$ is an upper limit of the transmission power of the PUCCH, the PUSCH, and/or the SRS generated in the sub frame i2-1 of CG2, and $\gamma_{CG2}$ is a ratio of minimum guaranteed power for uplink transmission of CG2 instructed from a higher layer.

<Frame Configuration of NR in Present Embodiment>

Figure 14:
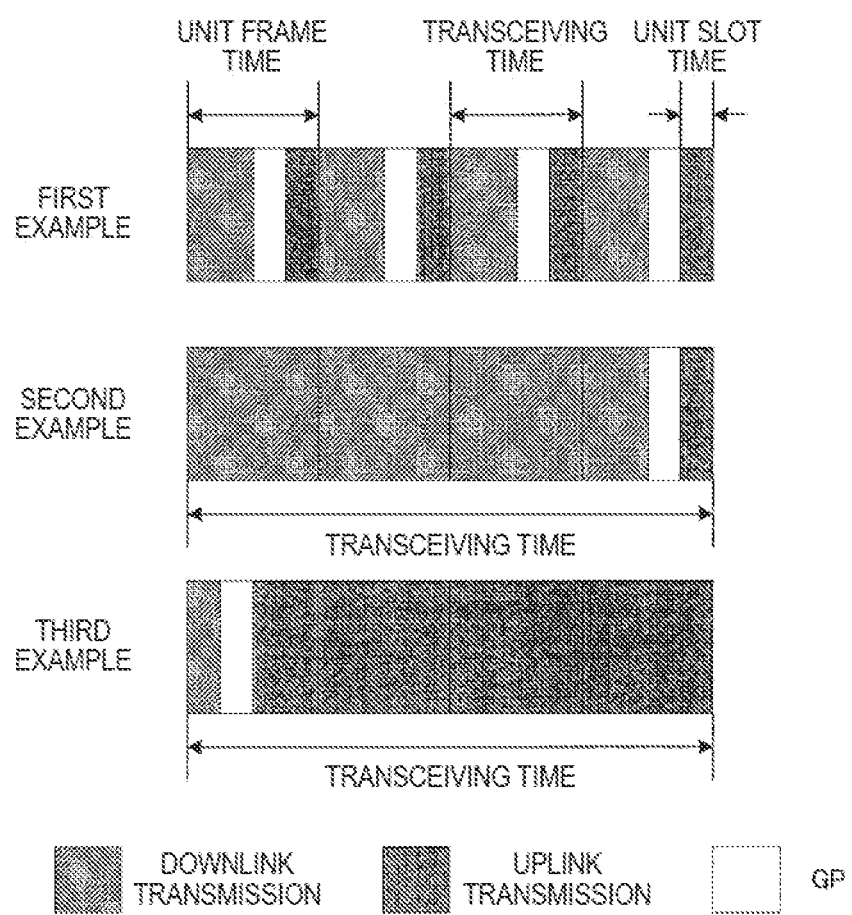
FIG. 14 is a diagram illustrating an example of a frame configuration of a self-contained transmission according to the present embodiment.

In NR, a physical channel and/or a physical signal can be transmitted by self-contained transmission. FIG. 14 illustrates an example of a frame configuration of the self-contained transmission in the present embodiment. In the self-contained transmission, single transceiving includes successive downlink transmission, a GP, and successive downlink transmission from the head in this order. The successive downlink transmission includes at least one piece of downlink control information and the DMRS. The downlink control information gives an instruction to receive a downlink physical channel included in the successive downlink transmission and to transmit an uplink physical channel included in the successive uplink transmission. In a case in which the downlink control information gives an instruction to receive the downlink physical channel, the terminal device 2 attempts to receive the downlink physical channel on the basis of the downlink control information. Then, the terminal device 2 transmits success or failure of reception of the downlink physical channel (decoding success or failure) by an uplink control channel included in the uplink transmission allocated after the GP. On the other hand, in a case in which the downlink control information gives an instruction to transmit the uplink physical channel, the uplink physical channel transmitted on the basis of the downlink control information is included in the uplink transmission to be transmitted. In this way, by flexibly switching between transmission of uplink data and transmission of downlink data by the downlink control information, it is possible to take countermeasures instantaneously to increase or decrease a traffic ratio between an uplink and a downlink. Further, by notifying of the success or failure of the reception of the downlink by the uplink transmission immediately after the success or failure of reception of the downlink, it is possible to realize low-delay communication of the downlink.

A unit slot time is a minimum time unit in which downlink transmission, a GP, or uplink transmission is defined. The unit slot time is reserved for one of the downlink transmission, the GP, and the uplink transmission. In the unit slot time, neither the downlink transmission nor the uplink transmission is included. The unit slot time may be a minimum transmission time of a channel associated with the DMRS included in the unit slot time. One unit slot time is defined as, for example, an integer multiple of a sampling interval ($T_s$) or the symbol length of NR.

The unit frame time may be a minimum time designated by scheduling. The unit frame time may be a minimum unit in which a transport block is transmitted. The unit slot time may be a maximum transmission time of a channel associated with the DMRS included in the unit slot time. The unit frame time may be a unit time in which the uplink transmission power in the terminal device 2 is decided. The unit frame time may be referred to as a sub frame. In the unit frame time, there are three types of only the downlink transmission, only the uplink transmission, and a combination of the uplink transmission and the downlink transmission. One unit frame time is defined as, for example, an integer multiple of the sampling interval ($T_s$), the symbol length, or the unit slot time of NR.

A transceiving time is one transceiving time. An interval between one transceiving and another transceiving is occupied by a time (gap) in which neither a physical channel nor a physical signal is transmitted. It is not preferable for the terminal device 2 to average CSI measurements between different transceivings. The transceiving time is also referred to as a TTI. One transceiving time is defined as, for example, an integer multiple of a sampling interval (Ts), a symbol length, a unit slot time, or a unit frame time of NR.

<Switching of Parameter Set>

In the present embodiment, the base station device 1 and the terminal device 2 can communicate while switching a parameter set used for communication.

(Reason Why Parameter Set Switching is Considered to be Necessary)

As an example of a method of using a plurality of defined parameter sets, a method of using the parameter sets selectively in accordance with an assumed use case is considered as an example. For example, in a case in which the above-mentioned use case is assumed, a method of applying a first parameter set to eMBB, applying a second parameter set to mMTC, and applying a third parameter set to URLLC is considered. Further, in NR, it is required to be able to deal with other use cases, and applying different parameter sets to other use cases is considered.

Therefore, in NR, if is preferable to introduce a framework with forward compatibility which can be operated even in a case in which a parameter set is newly added in the future. Furthermore, it is preferable for the parameter set to be able to be flexibly switched in accordance with a situation of the terminal device 2 or a communication environment. For example, in a case in which the number of terminal devices 2 supporting mMTC increases, it is preferable to switch resources to which a parameter set corresponding to another use case is allocated to a parameter set corresponding to a use case of mMTC and provide it. Of course, the use case is not limited to mMTC. Further, in each use case, a plurality of parameter sets are considered to be application candidates. In this case, it is preferable to apply the parameter set while appropriately switching to an appropriate parameter set from among a plurality of parameter sets.

As described above, the function of switching the parameter set to be applied is considered to be preferable in order to cope with various use cases required in NR.

(Details of Parameter Set Switching)

The base station device 1 variably sets a sub carrier interval and a symbol length used for communication. Further, the base station device 1 notifies of information for switching the parameter set indicating the sub carrier interval and the symbol length in accordance with setting content. Such information is hereinafter also referred to as switching-related information. With the notification of the switching-related information, switching of the parameter set can be realized as will be described later. On the other hand, the terminal device 2 receives resources in which the sub carrier interval and the symbol length are variably set on the basis of the information that is notified of to switch the parameter set indicating the sub carrier interval and the symbol length in accordance with the setting content (that is, the switching-related information). The terminal device 2 can decode signals destined for itself with reference to the switching-related information even in a case in which the parameter set is switched.

As the switching method, a static switching method, a semi-static switching method, and a dynamic switching method are considered.

The static switching method is a switching method in which the same parameter set is set within a predetermined period, and switching of the parameter set in each predetermined period is permitted. For example, the parameter set is set when a connection is established or reconstructed. A relation between the resources and the parameter set in this case is illustrated in FIGS. 6 and 7. The receiving device can receive signals in accordance with the parameter set in which scheduled resources are set.

The semi-static switching method and the dynamic switching method are switching methods in which switching of an adaptive parameter set is permitted. Further, "semi-static" means that an association between the parameter set and resources to which the parameter set is applied (hereinafter also referred to as parameter set mapping) is decided in advance. Further, "dynamic" means that the parameter set mapping is not decided in advance. An example of the relation between the resources and the parameter set in this case is illustrated in FIG. 15.

FIG. 15 is a diagram illustrating an example of parameter set switching in the present embodiment. In the example illustrated in FIG. 15, a parameter set 1 or a parameter set 2 is mapped to some resources specified by a sub carrier position (for example, a sub carrier number) and a symbol position (for example, a symbol number) among resources to which a parameter set 0 is mapped. In a case in which signals destined for itself are transmitted in these resources, the receiving device performs switching from the parameter set 0 to the parameter set 1 or to the parameter set 2 and receives the signals.

Hereinafter, the semi-static switching method and the dynamic switching method will be described in detail in order. Further, the following description will proceed under the assumption of downlink communication in which the transmitting device is the base station device 1, and the receiving device is the terminal device 2.

(Semi-Static Switching Method)

The base station device 1 transmits signals while semi-statically switching the parameter set allocated to each terminal device 2. In this case, the base station device 1 generates the switching-related information for performing the semi-static switching and notifies the terminal device 2 of the switching-related information.

For example, the switching-related information may include information in which the parameter set is associated with the resources to which the parameter set is applied. The information is hereinafter also referred to as mapping information.

For example, the switching-related information may include information indicating resources used for communication with the terminal device 2 of the communication counterpart. The information is hereinafter also referred to as resource allocation information.

The terminal device 2 can perform a reception signal process on the resources used for the signals destined for itself in accordance with the resource allocation information. Further, the terminal device 2 can acquire the parameter set set to the resources used for the signals destined for itself in accordance with the mapping information. Accordingly, the terminal device 2 can receive the signals destined for itself using the set parameter set.

Further, the switching-related information may include information indicating whether or not the switching is executed. Accordingly, it is possible to switch whether or not the switching of the parameter set is executed. Further, the information indicating whether or not the switching is executed may be notified of both in a case in which the switching is executed and in a case in which the switching is not performed or may be notified of only in any one case. A method of notifying of only information indicating that the switching is executed is useful in a case in which the switching is a rare case. A method of notifying only of information indicating that the switching is not executed is useful in a case in which the switching is executed by default.

Various specific switching methods can be considered.

A first example is an example of a switching method in a case in which resources are allocated using the sub carrier number. A second example is an example of a switching method in a case in which resources are allocated using the symbol number. A third example is an example of a switching method in a case in which resources are allocated using the sub frame number. A fourth example is an example of a switching method in a case in which resources are allocated using the system frame number.

The respective examples will be described in detail below. Further, the following description will proceed under the assumption that a range in which the semi-static switching of the parameter set is performed is resources to which the parameter set 0 is set.

First Example

Figure 16:
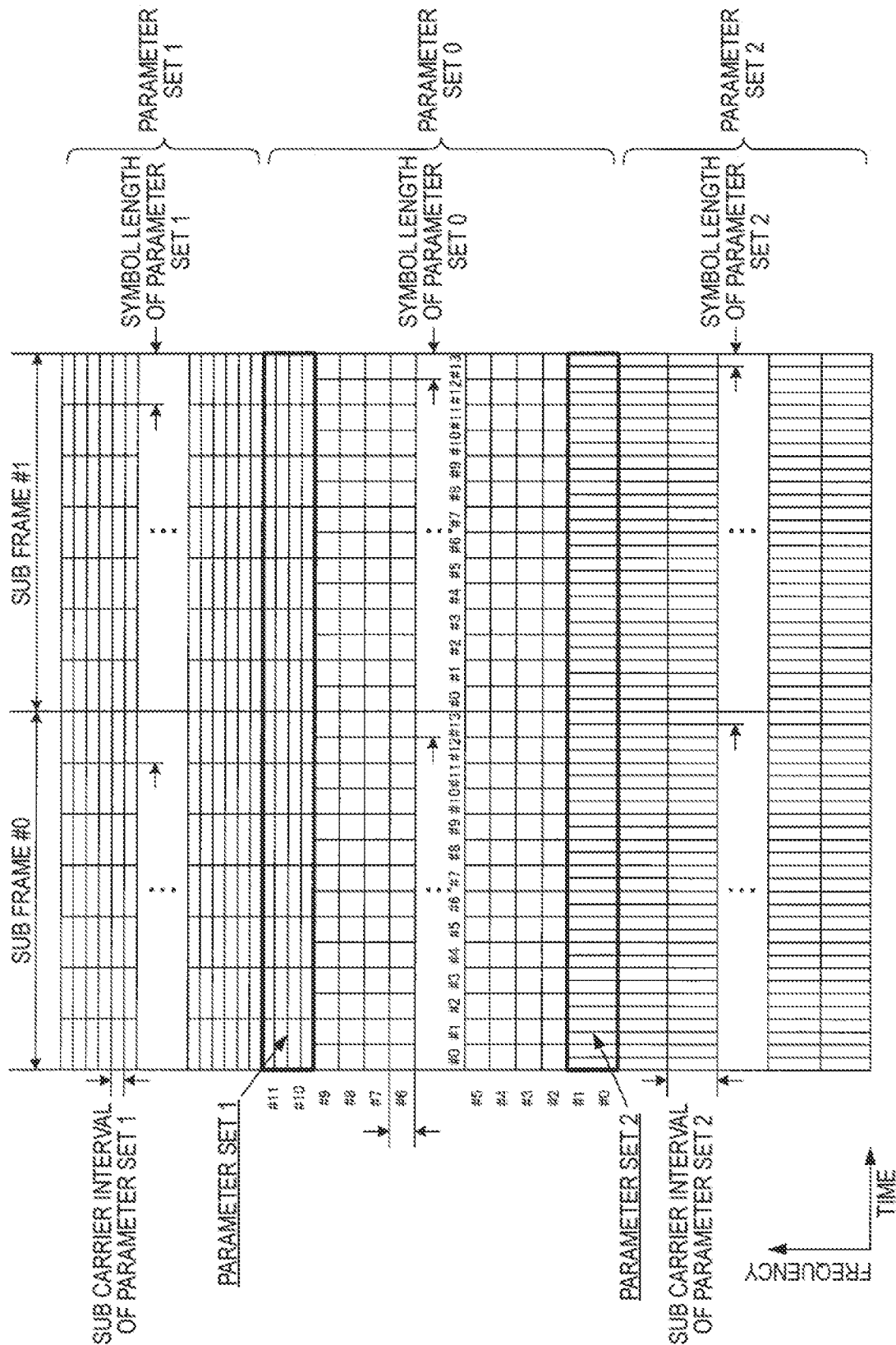
FIG. 16 is a diagram for describing a first example of a semi-static switching method in the present embodiment.

FIG. 16 is a diagram for describing a first example of the semi-static switching method in the present embodiment. As illustrated in FIG. 16, the switching of the parameter set is performed in some frequency resources of the resources to which a predetermined parameter set is set. Here, the frequency resources of the switching target are sub carriers. Specifically, the parameter set 1 is set to 10th and 11th sub carriers among the resources to which the parameter set 0 is set, and the parameter set 2 is set to 0-th and 1-st sub camera. As illustrated in FIG. 16, the switching of the parameter set may be performed on the sub carriers in the parameter set 0, that is, may be performed in units of sub carriers in the parameter set 0.

The base station device 1 gives a notification indicating that the parameter set 1 is set to the 10th and 11th sub carriers among the resources to which the parameter set 0 is set and that the parameter set 2 is set to the 0th and 1st sub carriers to the terminal device 2 as the mapping information. Then, the base station device 1 gives a notification indicating the resource allocation information to the terminal device 2. Further, the terminal device 2 receives the signals using the set parameter set on the basis of the mapping information and the resource allocation information. For example, in a case in which resources scheduled for the terminal device 2 are sub carrier numbers 10 and/or 11, the terminal device 2 attempts to perform decoding using the parameter set 1. Further, in a case in which resources scheduled for the terminal device 2 are sub carrier number 0 and/or 1, the terminal device 2 attempts to perform decoding using the parameter set 2. On the other hand, in a case in which resources scheduled for the terminal device 2 are one of sub carrier numbers 2 to 9, the terminal device 2 attempts to perform decoding using the parameter set 0.

Here, it may be dynamically switched whether or not the switching of the parameter set is executed.

In a case in which the terminal device 2 is notified by the base station device 1 of the information indicating that the switching is executed as the information indicating whether or not the switching is executed, the terminal device 2 switches the parameter set and receives the signals. For example, in the example illustrated in FIG. 16, the terminal device 2 receives the 10th and 11th sub carriers using the parameter set 1, receives the 0th and 1st sub carriers using the parameter set 2, and receives the 2-nd to 9th sub carriers using the parameter set 0.

On the other hand, in a case in which the terminal device 2 is notified by the base station device 1 of the information indicating that the switching is not executed as the information indicating whether or not the switching is executed, the terminal device 2 receives the signals without switching the parameter set. For example, in the example illustrated in FIG. 16, the terminal device 2 receives the 0th to 11th sub carriers using the parameter set 0.

The first example has been described above in detail. In the first example, since the switching is executed in units of sub carriers, the switching is more flexible than in third and fourth examples. Further, in the first example, since there is no blank in the time direction, it is effective for a use case in which a low delay is required.

Second Example

Figure 17:
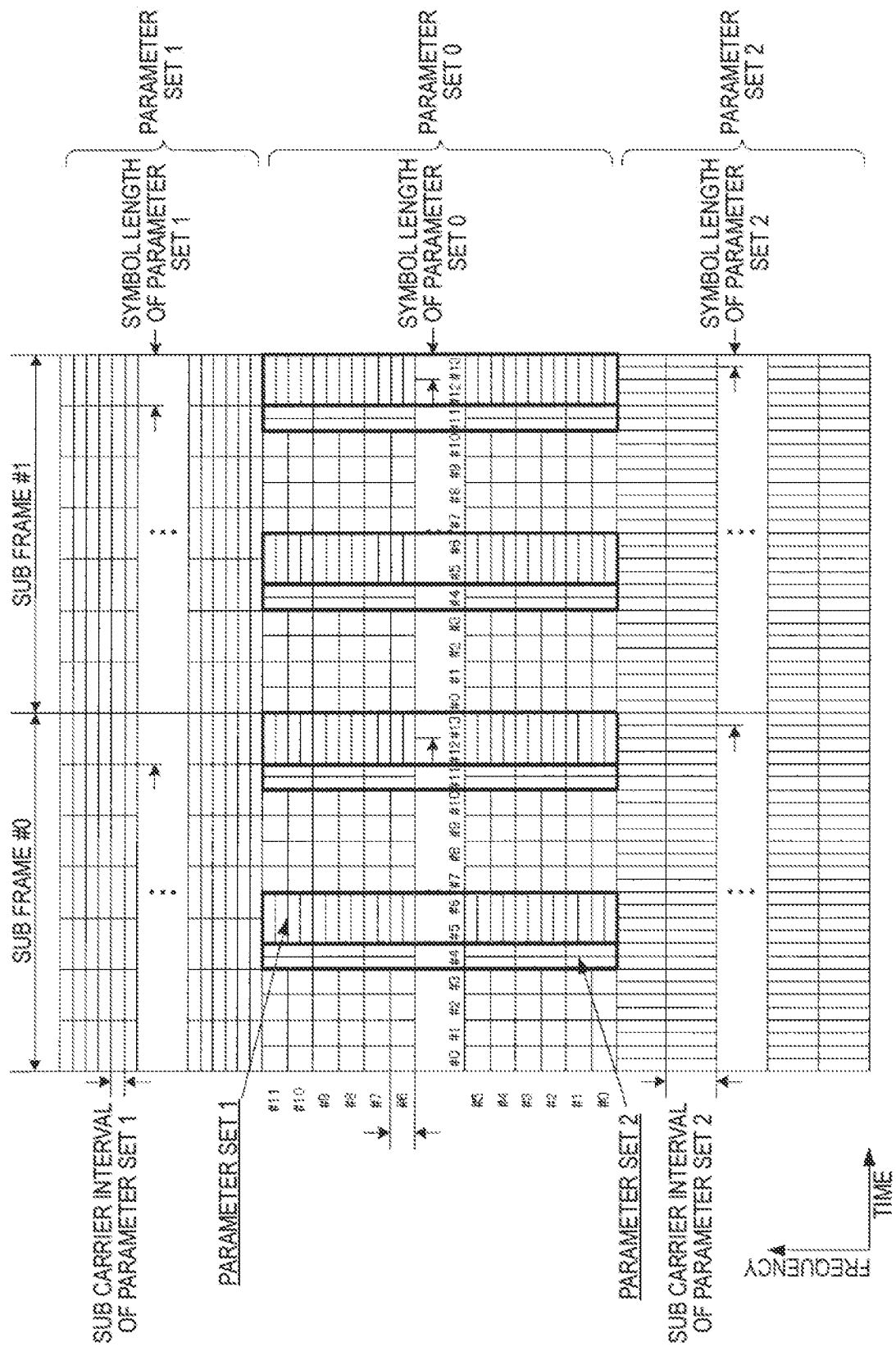
FIG. 17 is a diagram for describing a second example of a semi-static switching method in the present embodiment.

FIG. 17 is a diagram for describing a second example of the semi-static switching method in the present embodiment. As illustrated in FIG. 17, the parameter set is switched in some time resources among resources to which a predetermined parameter set is set. Here, the time resources of the switching target are symbols. Specifically, the parameter set 1 is set to 5th, 6th, 12th, and 13th symbols among the resources to which the parameter set 0 is set, and the parameter set 2 is set to 4th and 11th symbols. As illustrated in FIG. 17, the switching of the parameter set may be performed on symbols in the parameter set 0, that is, may be performed in units of symbols in the parameter set 0.

The base station device 1 gives a notification indicating that the parameter set 1 is set to the 5th, 6th, 12th, and 13th symbols among the resources to which the parameter set 0 is set and that the parameter set 2 is set to the 4th and 11th symbols to the terminal device 2 as the mapping information. Then, the base station device 1 notifies the terminal device 2 of the resource allocation information. Further, the terminal device 2 receives the signals using the set parameter set on the basis of the mapping information and the resource allocation information. For example, in a case in which resources scheduled for the terminal device 2 are one of symbol numbers 5, 6, 12, and 13, the terminal device 2 attempts to perform decoding using the parameter set 1. Or in a case in which the resources scheduled for the terminal device 2 are one of symbol numbers 4 and 11, the terminal device 2 attempts to perform decoding using the parameter set 2. On the other hand, in a case in which the resources scheduled for the terminal device 2 are any one of symbol numbers 0 to 3 and 7 to 10, the terminal device 2 attempts to perform decoding using the parameter set 0.

Here, it may be dynamically switched whether or not the switching of the parameter set is executed.

In a case in which the terminal device 2 is notified by the base station device 1 of the information indicating that the switching is executed as the information indicating whether or not the switching is executed, the terminal device 2 switches the parameter set and receives the signals. For example, in the example illustrated in FIG. 17, the terminal device 2 receives the 5th, 6th, 12th, and 13th symbols using the parameter set 1, receives the 4th and 11th symbols using the parameter set 2, and receives the 0th to 3rd and 7th to 10th symbols using the parameter set 0.

On the other hand, in a case in which the terminal device 2 is notified by the base station device 1 of the information indicating that the switching is not executed as the information indicating whether or not the switching is executed, the terminal device 2 receives the signals without switching the parameter set. For example, in the example illustrated in FIG. 17, the terminal device 2 receives the 0th to 13th symbols using the parameter set 0.

The second example has been described above in detail. In the second example, the switching is executed in units of symbols, and the switching is more flexible than in the third and fourth examples. Further, in the second example, since there is no blank in the frequency direction, it is effective for use cases of a majority of communications.

Third Example

Figure 18:
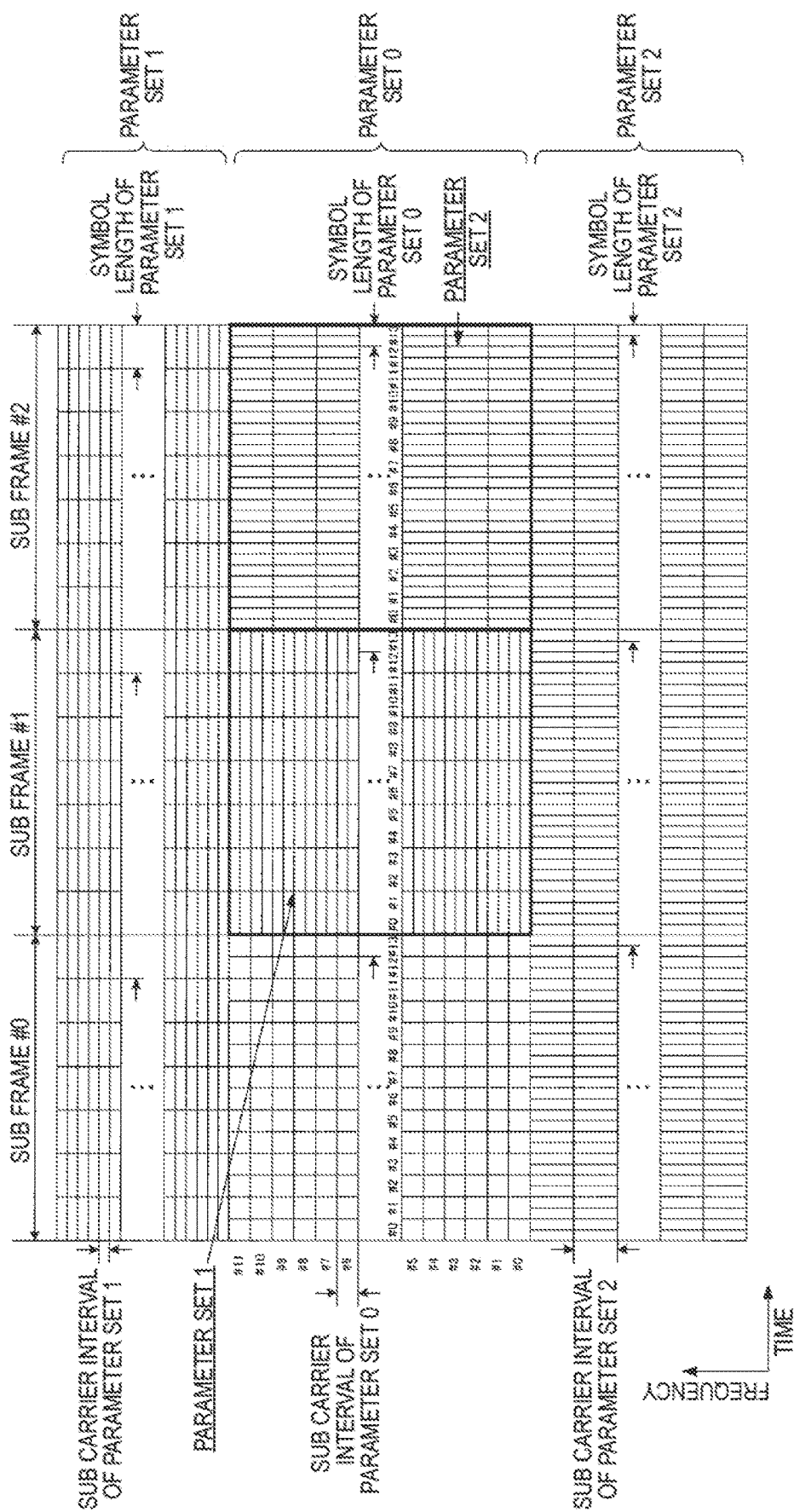
FIG. 18 is a diagram for describing a third example of a semi-static switching method in the present embodiment.

FIG. 18 is a diagram for describing a third example of the semi-static switching method in the present embodiment. As illustrated in FIG. 18, the parameter set is switched in some time resources among resources to which a predetermined parameter set is set. Here, the time resources of the switching target are sub frames. Specifically, the parameter set 1 is set to a 1st sub frame among the resources to which the parameter set 0 is set, and the parameter set 2 is set to a 2nd sub frame. As illustrated in FIG. 18, the switching of the parameter set may be performed on sub frames in the parameter set 0, that is, may be performed in units of sub frames in the parameter set 0.

The base station device 1 gives a notification indicating that the parameter set 1 is set to the 1st sub frame among the resources to which the parameter set 0 is set, and the parameter set 2 is set to the 2nd sub frame to the terminal device 2 as the mapping information. Then, the base station device 1 notifies the terminal device 2 of the resource allocation information. Further, the terminal device 2 receives the signals using the set parameter set on the basis of the mapping information and the resource allocation information. For example, in a case in which resources scheduled for the terminal device 2 are the sub frame number 1, the terminal device 2 attempts to perform decoding using the parameter set 1. Alternatively, in a case in which resources scheduled for the terminal device 2 are the sub frame number 2, the terminal device 2 attempts to perform decoding using the parameter set 2. On the other hand, in a case in which resources scheduled for the terminal device 2 are the sub frame number 0, the terminal device 2 attempts to perform decoding using the parameter set 0.

Here, it may be dynamically switched whether or not the switching of the parameter set is executed.

In a case in which the terminal device 2 is notified by the base station device 1 of the information indicating that the switching is executed as the information indicating whether or not the switching is executed, the terminal device 2 switches the parameter set and receives the signals. For example, in the example illustrated in FIG. 18, the terminal device 2 receives the 1st sub frame using the parameter set 1, receives the 2nd sub frame using the parameter set 2, and receives the 0th sub frame using the parameter set 0.

On the other hand, in a case in which the terminal device 2 is notified by the base station device 1 of the information indicating that the switching is not executed as the information indicating whether or not the switching is executed, the terminal device 2 receives the signals without switching the parameter set. For example, in the example illustrated in FIG. 18, the terminal device 2 receives the 0th to 2nd sub frames using the parameter set 0.

The third example has been described above in detail, in the third example, since switching is executed in units of sub frames, it is unnecessary to consider the sub carrier number or the symbol number as in the first and second examples. Therefore, in the third example, simpler switching than in the first and second examples is possible, and suppression of a control information amount is expected.

Fourth Example

Figure 19:
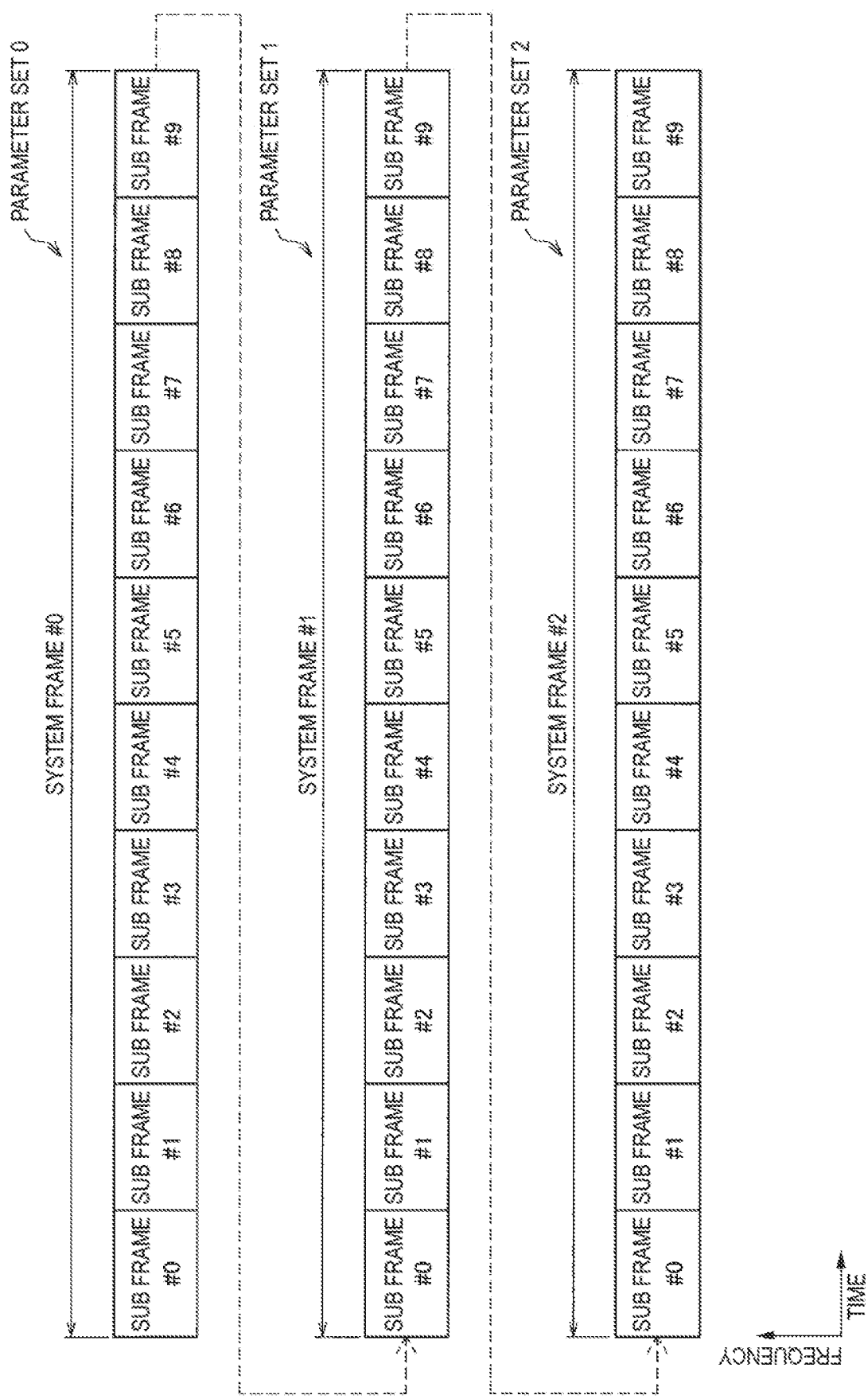
FIG. 19 is a diagram for describing a fourth example of a semi-static switching method in the present embodiment.

FIG. 19 is a diagram for describing a fourth example of the semi-static switching method in the present embodiment. As illustrated in FIG. 19, the parameter set is switched in some time resources among resources to which a predetermined parameter set is set. Here, the time resources of the switching tar get are system frames. Specifically, the parameter set 1 is set to a 1st system frame among the resources to which the parameter set 0 is set, and the parameter set 2 is set to a 2nd system frame. As illustrated in FIG. 18, the switching of the parameter set may be performed on system frames in the parameter set 0, that is, may be performed in units of system frames in the parameter set 0.

Further, in the example illustrated in FIG. 19, the system frame includes fen sub frames, that is, 0th to 9th sub frames, but the present technology is not limited to this example. The system frame can include any number of sub frames.

The base station device 1 gives a notification indicating that the parameter set 1 is set to the 1st system frame among the resources to which the parameter set 0 is set, and the parameter set 2 is set to the 2nd system frame to the terminal device 2 as the mapping information. Then, the base station device 1 notifies the terminal device 2 of the resource allocation information. Further, the terminal device 2 receives the signals using the set parameter set on the basis of the mapping information and the resource allocation information. For example, in a case in which resources scheduled for the terminal device 2 are the system frame number 1, the terminal device 2 attempts to perform decoding using the parameter set 1. Or in a case in which resources scheduled for the terminal device 2 are the system frame number 2, the terminal device 2 attempts to perform decoding using the parameter set 2. On the other hand, in a case in which resources scheduled for the terminal device 2 are the system frame number 0, the terminal device 2 attempts to perform decoding using the parameter set 0.

Here, it may be dynamically switched whether or not the switching of the parameter set is executed.

In a case in which the terminal device 2 is notified by the base station device 1 of the information indicating that the switching is executed as the information indicating whether or not the switching is executed, the terminal device 2 switches the parameter set and receives the signals. For example, in the example illustrated in FIG. 19, the terminal device 2 receives the 1st system game using the parameter set 1, receives the 2nd system frame using the parameter set 2, and receives the 0th system frame using the parameter set 0.

On the other hand, in a case in which the terminal device 2 is notified by the base station device 1 of the information indicating that the switching is not executed as the information indicating whether or not the switching is executed, the terminal device 2 receives the signals without switching the parameter set. For example, in the example illustrated in FIG. 19, the terminal device 2 receives the 0th to 2nd system frames using the parameter set 0.

The fourth example has been described above in detail, in the fourth example, since switching is executed in units of system frames, it is unnecessary to consider the sub carrier number or the symbol number as in the first and second examples. Further, in the fourth example, the time interval of the switching is longer than in the fluid example. Therefore, in the third example, simpler switching than in the first to third examples is possible, and suppression of a control information amount is expected. The fourth example is effective for a use case in which a frequency at which the switching is executed is low.

Further, the first to fourth examples described above can be appropriately combined. For example, if the first example and the second example are combined, parameter switching is executed in resources specified by the sub carrier number and the symbol number illustrated in FIG. 15.

Switching of Parameter Set Mapping

The switching-related information may include information indicating switching of the association between the parameter set and the resources to which the parameter set is set. In this case, the dynamic switching of the parameter set mapping is possible.

For example, identification information is allocated to each parameter set mapping of a switching candidate. The identification information is hereinafter also referred to as a parameter set mapping index. Further, in a case in which the parameter set mapping is switched, the base station device 1 notifies the terminal device 2 of information indicating a parameter set mapping index of a switching destination as the mapping information. Further, in a case in which the switching candidates are limited to two, the mapping information here may be information indicating whether or not switching from one parameter set mapping to another parameter set mapping is executed.

Figure 20:
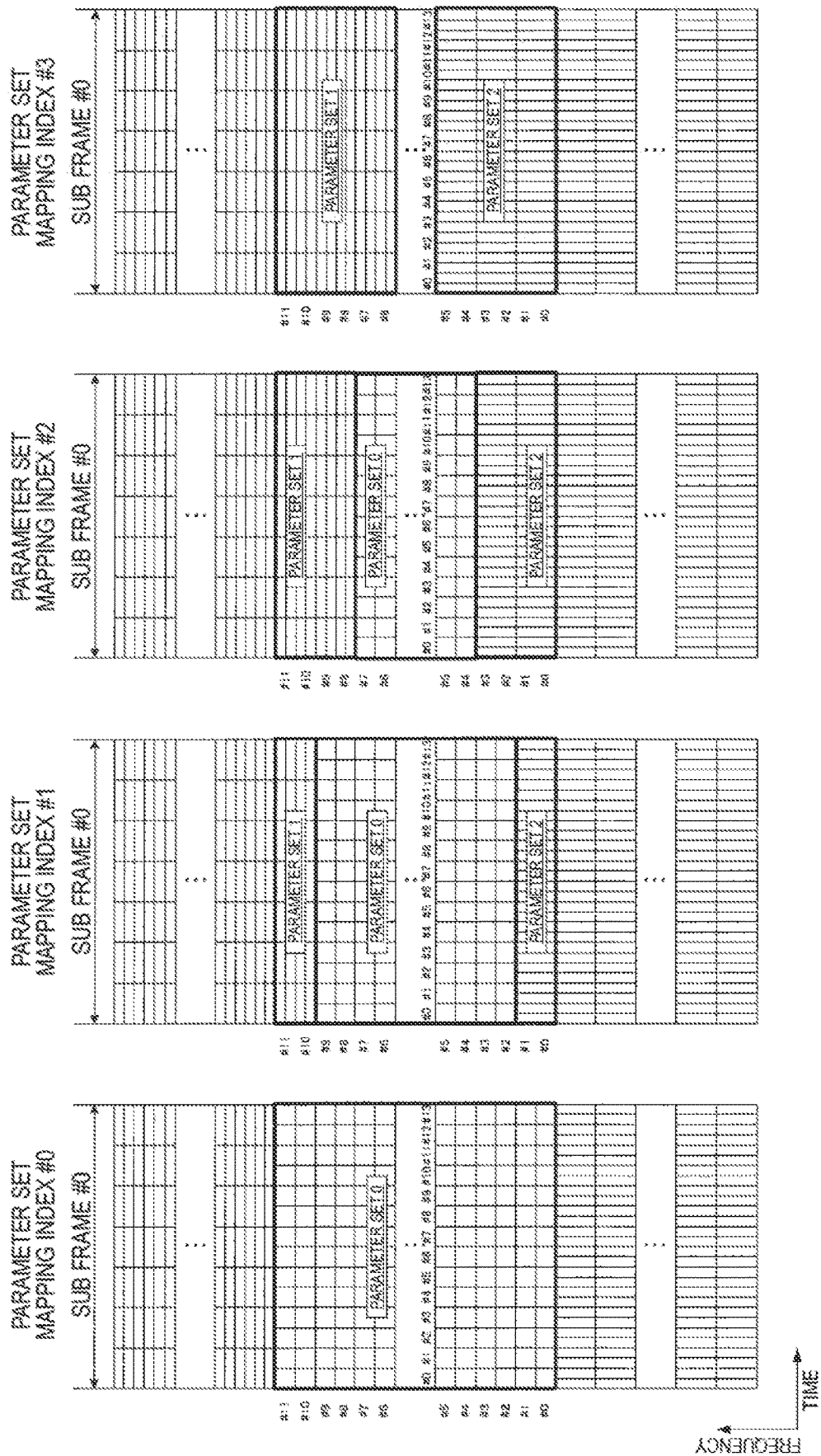
FIG. 20 is a diagram for describing an example of switching of parameter set mapping according to the present embodiment.

FIG. 20 is a diagram for describing an example of switching of the parameter set mapping according to the present embodiment. In the example illustrated in FIG. 20, in a parameter set mapping index #0, only the parameter set 0 is set within a range in which the semi-static parameter switching is performed. On the other hand, in parameter set mapping indices #1 and #2, the parameter set 0 is set in a part of the range in which the semi-static parameter switching is performed, and the parameter set 1 or 2 is set in another part. Further, in a parameter set mapping index #3, the parameter set 1 or 2 is set in the entire range in which the semi-static parameter switching is performed.

Further, FIG. 20 illustrates an example in which the range in which the semi-static parameter switching is performed is fixed, but the present technology is not limited to this example. For example, the range in which the semi-static parameter switching is performed may be variable.

Hereinafter, an example of a flow of the switching process will be described with reference to FIG. 21.

Figure 21:
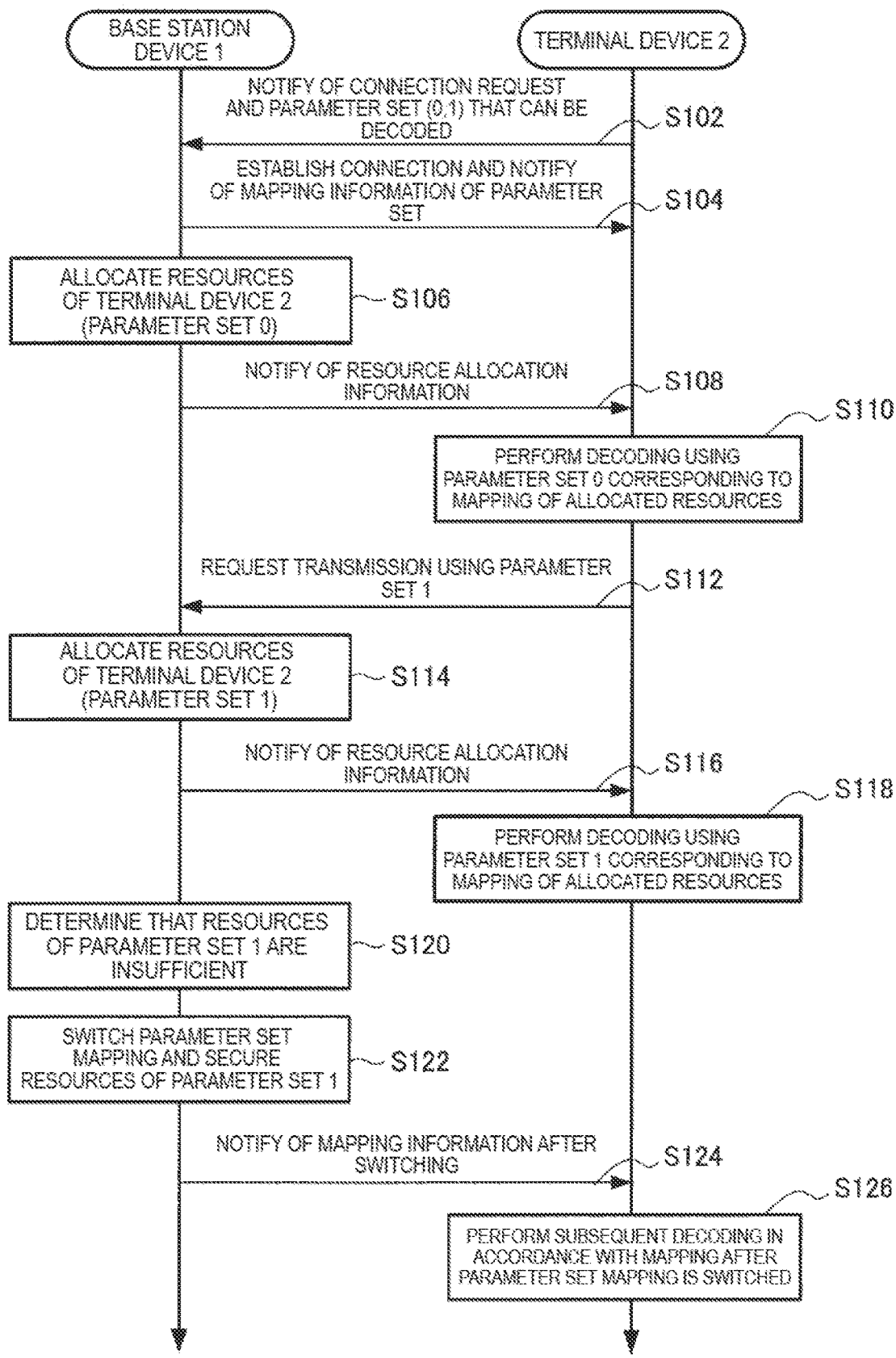
FIG. 21 is a sequence diagram illustrating an example of a flow of a switching process of a semi-static parameter set executed in a communication system according to the present embodiment.

FIG. 21 is a sequence diagram illustrating an example of a flow of a semi-static parameter set switching process executed in the communication system according to the present embodiment. The base station device 1 and the terminal device 2 are involved in the present sequence.

As illustrated in FIG. 21, first, the terminal device 2 notifies the base station device 1 of a connection request and information indicating the parameter set that can be decoded by the terminal device 2 using, for example, RRC signaling or the like (step S102). Here, it is assumed that the terminal device 2 supports decoding of the parameter set 0 and the parameter set 1. Then, the base station device 1 establishes a connection and notifies the terminal device 2 of the mapping information of the parameter set using, for example, RRC signaling or the like (step S104). Here, the mapping information includes, for example, the association between the parameter set mapping and the parameter set mapping indices of a plurality of switching candidates and information indicating initial settings of the parameter set mapping indices. Then, the base station device 1 allocates the resources to which the parameter set 0 is set as resources used for the signals destined for the terminal device 2 (step S106). Then, the base station device 1 notifies the terminal device 2 of the resource allocation information using the DCI or the like (step S108). Thereafter, the base station device 1 transmits a signal to the terminal device 2 in the resources to which the parameter set 0 is set. Then, the terminal device 2 determines that the signal destined for itself is transmitted using the resources to which the parameter set 0 is set on the basis of the mapping information and the resource allocation information, and attempts to perform decoding using the parameter set 0 (step S110).

Here, the terminal device 2 may request transmission using another parameter set. An example of a flow of a process in that case will be described below.

For example, the terminal device 2 notifies the base station device 1 of a message requesting transmission using the parameter set 1 (step S112). Then, the base station device 1 decides whether or not transmission using the parameter set 1 is performed, and allocates the resources to which the parameter set 1 is set as resources used for signals destined for the terminal device 2 when the transmission is performed (step S114). Further, the base station device 1 may use the message from the terminal device 2 described in the present sequence as a determination criterion or may use oilier information (for example, a shortage of resources, a communication load, a number of users, or the like) as a determination criterion. Then, the base station device 1 notifies the terminal device 2 of the resource allocation information using the DCI or the like (step S116). Thereafter, the base station device 1 transmits a signal to the terminal device 2 in the resource to which the parameter set 1 is set. Then, the terminal device 2 determines that the signal destined for itself is transmitted using the resources to which the parameter set 1 is set on the basis of the mapping information and the resource allocation information, and attempts to perform decoding using the parameter set 1 (step S118).

Here, the base station device 1 may perform the dynamic switching of the parameter set mapping. At this time, the base station device 1 may use the message from the terminal device 2 as a determination criterion or may use other information (for example, a shortage of resources, a communication load, a number of users, or the like) as a determination criterion.

For example, the base station device 1 determines that the resources to which the parameter set 1 is set are insufficient (step S120). Then, the base station device 1 switches the parameter set mapping to one having more resources to which the parameter set 1 is set, and secures resources to which the parameter set 1 is set (step S122). With such switching, it is possible to adjust the resource load between the parameter sets. Then, the base station device 1 notifies the terminal device 2 of the mapping information after the switching (for example, information indicating the parameter set mapping index after the switching or the switching of the parameter set mapping) (step S124). Then, the terminal device 2 performs subsequent decoding in accordance with the parameter set mapping after the switching on the basis of the newly received mapping information (step S126).

The semi-static switching method has been described above.

(Dynamic Switching Method)

The base station device 1 transmits signals while dynamically switching the parameter set allocated to each terminal device 2. In this case, the base station device 1 generates the switching-related information for performing the dynamic switching and notifies the terminal device 2 of the switching-related information.

For example, the switching-related information may include information indicating a plurality of parameter sets of the switching candidate. For example, this information may include a plurality of associations between information indicating the parameter set and identification information. The identification information is hereinafter also referred to as a parameter set index. For example, a parameter set index 0 is associated with the parameter set 0, and a parameter set index 1 is associated with the parameter set 1. The information indicating a plurality of parameter sets of the switching candidate is notified of in advance, and thus switching can be performed by designation of the parameter set index.

For example, the switching-related information may include information indicating the parameter set of the switching destination. The information indicating the parameter set of the switching destination may be information indicating the parameter set of the switching destination (that is, a setting of the sub carrier interval and the symbol length). In this case, the dynamic switching is possible even in a case in which the parameter set of the switching candidate is not decided in advance. Further, the information indicating the parameter set of the switching destination may be information indicating the parameter set index of the switching destination. In this case, the base station device 1 can reduce the amount of control information for implementing the switching as compared with the case in which the information indicating the parameter set is notified of.

For example, the switching-related information may include information indicating whether or not the switching is executed. This information is notified of in a case in which the number of parameter sets of the switching candidate is limited to two. In this case, an instruction to execute or not to execute switching is given from one parameter set to another parameter set according to the information indicating whether or not the switching is executed.

Various specific switching methods can be considered. Two examples will be described below in detail.

First Example

The base station device 1 first notifies the terminal device 2 of the information indicating a plurality of parameter sets of the switching candidate in advance as the switching-related information. Then, the base station device 1 notifies of the information indicating the parameter set index of the switching destination as the switching-related information when the switching is executed. On the basis of the received information, the terminal device 2 determines the parameter set used for the signal destined for itself and attempts to perform decoding.

An example of a flow of a process in the first example will be described below with reference to FIG. 22.

Figure 22:
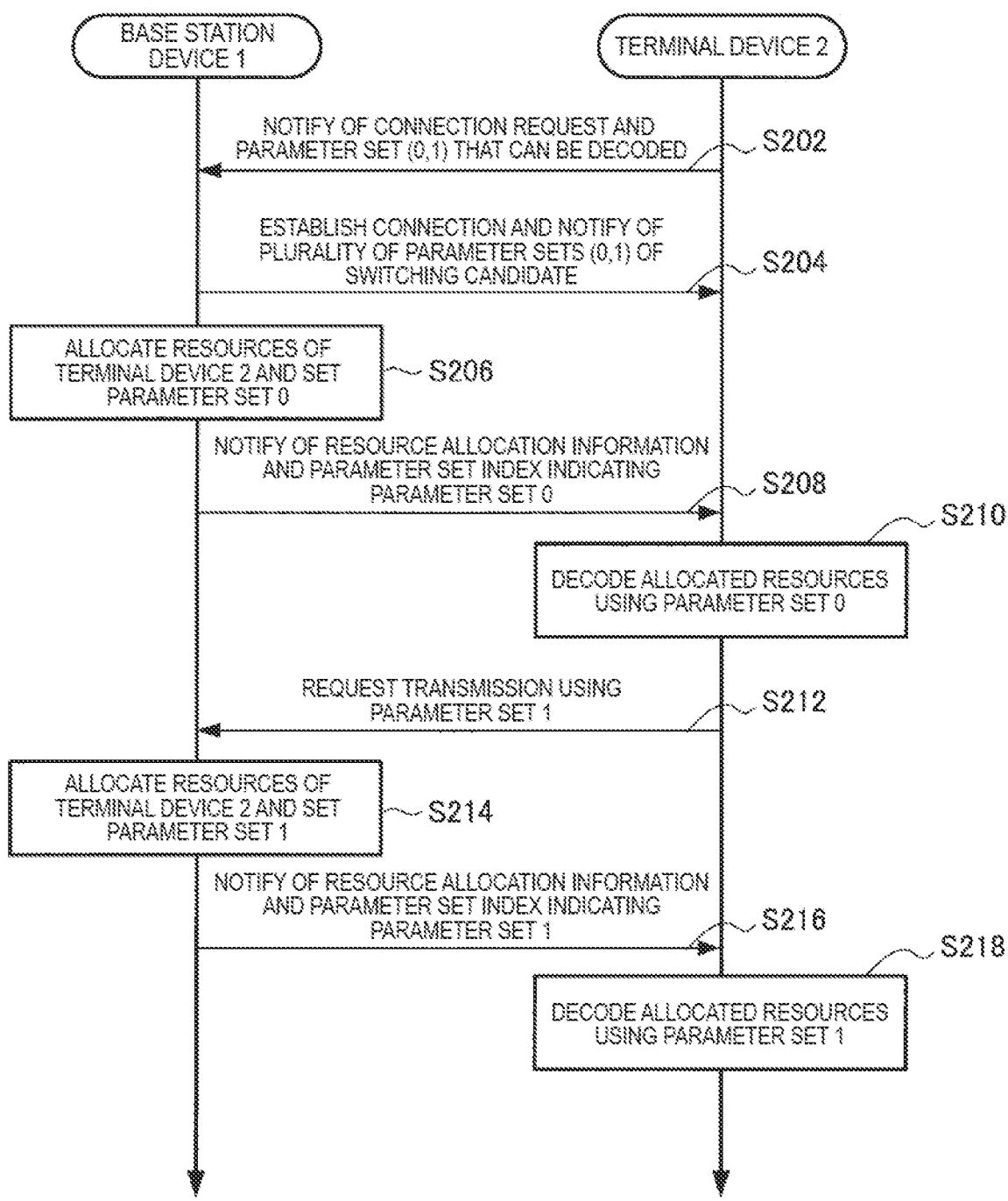
FIG. 22 is a sequence diagram illustrating an example of a flow of a switching process of a dynamic parameter set executed in a communication system according to the present embodiment.

FIG. 22 is a sequence diagram illustrating an example of a flow of the dynamic parameter set switching process executed in the communication system according to the present embodiment. The base station device 1 and the terminal device 2 are involved in the present sequence.

As illustrated in FIG. 22, first, the terminal device 2 notifies the base station device 1 of a connection request and information indicating the parameter set that can be decoded by the terminal device 2 using, for example, RRC signaling or the like (step S202). Here, it is assumed that the terminal device 2 supports decoding of the parameter set 0 and the parameter set 1. Then, the base station device 1 establishes a connection and notifies the terminal device 2 of the information indicating a plurality of parameter sets of the switching candidate using, for example, RRC signaling or the like (step S204). Here, the switching candidate is assumed to include the parameter set 0 and the parameter set 1. Then, the base station device 1 allocates the resources used for signals destined for the terminal device 2 and sets the parameter set used for the resources (step S206). Here, the parameter set 0 is assumed to be set. Then, the base station device 1 notifies of the resource allocation information and the parameter set index indicating the parameter set 0 using the DCI or the like (step S208). Thereafter, the base station device 1 transmits a signal to the terminal device 2 using the parameter set 0 in the allocated resources. Then, the terminal device 2 attempts to perform decoding using the parameter set 0 of the allocated resources on the basis of the resource allocation information, the information indicating the parameter set of the switching candidate, and the parameter set index (step S210).

Here, the base station device 1 may switch the parameter set. At this time, the base station device 1 may use the message from the terminal device 2 as a determination criterion or may use other information (for example, a shortage of resources, a communication load, a number of users, or the like) as a determination criterion.

For example, the terminal device 2 notifies the base station device 1 of a message requesting transmission using the parameter set 1 (step S212). Then, the base station device 1 determines whether or not transmission using the parameter set 1 is performed, and when the transmission is performed, the base station device 1 allocates resources again and sets the parameter set 1 to the resources (step S214). Then, the base station device 1 notifies the terminal device 2 of the resource allocation information and the parameter set index indicating the parameter set 1 using, for example, the DCI or the like (step S216). Thereafter, the base station device 1 transmits a signal to the terminal device 2 using the parameter set 1 in the allocated resources. Then, the terminal device 2 attempts to perform decoding using the parameter set 1 of the allocated resources on the basis of the resource allocation information, the information indicating the parameter set of the switching candidate, and the parameter set index (step S218).

Second Example

A second method is an example in which the number of parameter sets of the switching candidate is limited to two. Specifically, the base station device 1 first notifies the terminal device 2 of information indicating two parameter sets of the switching candidate in advance. Then, the base station device 1 notifies of the information indicating whether or not the switching is executed. On the basis of the received information, the terminal device 2 determines the parameter set used for the signal destined for itself and attempts to perform decoding.

An example of a flow of a process in the first example will be described below with reference to FIG. 23.

Figure 23:
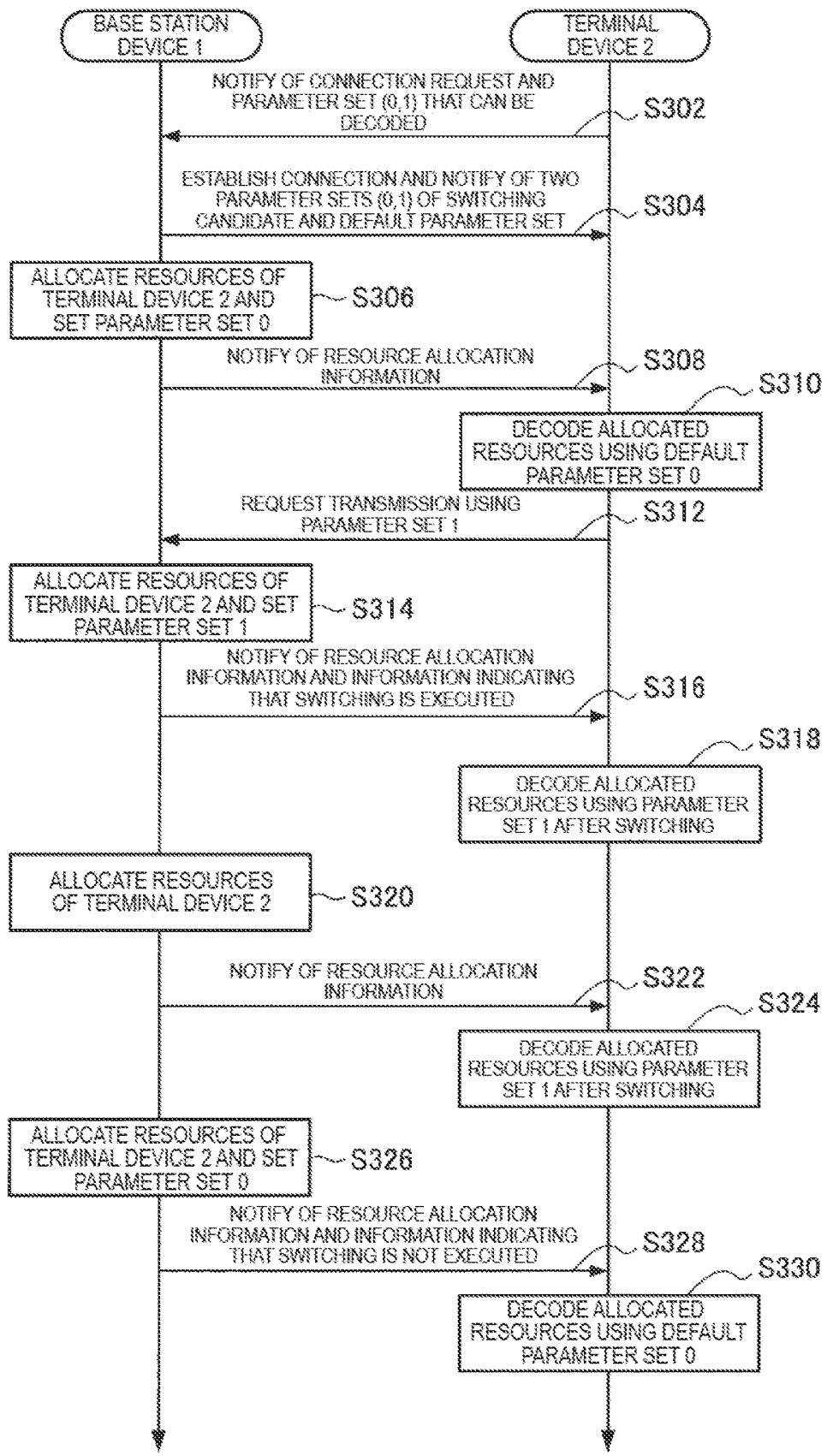
FIG. 23 is a sequence diagram illustrating an example of a flow of a switching process of a dynamic parameter set executed in a communication system according to the present embodiment.

FIG. 23 is a sequence diagram illustrating an example of a flow of the dynamic parameter set switching process executed in the communication system according to the present embodiment. The base station device 1 and the terminal device 2 are involved in the present sequence.

As illustrated in FIG. 23, first, the terminal device 2 notifies the base station device 1 of a connection request and information indicating the parameter set that can be decoded by the terminal device 2 using, for example, RRC signaling or the like (step S302). Here, it is assumed that the terminal device 2 supports decoding of the parameter set 0 and the parameter set 1. Then, the base station device 1 establishes a connection and notifies the terminal device 2 of the information indicating the two parameter sets of the switching candidate and information indicating a default parameter set using, for example, RRC signaling (step S304). Here, it is assumed that the switching candidate includes the parameter set 0 and the parameter set 1, and the default is the parameter set 0. Then, the base station device 1 allocates the resources used for the signal destined for the terminal device 2 and sets the default parameter set 0 to the resources (step S306). Then, the base station device 1 notifies of the resource allocation information by using DCI or the like (step S308). Thereafter, the base station device 1 transmits a signal to the terminal device 2 using the default parameter set 0 in the allocated resources. Then, the terminal device 2 attempts to perform decoding using the default parameter set 0 of the allocated resources on the basis of the resource allocation information (step S310).

Here, the base station device 1 may switch the parameter set. At this time, the base station device 1 may use the message from the terminal device 2 as a determination criterion or may use other information (for example, a shortage of resources, a communication load, a number of users, or the like) as a determination criterion.

For example, the terminal device 2 notifies the base station device 1 of a message requesting transmission using the parameter set 1 (step S312). Then, the base station device 1 determines whether or not transmission using the parameter set 1 is performed, and when the transmission is performed, the base station device 1 allocates resources again and sets the parameter set 1 to the resources (step S314). Then, the base station device 1 notifies the terminal device 2 of the resource allocation information and the information indicating that the switching of the parameter set is executed using, for example, the DCI or the like (step S316). Thereafter, the base station device 1 transmits a signal to the terminal device 2 using the parameter set 1 after the switching in the allocated resources. Then, the terminal device 2 attempts to perform decoding using the parameter set 1 of the allocated resources on the basis of the resource allocation information, the information indicating the two parameter sets of the switching candidate, and the information indicating that the switching of the parameter set is executed (step S318).

Thereafter, the base station device 1 continues the transmission using the parameter set 1 after the switching, and the terminal device 2 continues the reception using the parameter set 1 after the switching. For example, the base station device 1 allocates the resources again (step S320) and notifies the terminal device 2 of the resource allocation information (step S322). On the other hand, the terminal device 2 attempts to perform decoding using the parameter set 1 of the allocated resources on the basis of the resource allocation information (step S324).

Here, the base station device 1 may cancel the switching of the parameter set. At this time, the base station device 1 may use the message from the terminal device 2 as a determination criterion or may use other information (for example, a shortage of resources, a communication load, a number of users, or the like) as a determination criterion.

For example, the base station device 1 determines whether or not transmission using the parameter set 0 is performed, and when the transmission is performed, the base station device 1 allocates the resources again and sets the default parameter set 0 in the resources (step S326). Then, the base station device 1 notifies the terminal device 2 of the resource allocation information and the information indicating that the switching of the parameter set is not executed using, for example, the DCI or the like (step S328). Thereafter, the base station device 1 transmits a signal to the terminal device 2 using the default parameter set 0 in the allocated resources. Then, the terminal device 2 attempts to perform decoding using the default parameter set 0 of the allocated resources on the basis of the resource allocation information and the information indicating that the switching of the parameter set is not executed (step S330).

The dynamic switching method has been described above.
(Supplement of Switching-Related Information)

An example of information included in the switching-related information is shown in Table 1 below. As shown in Table 1, the switching-related information may include a parameter set switch flag, the parameter set mapping index, and the parameter set index. Further, the switching-related information may be notified of without including unnecessary or information that was already notified of among this information.

TABLE 1

| switching-related information |
|---|
| Parameter Set Switch Flag |
| Parameter Set Mapping Index |
| Parameter Set Index |

An example of an actual bit string of the parameter set switch flag is shown in Table 2 below. The parameter set switch flag corresponds to the information indicating whether or not the switching is executed, a bit string "0" indicates that the switching is not executed (Switch Disable), and a bit string "1" indicates that the switching is executed (Switch Enable).

TABLE 2

| Parameter Set Switch Flag | Bit |
|---|---|
| Switch Disable | 0 |
| Switch Enable | 1 |

An example of an actual bit string of the parameter set mapping index is shown in Table 3 below. For example, a bit string "00" indicates a parameter set mapping index 0, a bit string "01" indicates a parameter set mapping index 1, a bit string "10" indicates a parameter set mapping index 2, and a bit string "11" indicates a parameter set mapping index 3.

TABLE 3

| Parameter Set Mapping Index | Bit |
|---|---|
| Parameter Set Mapping Index 0 | 00 |
| Parameter Set Mapping Index 1 | 01 |
| Parameter Set Mapping Index 2 | 10 |
| Parameter Set Mapping Index 3 | 11 |

An example of an actual bit string of the parameter set index is shown in Table 4 below. For example, a bit string "00" indicates a parameter set index 0, a bit string "01" indicates a parameter set index 1, a bit string "10" indicates a parameter set index 2, and a bit string "11" indicates a parameter set index 3.

TABLE 4

| Parameter Set Index | Bit |
|---|---|
| Parameter Set Index 0 | 00 |
| Parameter Set Index 1 | 01 |
| Parameter Set Index 2 | 10 |
| Parameter Set Index 3 | 11 |

Further, the switching-related information may include information indicating a switching timing in addition to the information described above, in this case, the base station device 1 can arbitrarily control a period until the switching is actually performed after the notification of the switching-related information is given.

(Means for Notifying of Switching-Related Information)

The switching-related information can be transmitted using various means. For example, the switching-related information may be included in the DCI and transmitted. Further, the switching-related information can be included in the RRC signaling and transmitted. Further, the switching-related information can be included in the system information and transmitted. These means can be flexibly selected depending on a timing and/or an interval of the notification or the like.

Further, the base station device 1 may explicitly transmit the switching-related information. In this case, the switching-related information may include the information shown in Table 1 above.

On the other hand, the base station device 1 may implicitly transmit the switching-related information. For example, the base station device 1 may implicitly transmit the switching-related information in association with an encoding technique. Specifically, the base station device 1 performs encoding using identification information corresponding to the switching-related information among a plurality of pieces of identification information corresponding to identification information (for example, an RNTI) specific to the terminal device 2 of the communication counterpart. In the implicit transmission method, since the switching-related information is not transmitted without change, it is possible to reduce the amount of control information as compared with the explicit transmission.

An encoding target and an encoding technique are arbitrary. An example in which the DCI is encoded by the CRC associated with the switching-related information will be described below as an example with reference to FIG. 24. In this case, the terminal device 2 can recognize a parameter set of a channel scheduled by the DCI on the basis of the CRC of the DCI.

Figure 24:
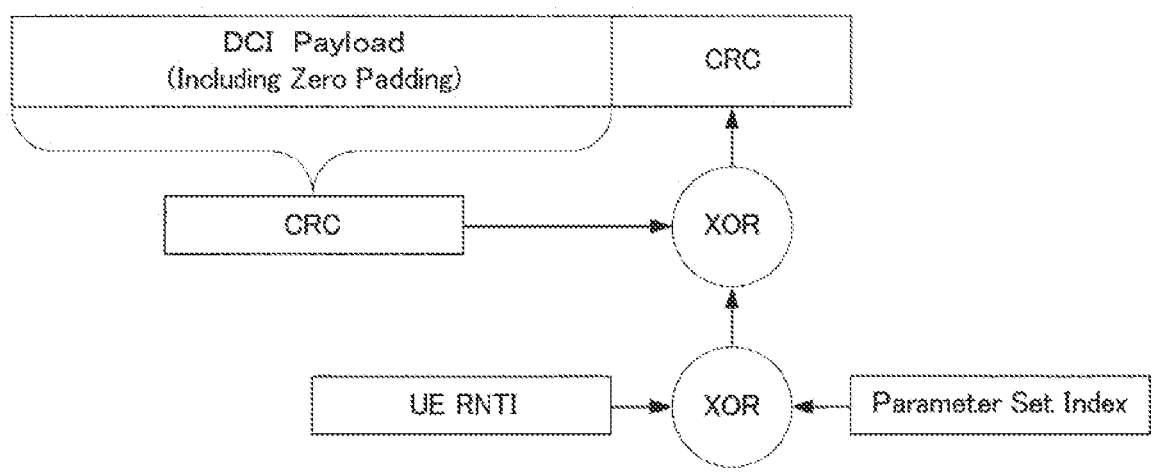
FIG. 24 is a diagram for describing an implicit transmission method of switching-related information in the present embodiment.

FIG. 24 is a diagram for describing an implicit transmission method of the switching-related information in the present embodiment. Here, an example in which the parameter set index is implicitly transmitted as an example of the switching-related information will be described.

As illustrated in FIG. 24, first, the base station device 1 performs an XOR calculation of the RNTI (corresponding to the UE RNTI) of the terminal device 2 of the communication counterpart and the bit string of the parameter set index. Accordingly, a different RNTI is calculated for each the parameter set index, and a plurality of RNTIs corresponding to a plurality of parameter set indexes are calculated accordingly. Then, the base station device 1 performs an XOR calculation of the RNTI after the XOR calculation and the CRC calculated from the payload of the DCI, and uses the calculation result as the CRC of the DCI.

Upon receiving the DCI, the terminal device 2 decodes the DCI, and checks whether or not the CRC is correct. At this time, the terminal device 2 performs the two XOR calculations described above with reference to FIG. 24 for all the available parameter set indices, and performs CRC checking. For example, the terminal device 2 first performs the CRC checking by performing the XOR calculation twice using the parameter set index "00" corresponding to the parameter set 0. In a case in which it is determined that the CRC is correct, the terminal device 2 performs decoding using the parameter set 0. On the other hand, in a case in which it is determined that the CRC is incorrect, the terminal device 2 performs the CRC checking by performing the XOR calculation twice using the parameter set index "01" corresponding to the parameter set 1. By performing such processes sequentially, the terminal device 2 can recognize the parameter set which is transmitted implicitly.

(Scheduling Between Parameter Sets)

Switching of the parameter set may be treated as scheduling between the parameter sets.

For example, in scheduling for the terminal device 2, the base station device 1 can use a control channel of a certain parameter set to schedule a shared channel of a parameter set different from that parameter set. In this case, the terminal device 2 recognizes the parameter set set to predetermined resources from scheduling information included in the control information from the base station device 1 (for example, signaling by the RRC, signaling by the MAC, signaling by the DCI, or the like).

Further, in scheduling between the parameter sets, restrictions may be imposed on some parameter sets. For example, a restriction may be imposed such that the control channel of the parameter set 0 can be scheduled for the parameter set 2 but is unable to be scheduled for the parameter set 1. Further, the base station device 1 may restrict whether the switching can be performed for each parameter set in accordance with the capability of the terminal device 2 of the communication counterpart. Specifically, the base station device 1 imposes a restriction that switching to a parameter set for a wideband is unable to be performed on a terminal device 2 for a narrow band. With such restrictions, effective utilization of the resources can be realized.

(Recognition of Parameter Set)

The terminal device 2 need not necessarily recognize the switching of the parameter set. This is because the terminal device 2 can recognize the parameter set set to the predetermined resources on the basis of the scheduling information included in the detected DCI even in a case in which the parameter set is switched.

For example, the terminal device 2 monitors the NR-PDCCH in a predetermined parameter set on the basis of the setting by the RRC signaling or the like, in a case in which the DCI included in the NR-PDCCH detected by the monitoring includes scheduling of the NR-PDSCH to which the parameter set 0 is set, the terminal device 2 recognizes that the parameter set 0 is set to the resources to which the NR-PDSCH is mapped.

Further, the terminal device 2 need not recognize whether or not the parameter set 0 is used for resources other than the resources to which the NR-PDSCH is mapped. The resources other than the resources to which the NR-PDSCH is mapped can be used for mapping channels for other terminal devices 2. In other words, even in a case in which the base station device 1 dynamically switches and uses a plurality of parameter sets, each terminal device 2 preferably recognizes its own parameter set and may not recognize the parameter sets of the other terminal devices 2.

The terminal device 2 need not necessarily recognize the switching of the parameter set even in a case in which the NR-PDCCH to which a plurality of parameter sets are set is monitored. This is because the terminal device 2 can recognize the parameter set set to the predetermined resources on the basis of the scheduling information included in the DCI detected by the monitoring.

For example, a case in which the terminal device 2 monitors the NR-PDCCH to which the parameter set 0 is set and the NR-PDCCH to which the parameter set 1 is set is assumed. For example, it is assumed that the parameter set 0 is used for the resources of the NR-PDSCH scheduled by the NR-PDCCH to which the parameter set 0 is set. On the basis of the monitoring result, the terminal device 2 recognizes that the parameter set 0 is set to the resources to which the NR-PDSCH is mapped. On the other hand, it is assumed that the parameter set 1 is used for the resources of the NR-PDSCH scheduled by the NR-PDCCH to which the parameter set 1 is set. On the basis of the monitoring result, the terminal device 2 recognizes that the parameter set 1 is set to the resources to which the NR-PDSCH is mapped.

2. Application Examples

The technology according to the present disclosure can be applied to various products. For example, the base station device 1 may be realized as any type of evolved Node B (eNB) such as a macro eNB or a small eNB. The small eNB may be an eNB that covers a cell, such as a pico eNB, a micro eNB, or a home (femto) eNB, smaller than a macro cell. Instead, the base station device 1 may be realized as another type of base station such as a NodeB or a base transceiver station (BTS). The base station device 1 may include a main entity (also referred to as a base station device) that controls wireless communication and one or more remote radio heads (RRHs) disposed at different locations from the main entity. Further, various types of terminals to be described below may operate as the base station device 1 by performing a base station function temporarily or permanently.

Further, for example, the terminal device 2 may be realized as a mobile terminal such as a smartphone, a tablet personal computer (PC), a notebook PC, a portable game terminal, a portable/dangle mobile router or a digital camera, or an in-vehicle terminal such as a car navigation device. Further, the terminal device 2 may be realized as a terminal that performs machine to machine (M2M) communication (also referred to as a machine type communication (MTC) terminal). Moreover, the terminal device 2 may be a wireless communication module mounted on the terminal (for example, an integrated circuit module configured on one die).

2.1. Application Examples for Base Station

First Application Example

Figure 25:
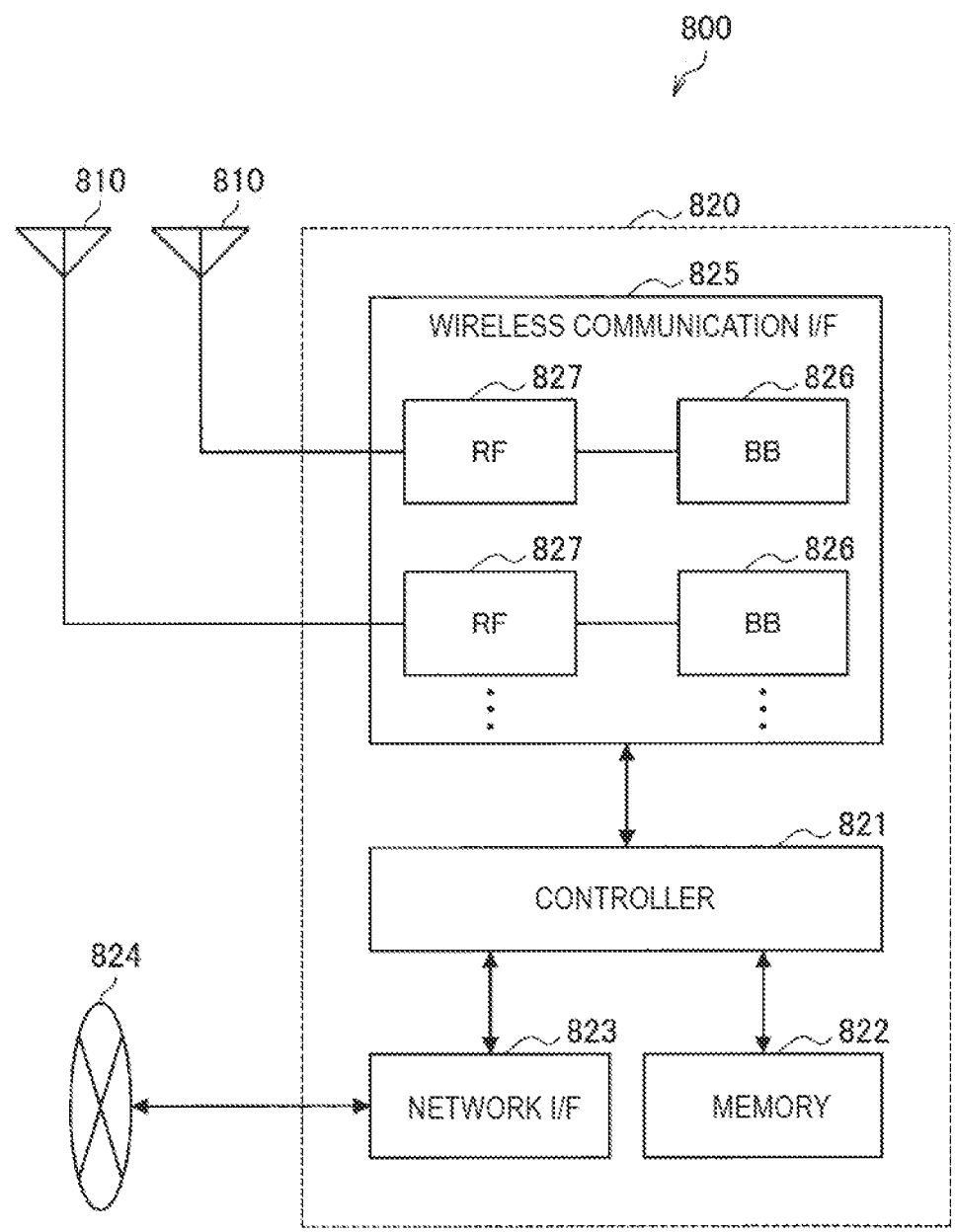
FIG. 25 is a block diagram illustrating a first example of a schematic configuration of an eNB.

FIG. 25 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g., a plurality of antenna elements constituting a MIMO antenna) and is used for the base station apparatus 820 to transmit and receive a wireless signal. The eNB 800 may include the plurality of the antennas 810 as illustrated in FIG. 19, and the plurality of antennas 810 may, for example, correspond to a plurality of frequency bands used by the eNB 800. If should be noted that while FIG. 19 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 19, and the plurality of BB processors 826 may, for example, correspond to a plurality of frequency bands used by the eNB 800. Further, the wireless communication interface 825 may also include a plurality of the RF circuits 827, as illustrated in FIG. 25, and the plurality of RF circuits 827 may, for example, correspond to a plurality of antenna elements. Note that FIG. 25 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 25, one or more constituent elements (the higher layer processing unit 101 and/or the control unit 103) described with reference to FIG. 8 included in the base station device 1 may be implemented in the wireless communication interface 825. Alternatively, at least some of the constituent elements may be implemented in the controller 821. As one example, a module including a part or the whole of (for example, the BB processor 826) of the wireless communication interface 825 and/or the controller 821 may be implemented on the eNB 800. The one or more constituent elements in the module may be implemented in the module. In this ease, the module may store a program causing a processor to function as the one more constituent elements (in other words, a program causing the processor to execute operations of the one or more constituent elements) and execute the program. As another example, a program causing the processor to function as the one or more constituent elements may be installed in the eNB 800, and the wireless communication interface 825 (for example, the BB processor 826) and/or the controller 821 may execute the program. In this way, the eNB 800, the base station device 820, or the module may be provided as a device including the one or more constituent elements and a program causing the processor to function as the one or more constituent elements may be provided. In addition, a readable recording medium on which the program is recorded may be provided.

Further, in the eNB 800 illustrated in FIG. 25, the receiving unit 105 and the transmitting unit 107 described with reference to FIG. 8 may be implemented in the wireless communication interface 825 (for example, the RF circuit 827). Further, the transceiving antenna 109 may be implemented in the antenna 810. Further, an interface between the higher layer processing unit 101 and the higher node or another base station device may be installed in the controller 821 and/or the network interface 823.

Second Application Example

Figure 26:
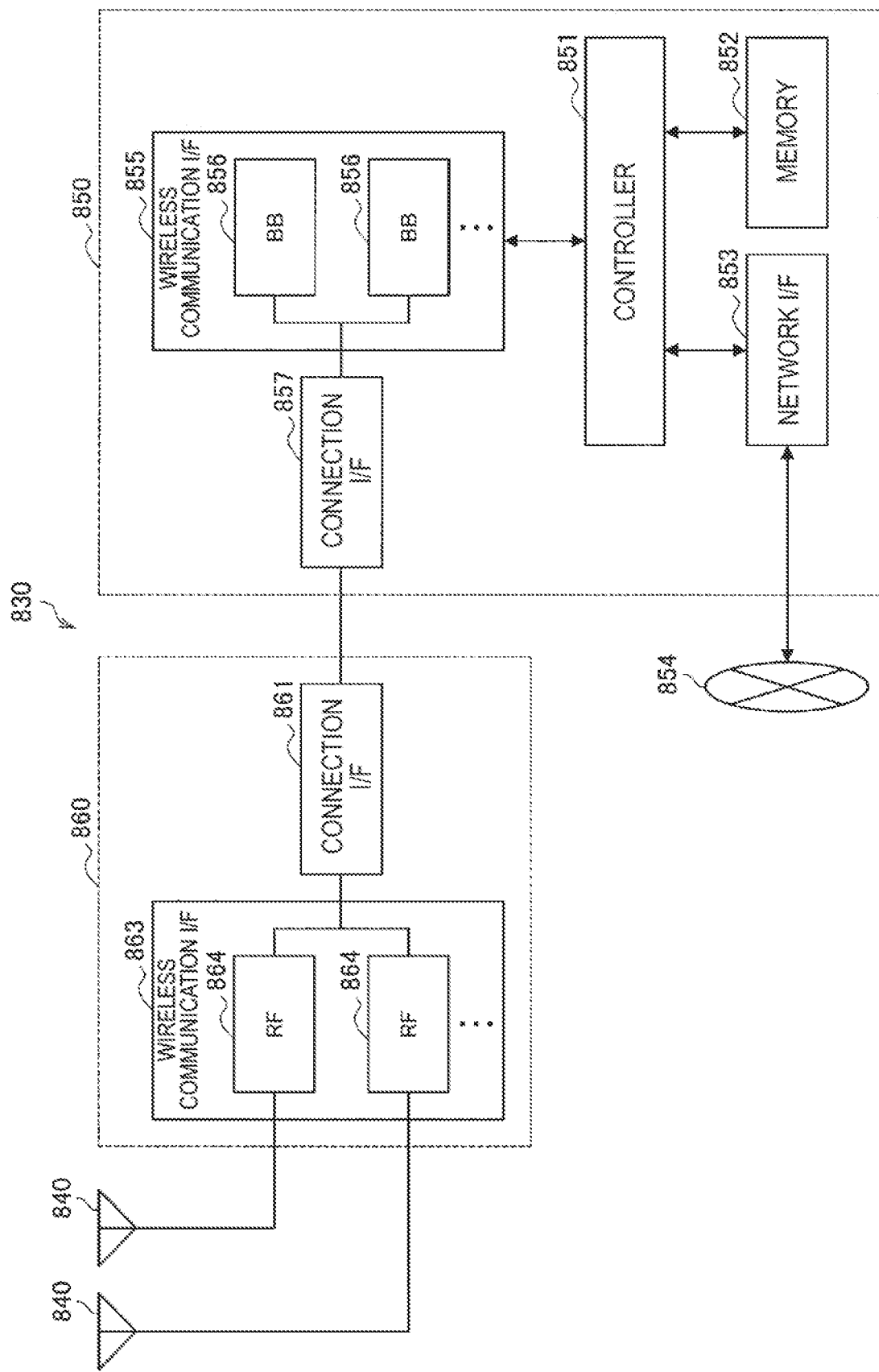
FIG. 26 is a block diagram illustrating a second example of the schematic configuration of the eNB.

FIG. 26 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. Further, the base station apparatus 850 and the RRH 860 may be connected to each other by a high speed line such as optical fiber cables.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 26, and the plurality of antennas 840 may, for example, correspond to a plurality of frequency bands used by the eNB 830. Note that FIG. 26 illustrates an example in which the eNB 830 includes the plurality of antennas 840, but the eNB 830 may include the single antenna 840.

The base station apparatus 850 includes a controller 851, a memory 852, a network interlace 853, a wireless communication interface 855, and a connection interface 857. The controller 851, the memory 852, and the network interface 853 are similar to the controller 821, the memory 822, and the network interface 823 described with reference to FIG. 25.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 26 except that the BB processor 856 is connected to an RF circuit 864 of the RRH 860 via the connection interface 857. The wireless communication interface 855 may include a plurality of the BB processors 856, as illustrated in FIG. 26, and the plurality of BB processors 856 may, for example, correspond to a plurality of frequency bands used by the eNB 830. Note that FIG. 26 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RRH 860 includes a connection interlace 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 20, and the plurality of RF circuits 864 may, for example, correspond to a plurality of antenna elements. Note that FIG. 26 illustrates an example in which the wireless communication interface 863 includes the plurality of RF circuits 864, but the wireless communication interface 863 may include the single RF circuit 864.

In the eNB 830 illustrated in FIG. 26, one or more constituent elements (the higher layer processing unit 101 and/or the control unit 103) described with reference to FIG. 8 included in the base station device 1 may be implemented in the wireless communication interface 855 and/or the wireless communication interface 863. Alternatively, at least some of the constituent elements may be implemented in the controller 851. As one example, a module including a part or the whole of (for example, the BB processor 856) of the wireless communication interface 855 and/or the controller 851 may be implemented on the eNB 830. The one or more constituent elements may be implemented in the module. In this case, the module may store a program causing a processor to function as the one more constituent elements (in other words, a program causing the processor to execute operations of the one or more constituent elements) and execute the program. As another example, a program causing the processor to function as the one or more constituent elements may be installed in the eNB 830, and the wireless communication interface 855 (for example, the BB processor 856) and/or the controller 851 may execute the program. In this way, the eNB 830, the base station device 850, or the module may be provided as a device including the one or more constituent elements and a program causing the processor to function as the one or more constituent elements may be provided. In addition, a readable recording medium on which the program is recorded may be provided.

Further, in the eNB 830 illustrated in FIG. 26, for example, the receiving unit 105 and the transmitting unit 107 described with reference to FIG. 8 may be implemented in the wireless communication interface 863 (for example, the RF circuit 864). Further, the transceiving antenna 109 may be implemented in the antenna 840. Further, the network communication unit 130 may be implemented in the controller 851 and/or the network interface 853. Further, an interface between the higher layer processing unit 101 and the higher node or another base station device may be installed in the controller 851 and/or the network interface 853.

Application Examples for Terminal Device

First Application Example

Figure 27:
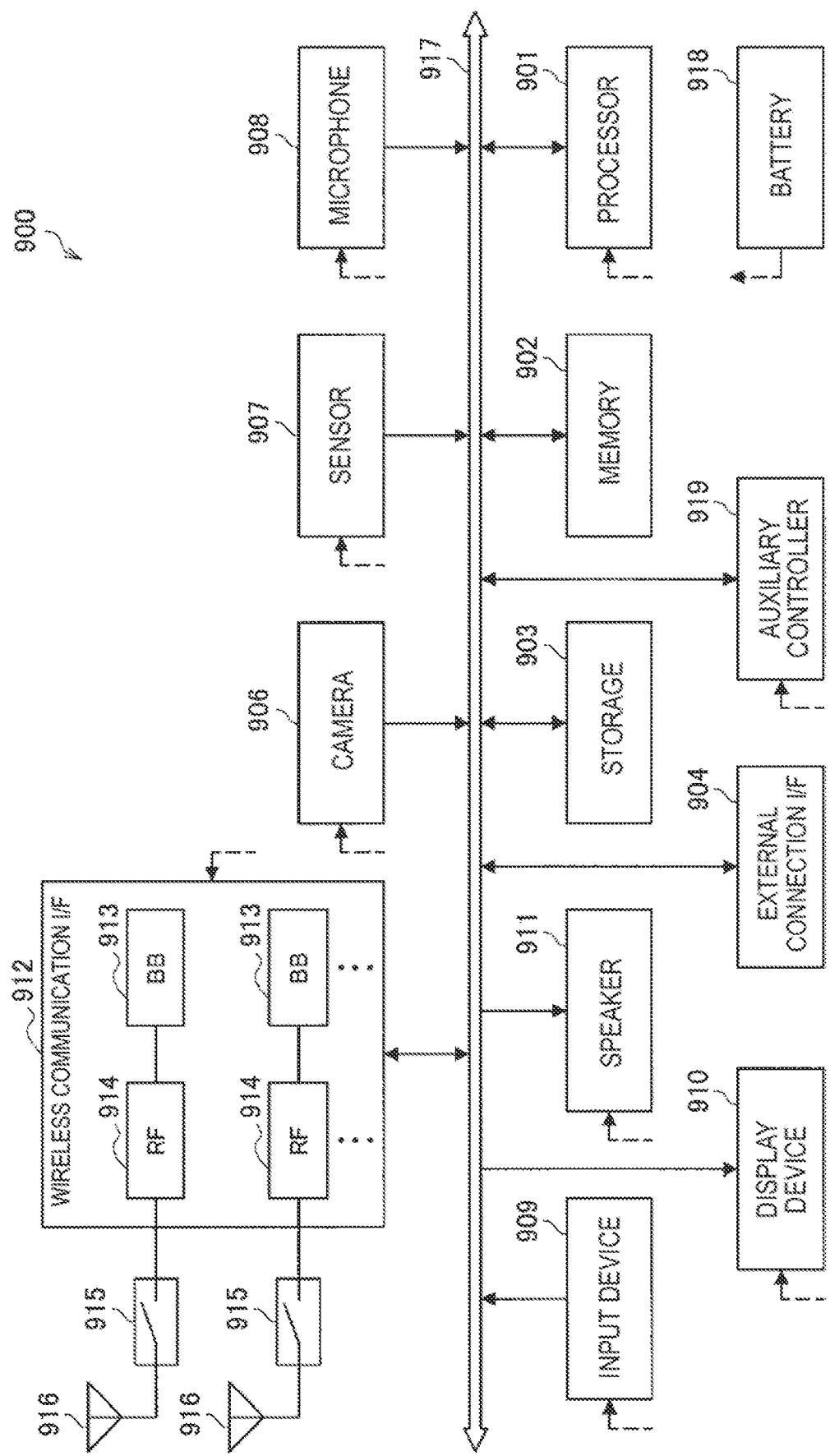
FIG. 27 is a block diagram illustrating an example of a schematic configuration of a smartphone.

FIG. 27 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interlace 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input info the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 27. Note that FIG. 27 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 27. Note that FIG. 27 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interlace 912, and the auxiliary controller 919 to each other. The battery 918 supplies electric power to each block of the smartphone 900 illustrated in FIG. 27 via a feeder line that is partially illustrated in the figure as a dashed line. The auxiliary controller 919, for example, operates a minimally necessary function of the smartphone 900 in a sleep mode.

In the smartphone 900 illustrated in FIG. 21, one or more constituent elements (the higher layer processing unit 201 and/or the control unit 203) included in the terminal device 2 may be implemented in the wireless communication interface 912. Alternatively, at least some of the constituent elements may be implemented in the processor 901 or the auxiliary controller 919. As one example, a module including a part or the whole of (for example, the BB processor 913) of the wireless communication interface 912, the processor 901, and/or the auxiliary controller 919 may be implemented on the smartphone 900. The one or more constituent elements may be implemented in the module. In this case, the module may store a program causing a processor to function as the one more constituent elements (in other words, a program causing the processor to execute operations of the one or more constituent elements) and execute the program. As another example, a program causing the processor to function as the one or more constituent elements may be installed in the smartphone 900, and the wireless communication interface 912 (for example, the BB processor 913), the processor 901, and/or the auxiliary controller 919 may execute the program. In this way, the smartphone 900 or the module may be provided as a device including the one or more constituent elements and a program causing the processor to function as the one or more constituent elements may be provided. In addition, a readable recording medium on which the program is recorded may be provided.

Further, in the smartphone 900 illustrated in FIG. 27, for example, the receiving unit 205 and the transmitting unit 207 described with reference to FIG. 9 may be implemented in the wireless communication interface 912 (for example, the RF circuit 914). Further, the transceiving antenna 209 may be implemented in the antenna 916.

Second Application Example

Figure 28:
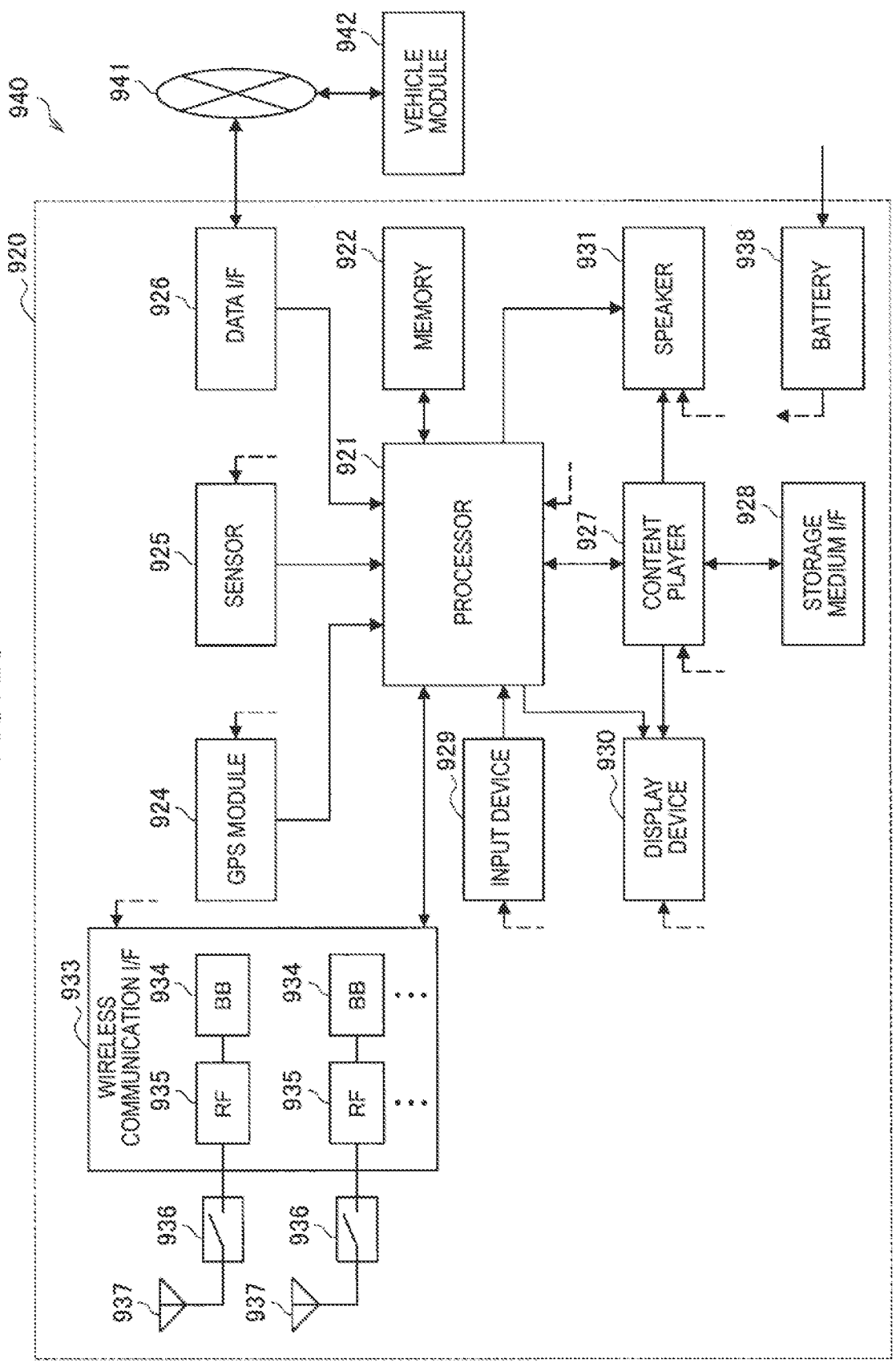
FIG. 28 is a block diagram illustrating an example of a schematic configuration of a car navigation apparatus.

FIG. 28 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interlace 933 may be a one-chip module in which the BB processor 934 and the RF circuit 935 are integrated. The wireless communication interface 933 may include a plurality of BB processors 934 and a plurality of RF circuits 935 as illustrated in FIG. 22. Note that FIG. 22 illustrates an example in which the wireless communication interface 933 includes a plurality of BB processors 934 and a plurality of RF circuits 935, but the wireless communication interface 933 may include a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 may include a plurality of antennas 937 as illustrated in FIG. 22. Note that FIG. 22 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 938 supplies electric power to each block of the car navigation apparatus 920 illustrated in FIG. 28 via a feeder line that is partially illustrated in the figure as a dashed line. Further, the battery 938 accumulates the electric power supplied from the vehicle.

In the car navigation 920 illustrated in FIG. 22, one or more constituent elements (the higher layer processing unit 201 and the control unit 203) included in the terminal device 2 may be implemented in the wireless communication interface 933. Alternatively, at least some of the constituent elements may be implemented in the processor 921. As one example, a module including a part or the whole of (for example, the BB processor 934) of the wireless communication interface 933 and/or the processor 921 may be implemented on the car navigation 920. The one or more constituent elements may be implemented in the module. In this case, the module may store a program causing a processor to function as the one more constituent elements (in other words, a program, causing the processor to execute operations of the one or more constituent elements) and execute the program. As another example, a program causing the processor to function as the one or more constituent elements may be installed in the car navigation 920, and the wireless communication interface 933 (for example, the BB processor 934) and/or the processor 921 may execute the program. In this way, the car navigation 920 or the module may be provided as a device including the one or more constituent elements and a program causing the processor to function as the one or more constituent elements may be provided. In addition, a readable recording medium on which the program is recorded may be provided.

Further, in the car navigation 920 illustrated in FIG. 28, for example, the receiving unit 205 and the transmitting unit 207 described with reference to FIG. 9 may be implemented in the wireless communication interface 933 (for example, the RF circuit 935). Further, the transceiving antenna 209 may be implemented in the antenna 937.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

<Conclusion>

An embodiment of the present disclosure has been described above in detail above with reference to FIGS. 1 to 28. As described above, the base station device 1 according to the present embodiment variably sets the sub carrier interval and the symbol length used for communication, and notifies of the switching-related information for switching the parameter set indicating the sub carrier interval and the symbol length in accordance with the setting content. As the switching-related information is notified of, the terminal device 2 can appropriately recognize the parameter set set in the resources used for transmitting the signal to itself and can receive the signals destined for itself.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above embodiment, the switching of the parameter set mainly related to the downlink communication has been described, but the present technology is not limited to this example. For example, switching of the parameter set related to uplink or sidelink communication can be performed similarly.

Further, the processes described with reference to the flowcharts and the sequence diagrams in this specification are not necessarily executed in the order illustrated in the drawings. Several process steps may be executed in parallel. Further, an additional process step may be employed, or some process steps may be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A base station device, including:

a control unit configured to variably set a sub carrier interval and a symbol length used for communication and notify of information for switching a parameter set indicating the sub carrier interval and the symbol length in accordance with setting content.

(2)

The base station device according to (1), in which the information for switching includes information in which the parameter set is associated with a resource to which the parameter set is set.

(3)

The base station device according to (2), in which the information for switching includes information indicating switching of an association between the parameter set and the resource to which the parameter set is set.

(4)

The base station device according to (2) or (3), in which the information for switching includes information indicating a resource used for communication with a terminal device of a communication counterpart.

(5)

The base station device according to (1), in which the information for switching includes information indicating the parameter set of a switching destination.

(6)

The base station device according to (5), in which the information for switching includes information indicating a plurality of the parameter sets of a switching candidate.

(7)

The base station device according to any one of (1) to (6), in which the information for switching includes information indicating whether or not the switching is executed.

(8)
The base station device according to any one of (1) to (7), in which the information for switching includes information indicating a timing of the switching.
(9)
The base station device according to any one of (1) to (8), in which the control unit explicitly transmits the information for switching.
(10)
The base station device according to any one of (1) to (8), in which the control unit implicitly transmits the information for switching.
(11)
The base station device according to (10), in which the control unit performs encoding using identification information corresponding to the information for switching among a plurality of pieces of identification information corresponding to identification information specific to a terminal device of a communication counterpart.
(12)
The base station device according to any one of (1) to (11), in which the control unit restricts whether or not the switching is performed for each parameter set in accordance with a capability of a terminal device of a communication counterpart.
(13)
The base station device according to any one of (1) to (12), in which the information for switching is included in a DCI and transmitted.
(14)
The base station device according to any one of (1) to (13), in which the information for switching is included in RRC signaling and transmitted.
(15)
The base station device according to any one of (1) to (14), in which the information for switching is included in system information and transmitted.
(16)
A terminal device, including:
a control unit configured to receive a resource in which a sub carrier interval and a symbol length are variably set on a basis of information notified of to switch a parameter set indicating the sub carrier interval and the symbol length in accordance with setting content.
(17)
A method, including:
variably setting, by a processor, a sub carrier interval and a symbol length used for communication and notifying of information for switching a parameter set indicating the sub carrier interval and the symbol length in accordance with setting content.
(18)
A method, including:
receiving, by a processor, a resource in which a sub carrier interval and a symbol length are variably set on a basis of information notified of to switch a parameter set indicating the sub carrier interval and the symbol length in accordance with setting content.
(19)
A storage medium having a program stored therein, the program causing a computer to function as:
a control unit configured to variably set a sub carrier interval and a symbol length used for communication and notify of information for switching a parameter set indicating the sub carrier interval and the symbol length in accordance with setting content.

(20)
A storage medium having a program stored therein, the program causing a computer to function as:
a control unit configured to receive a resource in which a sub carrier interval and a symbol length are variably set on a basis of information notified of to switch a parameter set indicating the sub carrier interval and the symbol length in accordance with setting content.

REFERENCE SIGNS LIST 1 base station device
101 higher layer processing unit
103 control unit
105 receiving unit
1051 decoding unit
1053 demodulating unit
1055 demultiplexing unit
1057 wireless receiving unit
1059 channel measuring unit
107 transmitting unit
1071 encoding unit
1073 modulating unit
1075 multiplexing unit
1077 wireless transmitting unit
1079 downlink reference signal generating unit
109 transceiving antenna
2 terminal device
201 higher layer processing unit
203 control unit
205 receiving unit
2051 decoding unit
2053 demodulating unit
2055 demultiplexing unit
2057 wireless receiving unit
2059 channel measuring unit
207 transmitting unit
2071 encoding unit
2073 modulating unit
2075 multiplexing unit
2077 wireless transmitting unit
2079 uplink reference signal generating unit
209 transceiving antenna

The invention claimed is:
1. A base station device, comprising:
circuitry configured to
determine that a sub carrier interval and a symbol length used for communication with a terminal device are insufficient, and
in response to a determination that the sub carrier interval and the symbol length used for the communication with the terminal device are insufficient,
variably set the sub carrier interval and the symbol length used for the communication with the terminal device and notify the terminal device of information for switching a parameter set indicating the sub carrier interval and the symbol length, the symbol length being variably set by selecting the parameter set from a plurality of parameter sets indicating different numbers of symbols, and
determine a time at which the switching will take place, wherein the information for switching includes an indication of a time period from notification of the information for switching to the time at which the switching will take place,
wherein the information for switching is included in radio resource control (RRC) signaling and transmitted.

2. The base station device according to claim 1, wherein the information for switching includes information in which the parameter set is associated with a resource to which the parameter set is set.

3. The base station device according to claim 2, wherein the information for switching includes information indicating switching of an association between the parameter set and the resource to which the parameter set is set.

4. The base station device according to claim 2, wherein the information for switching includes information indicating a resource used for the communication with the terminal device.

5. The base station device according to claim 1, wherein the information for switching includes information indicating the parameter set of a switching destination.

6. The base station device according to claim 5, wherein the information for switching includes information indicating a plurality of the parameter sets of a switching physical downlink control channel (PDCCH) or enhanced physical downlink control channel (EPDCCH) candidate.

7. The base station device according to claim 1, wherein the information for switching includes information indicating whether or not the switching is executed.

8. The base station device according to claim 1, wherein the circuitry is configured to explicitly transmit the information for switching.

9. The base station device according to claim 1, wherein the circuitry is configured to implicitly transmit the information for switching.

10. The base station device according to claim 9, wherein the circuitry is configured to perform encoding using identification information corresponding to the information for switching among a plurality of pieces of identification information corresponding to identification information specific to the terminal device.

11. The base station device according to claim 1, wherein the circuitry is configured to restrict whether or not the switching is performed for each parameter set in accordance with a capability of the terminal device.

12. The base station device according to claim 1, wherein the information for switching is included in a downlink control information (DCI) and transmitted.

13. The base station device according to claim 1, wherein the information for switching is included in system information and transmitted.

14. A terminal device, comprising:
circuitry configured to
in a case in which a sub carrier interval and a symbol length used for communication with a base station are insufficient, receive, from the base station, a resource in which the sub carrier interval and the symbol length are variably set on a basis of information notified of to switch a parameter set indicating the sub carrier interval and the symbol length, the symbol length being variably set by selecting the parameter set from a plurality of parameter sets indicating different numbers of symbols,
wherein the resource includes an indication of a time period from notification of the resource to a time at which switching of the parameter set will take place, and
wherein the information for switching is included in radio resource control (RRC) signaling and transmitted.

15. A method, comprising:
determining, by a processor, that a sub carrier interval and a symbol length used for communication with a terminal device are insufficient, and
in response to a determination that the sub carrier interval and the symbol length used for the communication with the terminal device are insufficient,
variably setting, by the processor, the sub carrier interval and the symbol length used for the communication with the terminal device and notifying the terminal device of information for switching a parameter set indicating the sub carrier interval and the symbol length, the symbol length being variably set by selecting the parameter set from a plurality of parameter sets indicating different numbers of symbols, and
determining a time at which the switching will take place, wherein the information for switching includes an indication of a time period from notification of the information for switching to the time at which the switching will take place,
wherein the information for switching is included in radio resource control (RRC) signaling and transmitted.

16. A method, comprising:
in a case in which a sub carrier interval and a symbol length used for communication with a base station are insufficient, receiving from the base station, by a processor, a resource in which the sub carrier interval and the symbol length are variably set on a basis of information notified of to switch a parameter set indicating the sub carrier interval and the symbol length, the symbol length being variably set by selecting the parameter set from a plurality of parameter sets indicating different numbers of symbols,
wherein the resource includes an indication of a time period from notification of the resource to a time at which switching of the parameter set will take place, and
wherein the information for switching is included in radio resource control (RRC) signaling and transmitted.

17. A non-transitory, computer-readable storage medium having a program stored therein, the program causing a computer to determine that a sub carrier interval and a symbol length used for communication with a terminal device are insufficient, and
in response to a determination that the sub carrier interval and the symbol length used for the communication with the terminal device are insufficient,
variably set the sub carrier interval and the symbol length used for the communication with the terminal device and notify the terminal device of information for switching a parameter set indicating the sub carrier interval and the symbol length, the symbol length being variably set by selecting the parameter set from a plurality of parameter sets indicating different numbers of symbols, and
determine a time at which the switching will take place, wherein the information for switching includes an indication of a time period from notification of the information for switching to the time at which the switching will take place,
wherein the information for switching is included in radio resource control (RRC) signaling and transmitted.

18. A non-transitory, computer-readable storage medium having a program stored therein, the program causing a computer to in a case in which a sub carrier interval and a symbol length used for communication with a base station are insufficient, receive from the base station, a resource in which the sub carrier interval and the symbol length are variably set on a basis of information notified of to switch a parameter set indicating the sub carrier interval and the symbol length, the symbol length being variably set by selecting the parameter set from a plurality of parameter sets indicating different numbers of symbols, wherein the resource includes an indication of a time period from notification of the resource to a time at which switching of the parameter set will take place, and wherein the information for switching is included in radio resource control (RRC) signaling and transmitted.

* * * * *